(12) United States Patent
Urababa et al.

(10) Patent No.: US 7,871,083 B2
(45) Date of Patent: Jan. 18, 2011

(54) STABILIZER SYSTEM OF VEHICLE

(75) Inventors: Shingo Urababa, Toyota (JP); Tomoyuki Iida, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 382 days.

(21) Appl. No.: 11/914,471

(22) PCT Filed: Jun. 7, 2006

(86) PCT No.: PCT/JP2006/311895

§ 371 (c)(1),
(2), (4) Date: Nov. 15, 2007

(87) PCT Pub. No.: WO2006/134954

PCT Pub. Date: Dec. 21, 2006

(65) Prior Publication Data

US 2009/0091093 A1    Apr. 9, 2009

(30) Foreign Application Priority Data

Jun. 16, 2005  (JP) .............................. 2005-177023

(51) Int. Cl.
*B60G 17/015* (2006.01)
(52) U.S. Cl. .................................................. 280/5.511
(58) Field of Classification Search .............. 280/5.509, 280/5.511, 5.512, 5.513, 5.515, 124.103, 280/124.106, 124.107
See application file for complete search history.

(56) References Cited

U.S. PATENT DOCUMENTS

| 5,441,298 | A | 8/1995 | Miller et al. | |
| 6,354,607 | B1 | 3/2002 | Kawashima et al. | |
| 6,425,585 | B1 | 7/2002 | Schuelke et al. | |
| 6,932,178 | B2 * | 8/2005 | Soatti | 180/226 |
| 7,533,751 | B2 * | 5/2009 | Handa et al. | 180/210 |
| 7,644,797 | B2 * | 1/2010 | Kofuji | 180/227 |
| 2006/0065463 | A1 * | 3/2006 | Handa et al. | 180/227 |
| 2009/0057046 | A1 * | 3/2009 | Kofuji | 180/226 |
| 2009/0227382 | A1 * | 9/2009 | Blecke | 464/145 |

FOREIGN PATENT DOCUMENTS

| DE | 41 36 262 | | 5/1993 |
| EP | 1 362 720 | | 11/2003 |
| EP | 1 491 371 | | 12/2004 |
| EP | 1 518 721 | | 3/2005 |
| EP | 1 600 313 | | 11/2005 |
| EP | 1 679 208 | | 7/2006 |
| JP | 04151388 A | * | 5/1992 |
| JP | 2004-314947 | | 11/2004 |

* cited by examiner

*Primary Examiner*—Faye M. Fleming
(74) *Attorney, Agent, or Firm*—Oblon, Spivak, McClelland, Maier & Neustadt, L.L.P.

(57) ABSTRACT

A stabilizer system, for use in a vehicle, exhibiting an appropriate rolling-restraining effect to restrain rolling of a body of the vehicle. An electronic control unit includes a control-start-timing reference-relative-rotation-position determining portion that determines a reference relative-rotation position of two stabilizer bars from which a relative-rotation amount of the two stabilizer bars is counted when a rolling-restraining control is performed. In the stabilizer system, when a lateral acceleration exceeds a reference value, the rolling-restraining control is started; and a relative-rotation position of the two stabilizer bars when the lateral acceleration exceeds the reference value is determined as the reference relative-rotation position of the two stabilizer bars. Thus, an appropriate reference relative-rotation position of the two stabilizer bars can be easily determined and accordingly an appropriate rolling-restraining effect of the two stabilizer bars can be exhibited.

35 Claims, 36 Drawing Sheets

STABILIZER SYSTEM OF VEHICLE

The present application is based on Japanese Patent Application No. 2005-177023 filed on Jun. 16, 2005, the contents of which are incorporated herein by reference.

TECHNICAL FIELD

The present invention relates to a vehicle's stabilizer system including a pair of stabilizer bars having a changeable, rolling-restraining effect to restrain the rolling of vehicle's body.

BACKGROUND ART

Recently, there has been proposed a vehicle's stabilizer system including a left and a right stabilizer bar whose rolling-restraining effect is changeable. For example, International Patent Application Publication WO99/67100 or its corresponding Japanese Patent Application Publication 2002-518245 discloses a stabilizer system including a pair of stabilizer bars and an actuator that rotates the two stabilizer bars relative to each other so as to change a rolling-restraining effect thereof to restrain the rolling of vehicle's body.

In the above-indicated stabilizer system, an electric current supplied to the actuator is controlled so that the two stabilizer bars may exhibit an appropriate rolling-restraining effect. Otherwise, an appropriate rolling-restraining effect may be exhibited by controlling an amount of relative rotation of the two stabilizer bars from a reference relative-rotation position thereof, to a target relative-rotation amount. In the latter case, however, the relative-rotation amount of the two stabilizer bars from the reference relative-rotation position may not be appropriately controlled to the target relative-rotation amount because of various reasons. For example, even if a relative-rotation amount of the two stabilizer bars when the power of the vehicle is turned off may be stored in a memory, the stored relative-rotation amount may differ from a relative-rotation amount of the two stabilizer bars when the power of the vehicle is turned on again. In addition, for example, because an air pressure in one of a left and a right wheel of the vehicle is too low, a posture of the vehicle when it runs straight may be tilted in a rolling direction. In those cases, an appropriate relative-rotation amount of the two stabilizer bars may not be obtained and accordingly an appropriate rolling-restraining effect may not be exhibited.

The above-indicated problems are just examples of the problems that do not allow the conventional stabilizer systems to exhibit an appropriate rolling-restraining effect. That is, the conventional stabilizer systems should be improved with respect to various points, e.g., the stability of posture of the vehicle with respect to the rolling direction.

SUMMARY OF THE INVENTION

It is therefore an object of the present invention to provide a more useful stabilizer system for use in a vehicle.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the present invention or even one or more different inventions than the present invention. Each of the following modes (1) through (34) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith and but also the detailed description of the preferred embodiments of the present invention, and that in additional claimable modes, one or more elements or one or more technical features may be added to, or deleted from, any of the following specific modes.

(1) A stabilizer system for use in a vehicle having a body, a left wheel, and a right wheel, the stabilizer system comprising:

two stabilizer bars which are connected to the left and right wheels, respectively, and which are rotated relative to each other to exhibit a rolling-restraining effect to restrain a rolling of the body;

an actuator which includes a driving-force source producing a driving force and which changes, with the driving force, a relative-rotation amount of the two stabilizer bars counted from a reference relative-rotation position thereof and thereby changes the rolling-restraining effect thereof; and a control device including a rolling-restraining control portion which performs a rolling-restraining control to control the actuator to change the relative-rotation amount of the two stabilizer bars to a target relative-rotation amount thereof and thereby enable the two stabilizer bars to exhibit an appropriate rolling-restraining effect, wherein the control device further includes a reference-relative-rotation-position determining portion which determines the reference relative-rotation position of the two stabilizer bars.

In the present stabilizer system, the reference-relative-rotation-position determining portion can determine an appropriate reference relative-rotation position of the two stabilizer bars, and accordingly the two stabilizer bars can exhibit an appropriate rolling-restraining effect to restrain the rolling of the vehicle's body. Therefore, for example, the two stabilizer bars can be effectively prevented from failing to exhibit the appropriate rolling-restraining effect because the reference relative-rotation position is not appropriate and accordingly, e.g., an amount of twisting of the two stabilizer bars is excessive or insufficient. Thus, the present stabilizer system is more useful than the above-indicated conventional stabilizer systems.

More specifically described, the present stabilizer system includes the two stabilizer bars and the actuator as a driving device that rotates the two stabilizer bars relative to each other. Each of the two stabilizer bars may be one including (a) a torsion-bar portion that is held by the vehicle's body such that the torsion-bar portion is rotatable relative to the body, and (b) an arm portion that extends from one end of the torsion-bar portion toward a corresponding one of the left and right wheels. One end of the arm portion may be connected to a wheel-support member such as a lower arm, so that the each stabilizer bar may be indirectly coupled to the corresponding wheel. In the latter case, since the torsion-bar portion is held by the vehicle's body and the arm portion is coupled to the corresponding wheel, the each stabilizer bar can rotate about an axis line of the torsion-bar portion, when the body and the wheel move toward, and away from, each other.

The actuator may be one that includes a left and a right connection portion to which the two (i.e., left and right)

stabilizer bars are connected, respectively, and that can positively rotate the two stabilizer bars relative to each other, can positively inhibit the relative rotation of the two stabilizer bars, and can passively permit the relative rotation of the two stabilizer bars. This actuator may be constructed such that respective connection ends of the two torsion-bar portions that are opposite to the above-indicated respective one ends thereof connected to the two arm portions are connected to the two connection portions of the actuator, so that the driving force of the actuator may be applied to the two torsion-bar portions. Hereinafter, there will be described the stabilizer system in accordance with the mode (1) with respect to the above-described example wherein each of the two stabilizer bars includes the torsion-bar portion and the arm portion, the respective connection ends of the two torsion-bar portions are connected to the actuator, and the respective one ends of the two arm portions are connected to the two wheels.

The rolling-restraining control portion of the control device controls the actuator to rotate appropriately the two stabilizer bars relative to each other so that the two stabilizer bars may exhibit an appropriate rolling-restraining effect to restrain the rolling of vehicle's body. The rolling-restraining effect may be changed by changing a relationship between rolling amount of the vehicle's body and rolling-restraining force (e.g., rolling-restraining moment) produced by the two stabilizer bars. More specifically described, if a relatively great rolling-restraining force is produced against a relatively small rolling amount, then a relatively high rolling-restraining effect is exhibited, so that a rolling amount of the vehicle's body at the time of, e.g., turning of the vehicle may be reduced. Generally, the rolling-restraining force corresponds to an amount of twisting of the two stabilizer bars that, in turn, corresponds to an amount of twisting of each stabilizer bar between the above-described one end of the arm portion thereof, connected to the wheel, and the above-described connection end of the torsion-bar portion thereof, connected to the actuator. Therefore, if, when the rolling amount is relatively small, the driving force of the actuator is used to rotate the two stabilizer bars relative to each other so as to increase the amount of twisting thereof, then a relatively great rolling-restraining force is produced against the relatively small rolling amount, and accordingly a relatively high rolling-restraining effect is exhibited. In the above-indicated example, the two stabilizer bars can be rotated relative to each other by rotation of the respective connection ends of the two torsion-bar portions, connected to the actuator, relative to each other.

The rolling-restraining control portion restrains the rolling of vehicle's body by changing the relative-rotation amount of the two stabilizer bars from the reference relative-rotation position thereof to the target relative-rotation amount thereof, and thereby causing the two stabilizer bars to exhibit an appropriate rolling-restraining effect. The reference relative-rotation position of the two stabilizer bars is determined as a reference position to control the relative rotation thereof. The reference relative-rotation position may be a neutral relative-rotation position where the relative-rotation amount of the two stabilizer bars is zero. The neutral relative-rotation position may be obtained in a state in which each of the two stabilizer bars is not twisted, respective distances of the left and right wheels from the vehicle's body are equal to each other, and respective rotation angles of the respective arm portions of the two stabilizer bars are equal to each other. However, the reference relative-rotation position may not be limited to the neutral relative-rotation position. Though details will be described later, an appropriate rolling-restraining control may be performed by using, as the reference relative-rotation position, a relative-rotation position different from the neutral relative-rotation position, depending upon a manner in which the rolling-restraining control is performed. In the above-indicated example, the relative-rotation amount of the two stabilizer bars from the reference relative-rotation position thereof is changed by changing a relative-rotation amount of the respective connection ends of the two torsion-bar portions, connected to the actuator, relative to each other.

The target relative-rotation amount of the two stabilizer bars may correspond to a rolling moment as a force to roll the vehicle's body about a longitudinal axis thereof. For example, if the rolling moment is great, then a large target relative-rotation amount is used to increase a twisting amount of the two stabilizer bars per unit rolling amount and thereby increase the rolling-restraining effect thereof, so as to restrain effectively the rolling of vehicle's body. However, if the reference relative-rotation position is not appropriate, then, e.g., the total twisting amount of the two stabilizer bars may be excessive or insufficient, so that the two stabilizer bars may not exhibit an appropriate rolling-restraining effect. The event that the reference relative-rotation position is not appropriate may occur to, e.g., a case where an appropriate reference relative-rotation position cannot be obtained when the power of the vehicle is turned on, or a case where the reference relative-rotation position changes during the operation of the stabilizer system. Those cases will be described in detail, later.

The control device further includes the reference-relative-rotation-position determining portion that can determine an appropriate reference relative-rotation position of the two stabilizer bars, so that the two stabilizer bars may exhibit an appropriate rolling-restraining effect. Therefore, the two stabilizer bars can be effectively prevented from failing to exhibit an appropriate rolling-restraining effect because the reference relative-rotation position is not appropriate and accordingly, e.g., the total twisting amount of the two stabilizer bars is excessive or insufficient. Thus, the present stabilizer system is more useful than the conventional stabilizer systems. The reference-relative-rotation-position determining portion may be one that determines a reference relative-rotation position only one time, e.g., after the power of the vehicle is turned on, or one that iteratively or repetitively determines a reference relative-rotation position, e.g., each time a predetermined condition is met.

The actuator is not limited to any specific sorts. For example, the actuator may be the above-described one that rotates the two stabilizer bars, connected thereto, relative to each other. The driving-force source may be an electric motor. The relative-rotation position of the two stabilizer bars may be obtained by using a relative-rotation-position sensor that detects, regarding the above-indicated example, a relative-rotation position of the two torsion-bar portions. Alternatively, in the case where the driving-force source is constituted by an electric motor and the actuator further includes a rotation-position sensor that detects a rotation position of the electric motor, the relative-rotation position of the two stabilizer bars may be obtained as a detection signal of the rotation-position sensor that represents the detected rotation position of the motor. The rotation-position sensor may be one that includes a Hall element and detects, with the Hall element, a change of a magnetic field, or one that includes an optical encoder.

(2) The stabilizer system according to the mode (1), wherein the reference-relative-rotation-position determining portion determines the reference relative-rotation position of the two stabilizer bars, based on at least one relative-rotationamount estimation basis physical quantity that can be used to estimate a relative-rotation amount of the two stabilizer bars counted from a neutral relative-rotation position thereof in which there is no relative rotation between the two stabilizer bars in a relative-rotation permitting state in which the actuator does not produce the driving force and the two stabilizer bars are permitted to be rotated relative to each other according to a change of a wheel-body-distance difference as a difference of (a) a first distance between one of the left and right wheels and the body and (b) a second distance between an other of the left and right wheels and the body.

The relative-rotation permitting state is established by the control device, i.e., by controlling the actuator not to apply the driving force to the two stabilizer bars. For example, in the case where the actuator employs, as the driving-force source, an electric motor, the control device operates for not supplying electric power to the electric motor, so that the motor is passively operated by the relative rotation of the two stabilizer bars. Alternatively, in the case where the actuator employs, e.g., an electromagnetic clutch to connect the driving-force source and the two stabilizer bars to each other, the control device operates for controlling the clutch to disconnect the driving-force source from the stabilizer bars, so that the driving force of the driving-force source may not be transmitted to the stabilizer bars.

In the relative-rotation permitting state, generally, the two stabilizer bars are rotated relative to each other, according to the change of the above-indicated wheel-body-distance difference. For example, if the wheel-body-distance difference is sufficiently small, it can be estimated that the relative-rotation position of the two stabilizer bars is near (or equal) to the neutral relative-rotation position thereof. The wheel-body-distance difference is largely related to the rolling amount of the vehicle's body. For example, as the rolling amount increases, the wheel-body-distance difference also increases; and as a centrifugal force exerted to the vehicle's body at the time of turning of the vehicle increases, the rolling amount increases and accordingly the wheel-body-distance difference also increases. On the other hand, when the vehicle is still on a horizontal, flat road surface, basically, the rolling amount and the wheel-body-distance difference are substantially equal to zero. Thus, the wheel-body-distance difference can be estimated based on the rolling amount or the centrifugal force; and whether the relative-rotation position of the two stabilizer bars is near to the neutral relative-rotation position thereof, and what amount of relative rotation of the two stabilizer bars is needed from the current relative-rotation position thereof to the neutral relative-rotation position thereof can be estimated based on the rolling amount or the centrifugal force. The relative-rotation-amount estimation basis physical quantity may be a rolling moment, a lateral (or side) acceleration, a rolling amount, a wheel-body-distance difference, or a physical quantity that can be used to estimate any of those specific physical quantities.

(3) The stabilizer system according to the mode (2), wherein the reference-relative-rotation-position determining portion determines the reference relative-rotation position of the two stabilizer bars, based on said at least one relative-rotation-amount estimation basis physical quantity comprising at least one of (a) a rolling-moment estimation basis physical quantity that can be used to estimate a rolling moment exerted to the body, and (b) a wheel-body-distance-difference estimation basis physical quantity that can be used to estimate the wheel-body-distance difference.

The rolling-moment estimation basis physical quantity may be a physical quantity that can be used to estimate an external-force-caused rolling moment that is caused to be exerted to the vehicle's body, by an external force such as the centrifugal force exerted thereto at the time of turning of the vehicle. In this case, the external-force-caused rolling moment does not reflect a rolling-restraining moment that is exerted to the vehicle's body by one or more constitutional elements of the vehicle in a direction to restrain the rolling of the body. The external-force-caused rolling moment may be estimated based on the lateral acceleration. That is, the rolling-moment estimation basis physical quantity may be the lateral acceleration or a physical quantity that can be used to estimate the lateral acceleration. The lateral acceleration may be an actual lateral acceleration that is detected by a lateral-acceleration sensor; or an estimated lateral acceleration that is obtained based on a steering angle, a yaw rate, and/or a running speed of the vehicle. The lateral-acceleration estimation basis physical quantity may be the steering angle itself or the yaw rate itself.

Alternatively, the rolling-moment estimation basis physical quantity may be a rolling acceleration of the vehicle's body, or a physical quantity that can be used to estimate the rolling acceleration. An actual rolling moment to roll actually the vehicle's body can be obtained based on the rolling acceleration. The above-indicated external-force-caused rolling moment can be estimated or obtained by adding the rolling-restraining moment to the actual rolling moment. The rolling-restraining moment may be a rolling-restraining moment exerted by one or more constitutional elements of the vehicle such as one or more suspension devices or one or more stabilizer devices. The rolling acceleration may be obtained based on a value or values detected by (a) a rolling-acceleration sensor that detects an acceleration of the vehicle's body in the rolling direction, (b) two vertical-direction acceleration sensors that are provided in left-side and right-side portions of the vehicle, respectively, or (c) two stroke sensors that detects respective distances of the left and right wheels from the vehicle's body (or respective amounts of movements of the left and right wheels toward, and away from, the body).

The wheel-body-distance-difference estimation basis physical quantity may be the wheel-body-distance difference itself, i.e., the difference of the distance between the left wheel and the vehicle's body and the distance between the right wheel and the body; the rolling amount; or a difference of respective heights of the left-side and right-side portions of the vehicle. The wheel-body-distance difference may be obtained based on respective values detected by the above-indicated two stroke sensors. The rolling amount may be obtained by integrating, twice, the acceleration detected by the above-indicated rolling-acceleration sensor. The difference of respective heights of the left-side and right-side portions of the vehicle may be obtained based on respective values detected by the above-indicated two vertical-direction acceleration sensors provided in the left-side and right-side portions of the vehicle.

(4) The stabilizer system according to the mode (3), wherein the reference-relative-rotation-position determining portion determines, when the actuator and the two stabilizer bars are in the relative-rotation permitting state, the reference relative-rotation position of the two stabilizer bars, based on said at least one relative-rotation-amount estimation basis physical quantity.

Since the two stabilizer bars are in the relative-rotation permitting state, a current relative-rotation position of the two stabilizer bars as counted from the neutral relative-rotation position thereof can be estimated based on the relative-rotation-amount estimation basis physical quantity. For example, if the relative-rotation-amount estimation basis physical quantity can be regarded as being zero, it can be estimated that the current relative-rotation position of the two stabilizer bars is near (or equal) to the neutral relative-rotation position thereof. This current relative-rotation position may be determined as the reference relative-rotation position of the two stabilizer bars; or alternatively, a relative-rotation position that is deviated by a predetermined relative-rotation amount from this current relative-rotation position may be determined as the reference relative-rotation position.

According to this mode, if the two stabilizer bars are in the relative-rotation permitting state, then the reference relative-rotation position thereof can be determined even when the vehicle is running, and accordingly the two stabilizer bars can exhibit an appropriate rolling-restraining effect. The relative-rotation permitting state is established by the control device, for example, when the reference relative-rotation position is to be determined, or each time a predetermined condition is met.

(5) The stabilizer system according to the mode (4), wherein in a first state in which said at least one relative-rotation-amount estimation basis physical quantity has exceeded a control-start-timing reference value indicating a timing to start the rolling-restraining control, the rolling-restraining control portion performs the rolling-restraining control and, in a second state in which said at least one relative-rotation-amount estimation basis physical quantity has not exceeded the control-start-timing reference value, the rolling-restraining control portion places the two stabilizer bars in the relative-rotation permitting state.

When the relative-rotation-amount estimation basis physical quantity has not exceeded the control-start-timing reference value, the rolling-restraining control portion does not perform the rolling-restraining control, and places the two stabilizer bars in the relative-rotation permitting state. Therefore, if the two stabilizer bars are in the relative-rotation permitting state, then the reference relative-rotation position thereof can be determined even when the vehicle is running. In many cases, if the relative-rotation-amount estimation basis physical quantity has not exceeded the control-start-timing reference value, then the rolling amount or the rolling moment is considerably small and accordingly the necessity of performing the rolling-restraining control is low. Therefore, even though the two stabilizer bars may be placed in the relative-rotation permitting state when the relative-rotation-amount estimation basis physical quantity has not exceeded the control-start-timing reference value, the rolling-restraining effect of the two stabilizer bars is not damaged. According to this mode, the relative-rotation-amount estimation basis physical quantity is used as a control-start-timing determination basis quantity. Conversely, it can be said that the relative-rotation-amount estimation basis physical quantity is used as a relative-rotation-permitting-timing determination basis quantity that can be used to determine a timing when the two stabilizer bars are placed in the relative-rotation permitting state.

According to this mode, for example, when the necessity of performing the rolling-restraining control is low, i.e., when the vehicle can be regarded as being running straight, the two stabilizer bars can be placed in the relative-rotation permitting state. Therefore, for example, a value of the relative-rotation-amount estimation basis physical quantity that is not equal to zero but indicates a state in which the vehicle can be regarded as being running straight, can be determined as the control-start-timing reference value. Thus, in the state in which the vehicle can be regarded as being running straight and accordingly the necessity of performing the rolling-restraining control is low, the two stabilizer bars are placed in the relative-rotation permitting state in which the reference relative-rotation position thereof can be determined.

(6) The stabilizer system according to the mode (5), wherein the rolling-restraining control portion includes a target-relative-rotation-amount determining portion which determines the target relative-rotation amount of the two stabilizer bars, based on a target-relative-rotation-amount determination basis quantity that can be used to determine the target relative-rotation amount, and wherein said at least one relative-rotation-amount estimation basis physical quantity comprises the rolling-moment estimation basis physical quantity, and the target-relative-rotation-amount determination basis quantity comprises the rolling-moment estimation basis physical quantity as said at least one relative-rotation-amount estimation basis physical quantity.

According to this mode, the rolling-restraining control portion uses, as the relative-rotation-amount estimation basis physical quantity, the rolling-moment estimation basis physical quantity, and additionally uses the rolling-moment estimation basis physical quantity as the target-relative-rotation-amount determination basis quantity. For example, if the target relative-rotation amount is determined based on the external-force-caused rolling moment exerted to the vehicle's body, the two stabilizer bars can exhibit an appropriate rolling-restraining effect. In addition, according to this mode, the rolling-restraining control portion uses, as the above-described control-start-timing reference value (or the relative-rotation-permitting-timing determination basis quantity), the rolling-moment estimation basis physical quantity that is used as the target-relative-rotation-amount estimation basis physical quantity.

According to this mode, a value of the rolling-moment estimation basis physical quantity that indicates the state in which the vehicle can be regarded as being running straight, may be determined as the control-start-timing reference value. Therefore, the rolling-restraining control can be effectively prevented from being unnecessarily performed because of, e.g., small changes of the rolling-moment estimation basis physical quantity, or noise, when the vehicle is running straight.

(7) The stabilizer system according to the mode (5) or the mode (6), wherein the reference-relative-rotation-position determining portion determines the reference relative-rotation position of the two stabilizer bars, when said at least one relative-rotation-amount estimation basis physical quantity increases and exceeds the control-start-timing reference value.

According to this mode, when the relative-rotation-amount estimation basis physical quantity has not exceeded the control-start-timing reference value, the rolling-restraining control is not performed and accordingly the necessity of determining the reference relative-rotation position is low. Therefore, that the reference relative-rotation position is determined when the relative-rotation-amount estimation basis physical quantity increases and exceeds the control-start-timing reference value, means that the reference relative-rotation position of the two stabilizer bars is determined at an appropriate timing, i.e., when the rolling-restraining control is started. This advantage is also true with the following four modes (8) through (11). In a particular case where the mode (7) is combined with the mode (6), the reference relative-rotation position of the two stabilizer bars is determined when the rolling-moment estimation basis physical quantity increases and exceeds the control-start-timing reference value.

(8) The stabilizer system according to any of the modes (5) through (7), wherein the reference-relative-rotation-position determining portion determines the reference relative-rotation position of the two stabilizer bars, based on a relative-rotation position of the two stabilizer bars at a time when said at least one relative-rotation-amount estimation basis physical quantity increases and exceeds the control-start-timing reference value.

According to this mode, the reference-relative-rotation-position determining portion obtains a relative-rotation position of the two stabilizer bars when the relative-rotation-amount estimation basis physical quantity increases and exceeds the control-start-timing reference value. If, in the relative-rotation permitting state, the two stabilizer bars are permitted to be rotated relative to each other against a resistance of, e.g., the actuator including the driving-force source (e.g., an electric motor), then the two stabilizer bars may not be rotated relative to each other to the neutral relative-rotation position thereof because of the resistance of the actuator, even though the relative-rotation-amount estimation basis physical quantity may become equal to zero. In this case, if a relative-rotation position of the two stabilizer bars detected when the relative-rotation-amount estimation basis physical quantity becomes equal to zero is determined as the reference relative-rotation position, then different reference relative-rotation positions may be determined at a time after the vehicle's body has rolled in one direction and at a time after the body has rolled in the opposite direction, respectively, and it is not possible to predict in which direction the body will further roll. That is, it may be difficult to determine an appropriate reference relative-rotation position. In contrast, according to this mode, the reference relative-rotation position is determined based on a relative-rotation position of the two stabilizer bars detected at a timing when the relative-rotation-amount estimation basis physical quantity increases and exceeds the control-start-timing reference value. At this timing, it can be predicted that the direction in which the vehicle's body will then roll will not change. Thus, it is easy to determine an appropriate reference relative-rotation position of the two stabilizer bars.

(9) The stabilizer system according to any of the modes (5) through (8), wherein the reference-position determining portion determines, as the reference relative-rotation position of the two stabilizer bars, a relative-rotation position of the two stabilizer bars at a time when said at least one relative-rotation-amount estimation basis physical quantity increases and exceeds the control-start-timing reference value.

The present mode (9) is an example of the above-described mode (8). According to the mode (9), in the case where the reference relative-rotation position has not been determined yet, e.g., when the power of the vehicle is turned on, a relative-rotation position of the two stabilizer bars detected when the relative-rotation-amount estimation basis physical quantity increases and eventually exceeds the control-start-timing reference value, i.e., immediately before the rolling-restraining control is started, may be determined as the reference relative-rotation position. Therefore, for example, even though the relative-rotation position of the two stabilizer bars detected immediately after the power of the vehicle is turned on and when the rolling-restraining control is started may largely differ from the neutral relative-rotation position thereof, the former relative-rotation position can be determined as the reference relative-rotation position, so that the two stabilizer bars can be prevented from being largely rotated relative to each other when the rolling-restraining control is started. Thus, the actuator can be smoothly operated.

(10) The stabilizer system according to any of the modes (5) through (9), wherein the reference-relative-rotation-position determining portion determines, as the reference relative-rotation position of the two stabilizer bars, a relative-rotation position of the two stabilizer bars that is distant, by a correction relative-rotation amount in a direction toward the neutral relative-rotation position thereof, from a relative-rotation position thereof at a time when said at least one relative-rotation-amount estimation basis physical quantity increases and exceeds the control-start-timing reference value.

This mode (10) is particularly advantageous because when the roll-restraining control is started, the two stabilizer bars are effectively prevented from being largely rotated relative to each other and accordingly the operation of the stabilizer system is smoothly performed. Generally, the target relative-rotation amount of the two stabilizer bars when the relative-rotation-amount estimation basis physical quantity exceeds the control-start-timing reference value, is not equal to zero. In this case, if a relative-rotation amount of the two stabilizer bars when the relative-rotation-amount estimation basis physical quantity increases and exceeds the control-start-timing reference value, is determined as the reference relative-rotation position, a shock may occur because the two stabilizer bars may be largely rotated relative to each other from the reference relative-rotation amount thereof to the target relative-rotation amount thereof immediately after the roll-restraining control is started. Hence, according to this mode, the reference relative-rotation position of the two stabilizer bars is determined as a relative-rotation position thereof that is distant, by a correction relative-rotation amount comparable to the target relative-rotation amount, from the relative-rotation position thereof when the relative-rotation-amount estimation basis physical quantity increases and exceeds the control-start-timing reference value. That is, the reference relative-rotation position is determined as a relative-rotation position that is distant by a correction relative-rotation amount in a direction toward the neutral relative-rotation position thereof from the above-indicated relative-rotation position. The correction relative-rotation amount may be determined, in advance, as an appropriate value that is experimentally obtained.

(11) The stabilizer system according to the mode (10), wherein the reference-relative-rotation-position determining portion determines, as the correction relative-rotation amount, the target relative-rotation amount of the two stabilizer bars at a time when said at least one relative-rotation-amount estimation basis physical quantity increases and exceeds the control-start-timing reference value.

According to this mode, the reference relative-rotation position of the two stabilizer bars is determined as a relative-rotation position thereof that is distant, by the target relative-rotation amount in the direction toward the neutral relative-rotation position thereof, from the relative-rotation position thereof when the relative-rotation-amount estimation basis physical quantity increases and exceeds the control-start-timing reference value. That is, the reference relative-rotation position of the two stabilizer bars is determined as the neutral relative-rotation position thereof immediately before the roll-restraining control is started.

(12) The stabilizer system according to any of the modes (3) through (5), wherein the reference-relative-rotation-position determining portion obtains, when the actuator and the two stabilizer bars are in the relative-rotation permitting state, a distance-difference-dependent relative-rotation amount of the two stabilizer bars that is a relative-rotation amount thereof, counted from the neutral relative-rotation position thereof, that corresponds to the wheel-body-distance-difference estimation basis physical quantity as said at least one relative-rotation-amount estimation basis physical quantity, and wherein the reference-relative-rotation-position determining portion determines the reference relative-rotation position of the two stabilizer bars, based on the obtained distance-difference-dependent relative-rotation amount thereof.

In this mode, the reference-relative-rotation-position determining portion obtains, in the relative-rotation permitting state, the distance-difference-dependent relative-rotation amount corresponding to the wheel-body-distance-difference estimation basis physical quantity, according to a relationship between (a) wheel-body-distance difference and (b) relative-rotation amount of the two stabilizer bars from the neutral relative-rotation position thereof. That is, the wheel-body-distance-difference estimation basis physical quantity as the relative-rotation-amount estimation basis physical quantity is used to estimate the relative-rotation amount of the two stabilizer bars from the neutral relative-rotation position thereof. For example, in the case where the neutral relative-rotation position of the two stabilizer bars is used as the reference relative-rotation position thereof, the reference relative-rotation position of the two stabilizer bars is determined as a relative-rotation position thereof that is distant from a current relative-rotation position thereof by the distance-difference-dependent relative-rotation amount thereof in a direction toward the neutral relative-rotation position thereof. However, according to the present mode, the reference relative-rotation position may be determined as either the neutral relative-rotation position thereof or a relative-rotation position thereof other than the neutral relative-rotation position.

According to the present mode, it is possible to determine the reference relative-rotation position of the two stabilizer bars, based on a relative-rotation amount thereof in a state in which the relative-rotation-amount estimation basis physical quantity has not exceeded a reference value. In this case, for example, in the state in which the wheel-body-distance-difference estimation basis physical quantity as the relative-rotation-amount estimation basis physical quantity has not exceeded the reference value, the two stabilizer bars may be placed in the relative-rotation permitting state, and the distance-difference-dependent relative-rotation amount thereof may be obtained based on the wheel-body-distance-difference estimation basis physical quantity. According to the present mode, the reference-relative-rotation-position determining portion can be said as a distance-difference-dependent-relative-rotation-amount-dependent reference-relative-rotation-position determining portion that determines the reference relative-rotation position of the two stabilizer bars, depending upon the distance-difference-dependent relative-rotation amount thereof.

(13) The stabilizer system according to the mode (12), wherein the reference-relative-rotation-position determining portion determines, as the reference relative-rotation position of the two stabilizer bars, a relative-rotation position of the two stabilizer bars that is distant, by the obtained, distance-difference-dependent relative-rotation amount thereof in a direction toward the neutral relative-rotation position thereof, from a relative-rotation amount thereof when the distance-difference-dependent relative-rotation amount thereof is obtained.

According to this mode, the neutral relative-rotation position of the two stabilizer bars is determined as the reference relative-rotation position thereof.

(14) The stabilizer system according to the mode (12) or the mode (13), wherein the rolling-restraining control portion comprises:

a target-relative-rotation-amount determining portion which determines the target relative-rotation amount of the two stabilizer bars, based on a target-relative-rotation-amount determination basis quantity that can be used to determine the target relative-rotation amount, the target-relative-rotation-amount determination basis quantity comprising the rolling-moment estimation basis physical quantity as said at least one relative-rotation-amount estimation basis physical quantity, and wherein in a first state in which the rolling-moment estimation basis physical quantity has exceeded a control-start-timing reference value indicating a timing to start the rolling-restraining control, the rolling-restraining control portion performs the rolling-restraining control and, in a second state in which the rolling-moment estimation basis physical quantity has not exceeded the control-start-timing reference value, the rolling-restraining control portion places the two stabilizer bars in the relative-rotation permitting state, so as to allow the reference-relative-rotation-position determining portion to determine the reference relative-rotation position of the two stabilizer bars.

According to this mode, when the rolling-moment estimation basis physical quantity has not exceeded the reference value, e.g., when the vehicle is running straight, the rolling-restraining control portion places the two stabilizer bars in the relative-rotation permitting state, so as to allow the reference-relative-rotation-position determining portion to determine the reference relative-rotation position of the two stabilizer bars.

(15) The stabilizer system according to any of the modes (12) through (14), further comprising a first stroke sensor and a second stroke sensor which detect the first distance between said one wheel and the body, and the second distance between said other wheel and the body, respectively, wherein the control device obtains the wheel-body-distance-difference estimation basis physical quantity based on the detected first and second distances.

A difference of the respective distances of the left and right wheels from the vehicle's body, i.e., a wheel-body-distance difference can be estimated based on a rolling amount of the body. However, if it is needed to estimate accurately the wheel-body-distance difference when the vehicle is running on a road surface having irregularity, it is preferred to employ the stroke sensors that detect the respective distances of the left and right wheels from the body.

(16) The stabilizer system according to any of the modes (1) through (15), wherein the reference-relative-rotation-position determining portion determines a plurality of said reference relative-rotation positions of the two stabilizer bars, wherein the control device further comprises a stop-time-information storing portion which stores, when the vehicle is stopped and a power of the vehicle is turned off, first stopped-vehicle-posture information representing a first posture of the vehicle in a stopped state thereof, and reference-position information that can be used to obtain a current one of the reference relative-rotation positions of the two stabilizer bars, and wherein the reference-relative-rotation-position determining portion obtains, when the power of the vehicle is turned on, second stopped-vehicle-posture information representing a second posture of the vehicle in the stopped state thereof and, when the second stopped-vehicle-posture information is identical with the stored first stopped-vehicle-posture information, the reference-relative-rotation-position determining portion determines a new one of the reference relative-rotation positions of the two stabilizer bars, based on the stored reference-position information.

Usually, a vehicle that is stopped in a garage or a parking lot has little chance of changing its posture. That is, there is little possibility that when a vehicle is in a stopped state thereof, a relative-rotation amount of two stabilizer bars counted from a reference relative-rotation position thereof may change. Therefore, in many cases, it can said that a start-time reference relative-rotation position of the two stabilizer bars can be appropriately determined based on the reference-position information stored by the stop-time-information storing portion (e.g., the relative-rotation amount of the two stabilizer bars counted from the stop-time reference relative-rotation position thereof). However, in a particular case where a heavy load is removed from the vehicle after the power of the vehicle is turned off, or the vehicle is moved by, e.g., a wrecker to a different place having a different land form, there is some possibility that the posture of the vehicle stopped may have changed, i.e., that the relative-rotation amount of the two stabilizer bars counted from the reference relative-rotation position thereof may have changed. Unless this problem is appropriately dealt with, an incorrect reference relative-rotation position would be determined and accordingly an inappropriate rolling-restraining effect would be exhibited.

According to this mode, if the second stopped-vehicle-posture information obtained when the power of the vehicle is turned on is equal to the first stopped-vehicle-posture information stored when the power of the vehicle is turned off, it is judged that the posture of the vehicle stopped has not changed, i.e., that the relative-rotation position of the two stabilizer bars has not changed during a time duration from the time when the power of the vehicle is turned off to the time when the power of the vehicle is again turned on. Consequently a start-time reference relative-rotation position of the two stabilizer bars is determined based on the reference-position information stored when the power of the vehicle is turned off. The reference-position information may be the relative-rotation amount of the two stabilizer bars counted from the reference relative-rotation position thereof or the neutral relative-rotation position thereof. More specifically described, the start-time reference relative-rotation position may be appropriately determined such that a relative-rotation amount of the two stabilizer bars counted from the start-time reference relative-rotation position is equal to the relative-rotation amount of the two stabilizer bars counted from the stop-time reference relative-rotation position.

Thus, according to this mode, a reference relative-rotation position of the two stabilizer bars may be determined based on the relative-rotation amount thereof stored when the power of the vehicle is turned off. Therefore, the reference relative-rotation position can be quickly determined. In addition, according to this mode, if the posture of the vehicle stopped has changed because a heavy load is removed from the vehicle, or because the vehicle is moved by a wrecker, after the power of the vehicle is turned off, then the second stopped-vehicle-posture information differs from the stored first stopped-vehicle-posture information. Thus, it is judged that the relative-rotation position of the two stabilizer bars has changed and accordingly determination of an incorrect reference relative-rotation position thereof is prevented. However, if the second stopped-vehicle-posture information differs from the stored first stopped-vehicle-posture information, the reference relative-rotation position may be determined without using the stored first stopped-vehicle-posture information, as will be described later, or alternatively a temporary reference relative-rotation position may be determined. Thus, the reference-relative-rotation-position determining portion can be said as a stopped-vehicle-posture-information-dependent reference-relative-rotation-position determining portion that determines a reference relative-rotation position of the two stabilizer bars, depending upon the first and second stopped-vehicle-posture information.

(17) The stabilizer system according to the mode (16), wherein the control device obtains, as each of the first stopped-vehicle-posture information and the second stopped-vehicle-posture information, a rolling-amount estimation basis physical quantity that can be used to estimate a rolling amount of the body.

The rolling-amount estimation basis physical quantity may be an actual lateral acceleration that is detected by a lateral-acceleration sensor. The lateral-acceleration sensor detects an actual lateral acceleration of the vehicle that is caused by a gravitational acceleration in a state in which the vehicle's body is rolling. Based on the actual lateral acceleration detected by the lateral-acceleration sensor, it is possible to judge whether the posture of the vehicle stopped has changed during the time duration from the time when the power of the vehicle is turned off to the time when the power of the vehicle is turned on. Alternatively, the rolling-amount estimation basis physical quantity may be respective distances of the left and right wheels from the vehicle's body. The rolling amount of the vehicle can be estimated based on a difference of the two wheel-body distances. That is, based on the wheel-body-distance difference, it is possible to judge whether the posture of the vehicle stopped has changed during the above-indicated time duration. The respective distances of the two wheels from the vehicle's body may be detected by two stroke sensors that detect respective distances between the two wheels (or two wheel-support members that support the two wheels, respectively) and respective portions of the body. Otherwise, the rolling-amount estimation basis physical quantity may be respective heights from road surface of respective portions of the vehicle's body that correspond to the left and right wheels and that are detected by two body-height sensors. The rolling amount of the vehicle can be estimated based on a difference of the respective body heights detected by the two body-height sensors. Based on the body-height difference, it is possible to judge whether the posture of the vehicle stopped has changed during the above-indicated time duration.

(18) The stabilizer system according to the mode (16) or the mode (17), wherein the reference-relative-rotation-position determining portion determines the new reference relative-rotation position of the two stabilizer bars immediately after the power of the vehicle is turned on.

Since the start-time reference relative-rotation position is determined immediately after the power of the vehicle is turned on, an appropriate rolling-restraining effect can be exhibited immediately after the running of the vehicle is started.

(19) The stabilizer system according to any of the modes (16) through (18), wherein when the second stopped-vehicle-posture information is not identical with the stored first stopped-vehicle-posture information, the reference-relative-rotation-position determining portion determines the new reference relative-rotation position of the two stabilizer bars without using the stored reference-position information.

According to this mode, if the posture of the vehicle stopped has changed during the time duration from the time when the power of the engine is turned off to the time when the power of the engine is turned on, the start-time reference relative-rotation position of the two stabilizer bars is determined without using the stored reference-position information, i.e., in a different determining manner. The different determining manner is not limited to any specific manners. For example, the determining manner in accordance with the above-described mode (8) or the following mode (20) may be employed.

(20) The stabilizer system according to any of the modes (1) through (6), wherein the reference-relative-rotation-position determining portion determines a plurality of said reference relative-rotation positions of the two stabilizer bars, by continuously obtaining, in a straight-running state in which the vehicle is running straight, a plurality of said relative-rotation amounts of the two stabilizer bars each counted from a current one of the reference relative-rotation positions thereof, and updating the current reference relative-rotation position to a new one of the reference relative-rotation positions, based on a change of the continuously obtained relative-rotation amounts.

In the straight-running state of the vehicle, the left and right wheels may individually move toward, and away from, the body because of the irregularity of road surface, while the two stabilizer bars are rotated relative to each other. In this case, it can be said that the two stabilizer bars are rotated relative to each other around the neutral relative-rotation position thereof within a certain time duration, i.e., a time duration in which the two wheels continue moving toward, and away from, the body. According to this mode, the neutral relative-rotation position may be determined, by, e.g., a statistical analysis, based on the change of the relative-rotation amounts, each counted from the current reference relative-rotation position, that are continuously obtained in the straight-running state. More specifically described, an average of the relative-rotation amounts obtained in a certain time duration may be determined as the neutral relative-rotation position, and the thus determined neutral relative-rotation position, or a relative-rotation position distant from the neutral relative-rotation position by a correction relative-rotation amount in an appropriate direction may be determined as the reference relative-rotation position. Thus, according to the present mode, the reference-relative-rotation-position determining portion updates the current reference relative-rotation position to a new reference relative-rotation position, depending upon the time-wise change of the relative-rotation amounts each counted from the current reference relative-rotation position. A state of the vehicle in which the vehicle can be regarded as being running straight can be regarded as the straight-running state of the vehicle recited in the present mode. In addition, the current reference relative-rotation position may be a proper reference relative-rotation position that has been appropriately determined, or a temporary reference relative-rotation position that has not been appropriately determined.

(21) The stabilizer system according to the mode (20), wherein the rolling-restraining control portion recognizes, as the straight-running state of the vehicle, a state in which a rolling-moment estimation basis physical quantity that can be used to estimate a rolling moment exerted to the body does not exceed a straight-running-state reference value, and wherein when the rolling-restraining control portion recognizes the straight-running state of the vehicle, the rolling-restraining control portion does not perform the rolling-restraining control and places the two stabilizer bars in a relative-rotation permitting state in which the actuator does not produce the driving force and the two stabilizer bars are permitted to be rotated relative to each other according to a change of a wheel-body-distance difference as a difference of (a) a first distance between one of the left and right wheels and the body and (b) a second distance between an other of the left and right wheels and the body.

According to this mode, when the straight-running state of the vehicle is recognized, the two stabilizer bars are placed in the relative-rotation permitting state. Therefore, when the wheel-body-distance difference more or less increases because the vehicle runs on the road surface whose irregularity does not so largely influence the rolling of the vehicle's body, the left and right wheels are permitted to move toward, and away from, the body by the two stabilizer bars, so that a driver of the vehicle can enjoy an excellent driving comfort. The rolling-moment estimation basis physical quantity has been described above with respect to the mode (3). Thus, for example, a running state of the vehicle in which the lateral acceleration or the steering amount is substantially zero, may be recognized as the straight-running state of the vehicle. The straight-running-state reference value may be set at a value not greater than the control-start-timing reference value described above with respect to the mode (5).

(22) The stabilizer system according to the mode (20) or the mode (21), wherein the reference-relative-rotation-position determining portion stores the plurality of relative-rotation amounts of the two stabilizer bars, each counted from the current reference relative-rotation position thereof, that are continuously obtained within a reference time duration, obtains an average of at least one local maximum and at least one local minimum of the stored relative-rotation amounts, and determines, as the new reference relative-rotation position of the two stabilizer bars, a relative-rotation position thereof that is distant, by said average, from the current reference relative-rotation position thereof.

According to this mode, at least one local maximum and at least one local minimum of the stored relative-rotation amounts are identified, and an average of the thus identified local maximum and minimum relative-rotation amounts is used to determine the new reference relative-rotation position.

(23) The stabilizer system according to any of the modes (1) through (22), wherein the control device obtains, as a positive value, a relative-rotation position of the two stabilizer bars at a time when one of the left and right wheels is nearer to the body than an other of the left and right wheels, and obtains, as a negative value, a relative-rotation position of the two stabilizer bars at a time when said one wheel is remoter from the body than said other wheel.

According to this mode, a sign (i.e., plus or minus) of the relative-rotation amount of the two stabilizer bars indicates in which direction the two stabilizer bars are rotated relative to each other from the reference relative-rotation position thereof.

(24) The stabilizer system according to any of the modes (1) through (23), wherein from a time when the power of the vehicle is turned on, to a time when the reference-relative-rotation-position determining portion determines the reference relative-rotation position of the two stabilizer bars, the rolling-restraining control portion does not perform the rolling-restraining control and places the two stabilizer bars in a relative-rotation permitting state in which the actuator does not produce the driving force and the two stabilizer bars are permitted to be rotated relative to each other according to a change of a wheel-body-distance difference as a difference of (a) a first distance between one of the left and right wheels and the body and (b) a second distance between an other of the left and right wheels and the body.

According to this mode, after the vehicle starts running, the rolling-restraining control portion does not perform the rolling-restraining control till the reference-relative-rotation-position determining portion determines the reference relative-rotation position, because during that time duration the necessity of performing the rolling-restraining control is low. Therefore, the rolling-restraining control can be prevented from being performed using, e.g., an incorrect reference relative-rotation position of the two stabilizer bars.

(25) The stabilizer system according to the mode (1), wherein when the vehicle is in a turning state in which the vehicle is turning, the reference-relative-rotation-position determining portion judges, based on (a) a lateral-acceleration estimation basis physical quantity that can be used to estimate a lateral acceleration of the body and (b) a wheel-body-distance-difference estimation basis physical quantity that can be used to estimate a wheel-body-distance difference as a difference of a first distance between one of the left and right wheels and the body and a second distance between an other of the left and right wheels and the body, whether the rolling-restraining effect of the two stabilizer bars is excessively high and whether the rolling-restraining effect of the two stabilizer bars is insufficiently low, and determines the reference relative-rotation position of the two stabilizer bars so as to decrease the rolling-restraining effect thereof when the rolling-restraining effect thereof is excessively high and increase the rolling-restraining effect thereof when the rolling-restraining effect thereof is insufficiently low.

According to this mode, the reference relative-rotation position of the two stabilizer bars is determined when the vehicle is in the turning state, i.e., when the rolling-restraining control is performed. A theoretical rolling-restraining moment that is produced, in the turning state of the vehicle, by the suspension device and the stabilizer system of the vehicle according to each of a rolling amount and a lateral acceleration of the vehicle's body is known. Therefore, the rolling amount of the body can be estimated based on the lateral acceleration estimation basis physical quantity. In addition, an actual rolling amount of the body can be obtained based on the wheel-body-distance-difference estimation basis physical quantity. Thus, based on the lateral-acceleration estimation basis physical quantity and the wheel-body-distance-difference estimation basis physical quantity, it is possible to judge whether the actual rolling amount is smaller, or greater, than the estimated rolling amount. Therefore, the reference-relative-rotation-position determining portion can judge whether the rolling-restraining effect of the two stabilizer bars is excessively high or insufficiently low because the current reference relative-rotation position is not appropriate.

More specifically described, for example, based on a rate of increase of the actual rolling amount when the actual rolling amount becomes equal to a reference rolling amount (e.g., a rolling amount that is equal to from one second, to one third, of the target rolling amount, or a considerably small rolling amount that is pre-determined irrespective of the target rolling amount), it is possible to judge whether the rolling-restraining effect is excessively high or insufficiently low. For example, if the rate of increase of the actual rolling amount is smaller, by more than a first reference amount, than a reference rate of increase corresponding to a reference lateral acceleration estimation basis physical quantity, it is possible to judge that the rolling-restraining effect is excessively high; and if the actual rate of increase is greater, by more than a second reference amount, than the reference rate of increase, it is possible to judge that the rolling-restraining effect is insufficiently low.

The current, inappropriate reference relative-rotation position of the two stabilizer bars is changed to a relative-rotation position thereof that is distant from the current reference relative-rotation position by a certain relative-rotation amount. The certain relative-rotation amount may be a considerably small relative-rotation amount. In this case, however, the inappropriate reference relative-rotation position may not be changed to an appropriate reference relative-rotation position, if the changing of the inappropriate reference relative-rotation position by the small amount is just one time. However, if the changing of the inappropriate reference relative-rotation position by the small amount is repeated a plurality of times, then the inappropriate reference relative-rotation position can be changed to an appropriate reference relative-rotation position. The lateral acceleration estimation basis physical quantity may be a lateral acceleration directly detected by a lateral-acceleration sensor, or may be a lateral acceleration estimated based on a steering angle, a yaw rate and/or a vehicle's running speed. In addition, the lateral acceleration estimation basis physical quantity may be the steering angle or the yaw rate. Since the wheel-body-distance-difference estimation basis physical quantity has been described above, it is not described here.

(26) The stabilizer system according to the mode (25), wherein the reference-relative-rotation-position determining portion recognizes, based on at least one of (a) the lateral-acceleration estimation basis physical quantity and (b) the wheel-body-distance-difference estimation basis physical quantity, that the vehicle is in a steady-turning state in which the vehicle is turning steadily, and determines, when the vehicle is in the steady-turning state, the reference relative-rotation position of the two stabilizer bars.

In the steady-turning state of the vehicle, the rolling amount of the vehicle's body is substantially constant. In this state, therefore, the rolling moment that is caused by the centrifugal force exerted to the body to roll the body is balanced by the rolling-restraining moment produced by the two stabilizer bars and the suspension springs of the vehicle. Thus, in this state, the excessiveness or insufficiency of the rolling-restraining effect of the two stabilizer bars can be easily recognized and accordingly the reference relative-rotation position of the two stabilizer bars can be appropriately determined.

(27) The stabilizer system according to the mode (26), wherein the reference-relative-rotation-position determining portion determines a plurality of said reference relative-rotation positions of the two stabilizer bars, wherein based on (a) an actual rolling amount of the body that is obtained, in the steady-turning state of the vehicle, based on the wheel-body-distance-difference estimation basis physical quantity, and (b) a target rolling amount of the body as a pre-set target amount corresponding to the lateral-acceleration estimation basis physical quantity, the reference-relative-rotation-position determining portion obtains, when the rolling-restraining effect of the two stabilizer bars is excessively high, an excessive amount of the relative-rotation amount of the two stabilizer bars counted from a neutral relative-rotation position thereof in which there is no rotation between the two stabilizer bars, and obtains, when the rolling-restraining effect is insufficiently low, an insufficient amount of the relative-rotation amount of the two stabilizer bars, and wherein the reference-relative-rotation-position determining portion updates, when the rolling-restraining effect of the two stabilizer bars is excessively high, a current one of the reference relative-rotation positions of the two stabilizer bars to a new one of the reference relative-rotation positions that is distant from the current reference relative-rotation position by the excessive amount so as to decrease the rolling-restraining effect, and updates, when the rolling-restraining effect is insufficiently low, the current reference relative-rotation position to the new reference relative-rotation position that is distant from the current reference relative-rotation position by the insufficient amount so as to increase the rolling-restraining effect.

According to this mode, the excessive or insufficient relative-rotation amount of the two stabilizer bars is obtained based on the actual rolling amount, and the target rolling amount, of the vehicle's body. For example, in the case where the actual rolling amount is greater than the target rolling amount, it can be said that because the twisting amount of the two stabilizer bars is insufficiently small, the rolling-restraining force produced by the two stabilizer bars according to the rolling amount of the vehicle's body is insufficiently small, i.e., the rolling-restraining effect of the two stabilizer bars is insufficiently low, and that the twisting amount of the two stabilizer bars is insufficiently small because the current relative-rotation amount of the two stabilizer bars counted from the neutral relative-rotation position thereof is insufficiently small. In other words, because the current reference relative-rotation position of the two stabilizer bars is not appropriate, the current relative-rotation amount thereof from the neutral relative-rotation position thereof is insufficiently small. In this case, a new relative-rotation amount of the two stabilizer bars is determined such that the current relative-rotation amount thereof recognized by the control device, i.e., measured from the current reference relative-rotation position thereof is decreased. Consequently the current relative-rotation amount of the two stabilizer bars counted from the neutral relative-rotation position thereof is increased, and the twisting amount thereof is made appropriate. The excessive or insufficient relative-rotation amount of the two stabilizer bars may be obtained based on a rolling-amount difference, i.e., a difference of the actual rolling amount, and the target rolling amount, of the vehicle's body. In addition, the present mode may be embodied such that when the rolling-amount difference exceeds a threshold value, an excessive or insufficient relative-rotation amount of the two stabilizer bars is obtained and a new reference relative-rotation position thereof is so determined as to decrease the excessive or insufficient relative-rotation amount.

(28) The stabilizer system according to the mode (26) or the mode (27), wherein the reference-relative-rotation-position determining portion determines a plurality of said reference relative-rotation positions of the two stabilizer bars, wherein based on (a) a difference of a rolling-restraining force produced by the two stabilizer bars in the steady-turning state of the vehicle, and a rolling-restraining force to be produced by the two stabilizer bars in a state in which a rolling amount of the body is equal to a target rolling amount as a pre-set target amount corresponding to the lateral-acceleration estimation basis physical quantity, and (b) a difference of a rolling-restraining force produced by at least one constituent element of the vehicle other than the two stabilizer bars in the steady-turning state of the vehicle, and a rolling-restraining force to be produced by said at least one constituent element in the state in which the rolling amount of the body is equal to the target rolling amount, the reference-relative-rotation-position determining portion obtains, when the rolling-restraining effect of the two stabilizer bars is excessively high, an excessive amount of the relative-rotation amount of the two stabilizer bars from a neutral relative-rotation position thereof in which there is no rotation between the two stabilizer bars, and obtains, when the rolling-restraining effect is insufficiently low, an insufficient amount of the relative-rotation amount of the two stabilizer bars, and wherein the reference-relative-rotation-position determining portion updates, when the rolling-restraining effect of the two stabilizer bars is excessively high, a current one of the reference relative-rotation positions to a new one of the reference relative-rotation positions that is distant from the current reference relative-rotation position by the excessive amount, so as to decrease the rolling-restraining effect, and updates, when the rolling-restraining effect is insufficiently low, the current reference relative-rotation position to the new reference relative-rotation position that is distant from the current reference relative-rotation position by the insufficient amount, so as to increase the rolling-restraining effect.

According to this mode, with regard to each of (a) the two stabilizer bars and (b) one or more constituent elements (e.g., suspension springs) of the vehicle other than the two stabilizer bars (hereinafter, simply referred to as the "other constituent elements", where appropriate), a difference of (c) a rolling-restraining force produced by each of the two stabilizer bars when the vehicle is in the steady-turning state and (d) a rolling-restraining force produced by said each stabilizer bar when the actual rolling amount of the vehicle's body is equal to the target rolling amount thereof is obtained. Based on the thus obtained, two differences, an excessive or insufficient amount of the rolling-restraining force can be obtained; based on the thus obtained excessive or insufficient amount of the rolling-restraining force, an excessive or insufficient twisting amount of the two stabilizer bars can be obtained; and based on the thus obtained excessive or insufficient twisting amount, an excessive or insufficient relative-rotation amount of the two stabilizer bars can be obtained. The above-indicated difference of the above-indicated two rolling-restraining forces produced by each of (a) the two stabilizer bars and (b) the other constituent elements, are caused by the above-described rolling-amount difference, and can be theoretically obtained or calculated. Alternatively, the two differences may be experimentally obtained and stored in a storage portion (e.g., a memory) of the control device. However, the excessive or insufficient relative-rotation amount of the two stabilizer bars may be obtained based on the rolling-amount difference.

(29) The stabilizer system according to any of the modes (1) through (28), wherein the driving-force source of the actuator comprises a motor which outputs a rotation to be transmitted to the two stabilizer bars so as to rotate the two stabilizer bars relative to each other, wherein the rolling-restraining control portion obtains the relative-rotation amount of the two stabilizer bars counted from the reference relative-rotation position thereof, based on a rotation amount of the motor, according to a known relationship between rotation amount of the motor and relative-rotation amount of the two stabilizer bars from the reference relative-rotation position thereof, and wherein the reference-relative-rotation-position determining portion determines a plurality of said reference relative-rotation positions of the two stabilizer bars, and updates, when an error occurs to the known relationship, a current one of the reference relative-rotation positions to a new one of the reference relative-rotation positions such that the new reference relative-rotation position is distant from the current reference relative-rotation position by a relative-rotation amount of the two stabilizer bars that corresponds to the error.

According to this mode, the rolling-restraining control portion obtains the relative-rotation amount of the two stabilizer bars, based on the rotation amount of the motor (e.g., an electric motor). Usually, a motor that is controlled by a controller is provided with a rotation-position sensor that detects a rotation position of the motor. In the case where the motor of the actuator is provided with a rotation-position sensor, a detection signal supplied by the single rotation-position sensor can be used to not only control the motor itself but also obtain the relative-rotation amount of the two stabilizer bars. Therefore, the cost of the present stabilizer system can be reduced as compared with the case where an additional rotation-position sensor is employed.

The motor may be connected to the two stabilizer bars via a reduction gear device that transmits the driving force of the motor to the stabilizer bars while amplifying the driving force. However, when the driving force of the motor is transmitted to the stabilizer bars, a tooth jumping may occur to the reduction gear device. The tooth jumping is such a phenomenon that a plurality of gears of the reduction gear device are instantaneously disengaged from each other and accordingly the motor slips, i.e., rotates excessively. Thus, an error occurs to a known relationship between rotation amount of the motor and relative-rotation amount of the two stabilizer bars. If this erroneous relationship is used as it is, then an erroneous relative-rotation amount of the two stabilizer bars counted from the reference relative-rotation position thereof would be obtained, and accordingly an inappropriate rolling-restraining effect would be exhibited. Alternatively, the motor may be connected to the two stabilizer bars via a driving-force-transmission-state switching device such as an electromagnetic clutch. In this case, for example, the electromagnetic clutch is used to place selectively the motor in (a) a driving-force transmitting state in which the driving force thereof is transmitted to the stabilizer bars and (b) a driving-force-transmission inhibiting state in which the driving force is inhibited from being transmitted to the stabilizer bars. However, if the electromagnetic clutch may slip in the driving-force transmitting state of the motor, then an error would occur to the known relationship between rotation amount of the motor and relative-rotation amount of the two stabilizer bars, and accordingly an inappropriate rolling-restraining effect would be exhibited, like in the case of the occurrence of tooth jumping.

As is apparent from the above-indicated examples, there are some cases where an error occurs to the known relationship between rotation amount of the motor and relative-rotation amount of the two stabilizer bars and accordingly an inappropriate rolling-restraining effect is exhibited. In contrast, according to this mode, the reference-relative-rotation-position determining portion updates, when an error occurs to the known relationship between rotation amount of the motor and relative-rotation amount of the two stabilizer bars, the current reference relative-rotation position to a new reference relative-rotation position so as to correct the error and thereby enable the two stabilizer bars to exhibit an appropriate rolling-restraining effect. Thus, it can be said that the reference-relative-rotation-position determining portion is a sort of relative-rotation-amount-error-occurrence-time reference-relative-rotation-position determining portion that determines a reference relative-rotation position of the two stabilizer bars when an error occurs to the known relationship between rotation amount of the motor and relative-rotation amount of the two stabilizer bars, i.e., occurs to the relative-rotation amount of the two stabilizer bars.

(30) The stabilizer system according to the mode (29), wherein the control device recognizes the error by obtaining a rotation speed of the motor based on the rotation amount of the motor and judging that the obtained rotation speed has exceeded a reference rotation speed.

When the driving force of the motor is used to rotate the two stabilizer bars relative to each other, the two stabilizer bars are twisted and accordingly produce an elastic force against the driving force. Therefore, the motor can be prevented from being rotated at an excessively high speed as it is rotated freely, i.e., rotated without any load applied thereto. Meanwhile, if, e.g., a tooth jumping occurs to the reduction gear device, the elastic force against the driving force of the motor is not transmitted to the motor, so that the load applied to the motor is decreased and accordingly the rotation speed of the motor is largely increased. Thus, according to this mode, if the rotation speed of the motor has exceeded the reference rotation speed, the error recognizing portion recognizes that the tooth jumping has occurred to the reduction gear device. Otherwise, according to a mode different from this mode, it is possible to judge that an error has occurred to the relationship between rotation amount of the motor and relative-rotation amount of the two stabilizer bars, if a relative rotation speed of one of (a) a rotation speed of the motor before occurrence of tooth jumping and (b) a rotation speed of the motor at the time of occurrence of tooth jumping, relative to the other, exceeds a reference relative rotation speed.

(31) The stabilizer system according to any of the modes (1) through (30), wherein the driving-force source of the actuator comprises a motor which outputs a rotation, and a reduction gear device which receives the rotation outputted by the motor and outputs the received rotation, while reducing a speed of the rotation, so as to rotate the two stabilizer bars relative to each other, wherein the rolling-restraining control portion obtains the relative-rotation amount of the two stabilizer bars from the reference relative-rotation position thereof, based on a rotation amount of the motor, according to a known relationship between rotation amount of the motor and relative-rotation amount of the two stabilizer bars from the reference relative-rotation position thereof, and wherein the reference-relative-rotation-position determining portion determines a plurality of said reference relative-rotation positions of the two stabilizer bars, and updates, when a tooth jumping occurs to the reduction gear device and accordingly an error occurs to the known relationship, a current one of the reference relative-rotation positions to a new one of the reference relative-rotation positions such that the new reference relative-rotation position is distant from the current reference relative-rotation position by a relative-rotation amount of the two stabilizer bars that corresponds to the error.

According to this mode, the motor is connected to the two stabilizer bars via the reduction gear device. Therefore, if a tooth jumping occurs to the reduction gear device, then an error may occur to the relationship between rotation amount of the motor and relative-rotation amount of the two stabilizer bars. However, according to this mode, the reference-relative-rotation-position determining portion updates, when an error occurs to the relationship between rotation amount of the motor and relative-rotation amount of the two stabilizer bars, the current reference relative-rotation position to a new reference relative-rotation position so as to correct the error and thereby enable the two stabilizer bars to exhibit an appropriate rolling-restraining effect. Thus, it can be said that the present reference-relative-rotation-position determining portion is a sort of reduction-gear-device-tooth-jumping-time reference-relative-rotation-position determining portion that determines a reference relative-rotation position of the two stabilizer bars when a tooth jumping occurs to the reduction gear device. The present mode (31) may be combined with the preceding mode (30) so as to judge that an error has occurred, because of the occurrence of tooth jumping to the reduction gear device, to the relationship between rotation amount of the motor and relative-rotation amount of the two stabilizer bars.

(32) The stabilizer system according to any of the modes (1) through (31), wherein the reference-relative-rotation-position determining portion determines, as the reference relative-rotation position of the two stabilizer bars, a relative-rotation position thereof to which the two stabilizer bars are rotated relative to each other, in a different-wheel-diameter state in which respective outer diameters of the left and right wheels are different from each other, according to a wheel-body-distance difference as a difference of (a) a first distance between one of the left and right wheels and the body and (b)

a second distance between an other of the left and right wheels and the body, the wheel-body-distance difference being caused by the different-wheel-diameter state.

The different-wheel-diameter state occurs, e.g., when a tire punctures, when an air pressure in a tire excessively lowers, or when a spare tire having a different outer diameter is worn. In the different-wheel-diameter state, the vehicle's body is inclined, and a distribution of the body's weight to the four wheels is changed, so that the above-indicated wheel-body-distance difference occurs. The wheel-body-distance difference changes the relative-rotation position of the two stabilizer bars in the relative-rotation permitting state. In addition, in the different-wheel-diameter state, the vehicle's body is rolled because of that state. Therefore, if the rolling-restraining control is performed, based on, e.g., a current lateral acceleration, to restrain this rolling, while using a reference relative-rotation position determined in a normal state different than the different-wheel-diameter state, then the rolling amount of the vehicle's body cannot be controlled to an appropriate amount. According to this mode, this problem can be solved. That is, according to this mode, the rolling-restraining control is performed using the reference relative-rotation position determined in the different-wheel-diameter state, and accordingly it can be performed in an appropriate manner.

It can be said that the phrase "a relative-rotation position thereof to which the two stabilizer bars are rotated relative to each other, . . . according to a wheel-body-distance difference . . . , the wheel-body-distance difference being caused by the different-wheel-diameter state", used in the recitation of the present mode, means a relative-rotation position thereof to which the two stabilizer bars are rotated relative to each other, . . . according to only the wheel-body-distance difference caused by the different-wheel-diameter state. This relative-rotation position may be either actually obtained based on an amount detected by a sensor that detects a relative-rotation amount of the two stabilizer bars, as will be described later, or obtained as a pre-set value corresponding to a specific sort of different-wheel-diameter state in which the two stabilizer bars are rotated relative to each other according to a known wheel-body-distance difference.

(33) The stabilizer system according to the mode (32), wherein the reference-relative-rotation-position determining portion obtains a relative-rotation position of the two stabilizer bars when the vehicle meets at least one of (a) a first condition that the vehicle can be regarded as being stopped on a horizontal, flat road and (b) a second condition that the vehicle can be regarded as being running straight on a horizontal, flat road and simultaneously when the vehicle is in a relative-rotation permitting state in which the actuator does not produce the driving force and the two stabilizer bars are permitted to be rotated relative to each other according to a change of the wheel-body-distance difference, and determines the obtained relative-rotation position of the two stabilizer bars, as the reference relative-rotation position thereof.

According to this mode, the reference relative-rotation position is determined based on the relative-rotation position of the two stabilizer bars that is actually detected in the different-wheel-diameter state. In this mode, the relative-rotation position of the two stabilizer bars that is to be used as a basis to determine the reference relative-rotation position thereof can be easily obtained. In addition, the reference relative-rotation position can be accurately determined.

Each of the first condition that the vehicle can be regarded as being stopped on a horizontal, flat road, and the second condition that the vehicle can be regarded as being running straight on a horizontal, flat road can be recognized by a driver based on his or her subjective judgment, or by the control device based on a value detected by, e.g., a vehicle-running-speed sensor and/or a steering-angle sensor. The obtained relative-rotation position of the two stabilizer bars may be a relative-rotation position thereof obtained at a time when the above-described condition is met, or an average of a plurality of relative-rotation positions thereof obtained within a continuous time duration in which the above-described condition is continuously met.

(34) The stabilizer system according to the mode (32) or the mode (33), wherein the control device further includes a different-wheel-diameter-state recognizing portion which recognizes the different-wheel-diameter state, and wherein the reference-relative-rotation-position determining portion determines the reference relative-rotation position of the two stabilizer bars based on the different-wheel-diameter state recognized by the different-wheel-diameter-state recognizing portion.

According to this mode, the different-wheel-diameter-state recognizing portion can automatically recognize the different-wheel-diameter state. In addition, if the relative-rotation position of the two stabilizer bars based on which the reference relative-rotation position thereof is determined is automatically obtained, then the reference relative-rotation position can be automatically determined. The different-wheel-diameter-state recognizing portion may recognize the different-wheel-diameter state in various manners, e.g., based on respective air pressures in respective tires of the two wheels, or a difference of respective rotation speeds of the two wheels in a straight-running state of the vehicle.

BEST MODE FOR CARRYING OUT THE INVENTION

Hereinafter, some embodiments of the present invention will be described by reference to the drawings. It is, however, noted that the present invention is not limited to the details of the following embodiments but may be embodied with various changes and improvements, such as those described in SUMMARY OF THE INVENTION, that may occur to a person skilled in the art.

1. First Embodiment 1.1 General Construction of Stabilizer System

Figure 1:
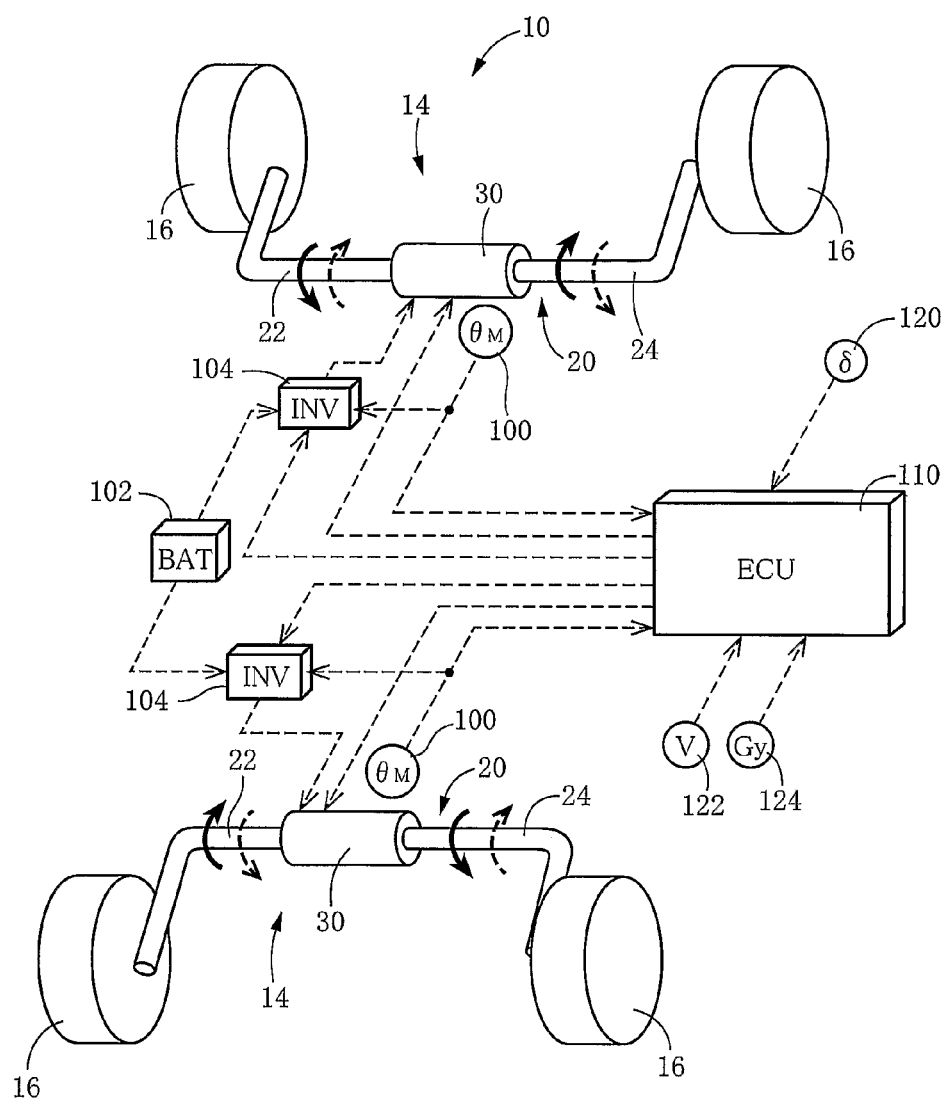
FIG. 1 is an illustrative view of a stabilizer system as a first embodiment of the present invention.

FIG. 1 illustratively shows a stabilizer system 10 for use in an automotive vehicle to which the present invention is applied. The stabilizer system 10 includes two stabilizer devices 14 one of which is provided on the side of two front wheels 16 and the other of which is provided on the side of two rear wheels 16. Each of the two stabilizer devices 14 includes a stabilizer bar unit 20 that is connected, at opposite ends thereof, to two wheel holding devices (FIG. 2) that hold the left and right wheels 16, respectively. The stabilizer bar unit 20 corresponds to two stabilizer bars which are connected to each other. More specifically described, the stabilizer bar unit 20 is divided, at a middle portion thereof, into two stabilizer bar members, i.e., a right stabilizer bar member 22 and a left stabilizer bar member 24. The right and left stabilizer bar members 22, 24 correspond to the two stabilizer bars. The two stabilizer bar members 22, 24 are connected to each other by an actuator 30, such that the two members 22, 24 are rotatable relative to each other. In short, in each stabilizer device 14, a vehicle-body-rolling restraining effect of the stabilizer bar unit 20 is changed by the actuator 30 that rotates the two stabilizer bar members 22, 24 relative to each other, as indicated by arrows in FIG. 1. Thus, each stabilizer device 14 can effectively restrain the rolling of the vehicle's body.

Figure 2:
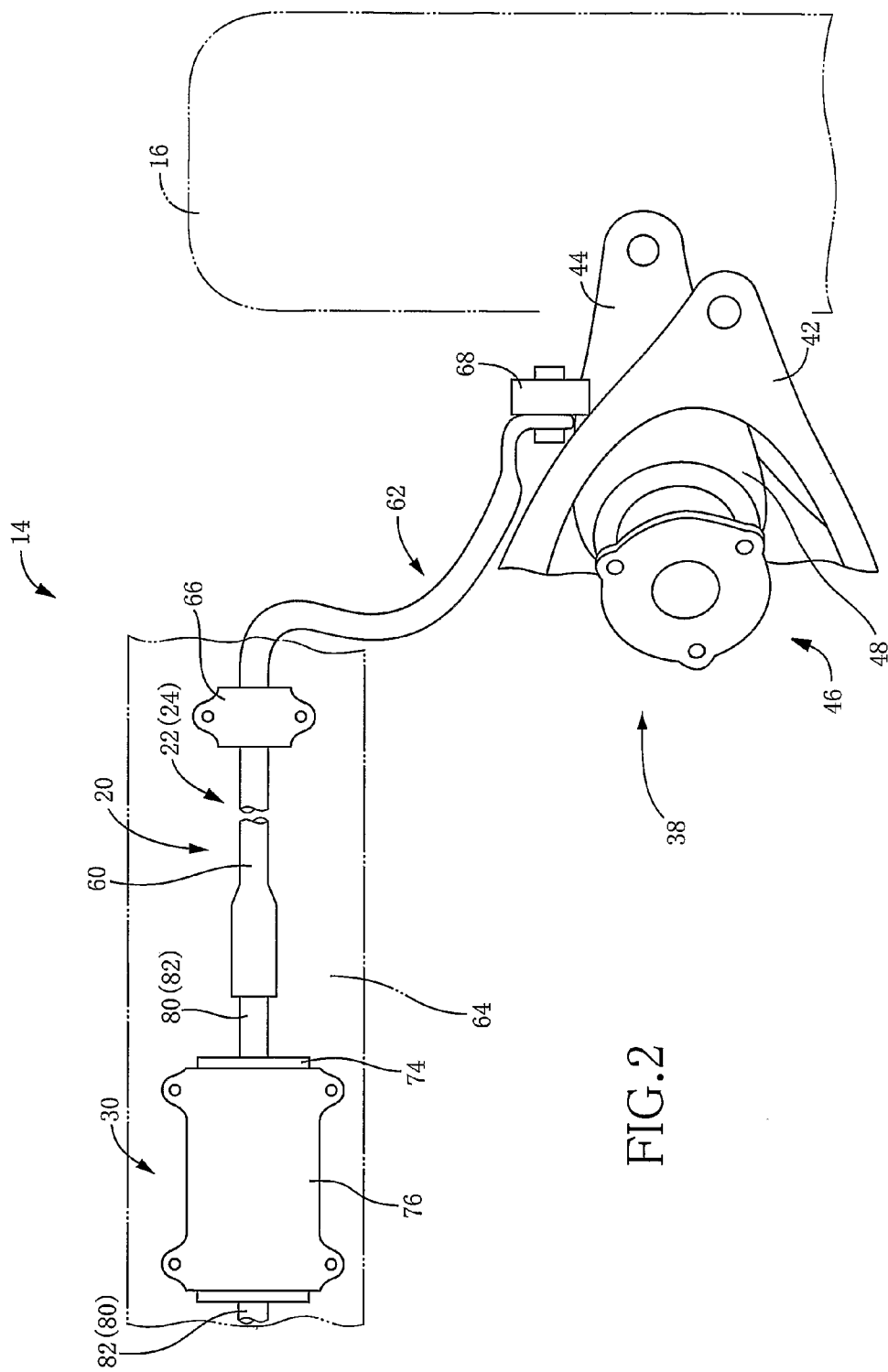
FIG. 2 is an illustrative view of a portion of the stabilizer system.

FIG. 2 illustratively shows a portion of each stabilizer device 14 that is located between a middle portion thereof as seen in a widthwise direction of the vehicle, and one of the left and right wheels 16. The vehicle employing the present stabilizer system 10 includes four independent suspension devices 38 that are associated with the four wheels 16, respectively, and that are well-known double wishbone suspension devices. More specifically described, each suspension device 38 is connected, at one end portion thereof, to the vehicle's body such that the suspension device 38 is rotatable relative to the body, and has, in the other end portion thereof, an upper arm 42 and a lower arm 44 that are connected to the corresponding wheel 16 and cooperate with each other to constitute the corresponding wheel holding device. When the wheel 16 and the vehicle's body move toward, and away from, each other, i.e., move relative to each other in a vertical direction, the upper and lower arms 42, 44 are rotated about the above-indicated one end portion of the suspension device 38, connected to the body, and the other end portion of the same 38, connected to the wheel 16, moves relative to the body in the vertical direction. Each suspension device 38 additionally includes a shock absorber 46 and a suspension spring 48 (i.e., air spring) each of which is connected, at one end portion thereof, to a mounting portion of the vehicle's body and is connected, at the other end portion thereof, to the lower arm 44. Thus, each suspension device 38 elastically connects the corresponding wheel 16 and the vehicle's body to each other, and produces a damping force to damp vibration generated when the wheel 16 and the body move toward, and away from, each other.

As described above, each stabilizer device 14 includes the right and left stabilizer bar members 22, 24 as the two stabilizer bars. FIG. 2 shows only one of the two stabilizer bar members 22, 24. Each of the two stabilizer bar members 22, 24 includes a torsion bar portion 60 that extends substantially in the widthwise direction of the vehicle; and an arm portion 62 that is integral with the torsion bar portion 60 and extends substantially in a frontward or rearward direction of the vehicle. The torsion bar portion 60 is supported, at a portion thereof near the arm portion 62, by a support member 66 fixed to a stabilizer-device mounting portion 64 as a portion of the vehicle's body, such that the torsion bar portion 60 is rotatable about an axis line thereof. The respective torsion bar portions 60 of the right and left stabilizer bar members 22, 24 are coaxial with each other. The actuator 30 is provided between respective inner end portions of the two torsion bar portions 60 as seen in the widthwise direction of the vehicle, such that each of the respective inner end portions is connected to the actuator 30, as will be described in detail later. An outer end portion of the arm portion 62 of each stabilizer bar member 22, 24 is connected to a stabilizer-bar connection portion 68 of the corresponding lower arm 44, such that the arm portion 62 is rotatable relative to the lower arm 44.

Figure 3:
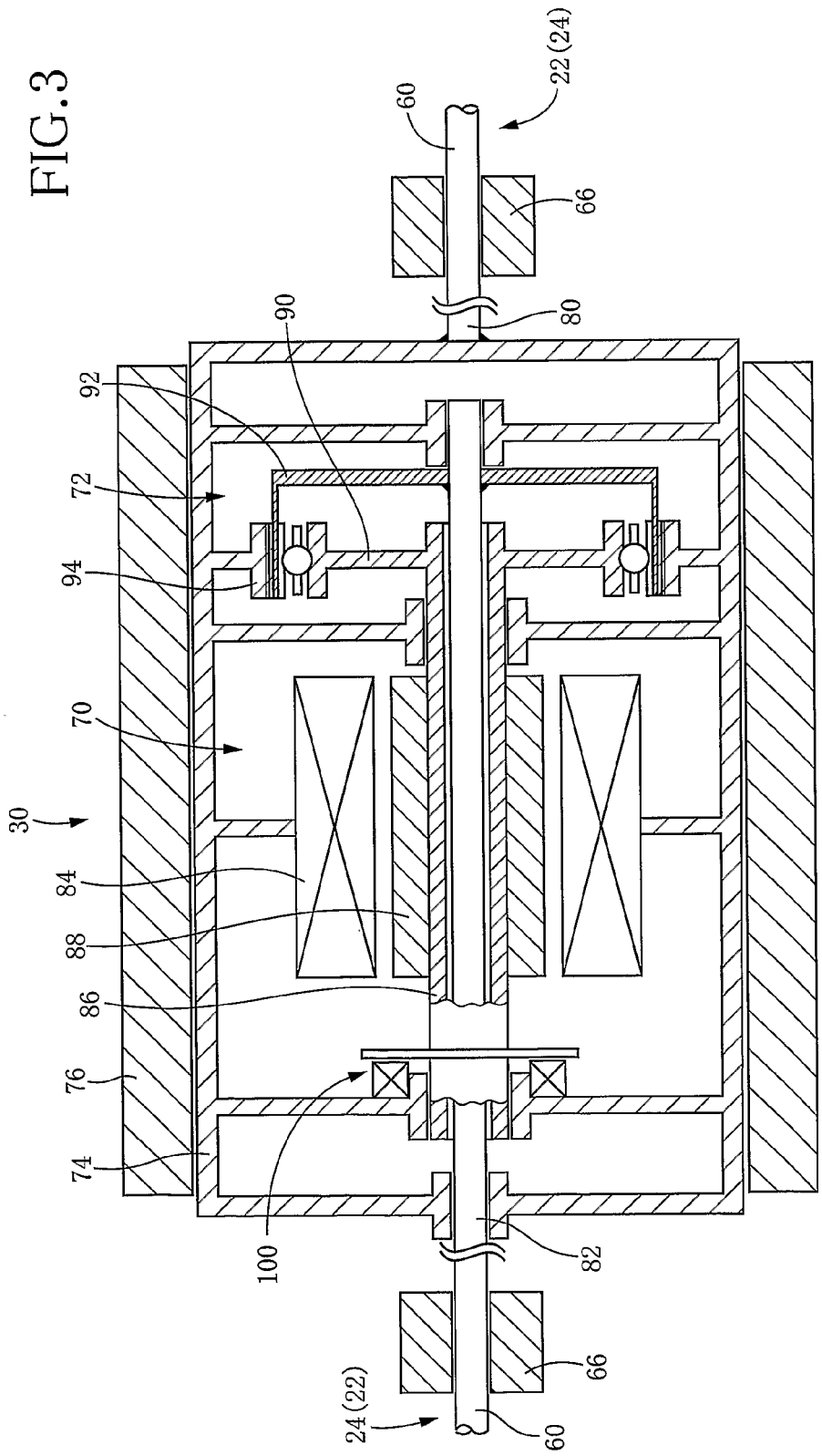
FIG. 3 is a cross-sectional view of an actuator of the stabilizer system.

As illustratively shown in FIG. 3, the actuator 30 includes an electric motor 70 as a driving-force source; and a reduction gear unit 72 that reduces a speed of a rotation produced by the motor 70. The electric motor 70 and the reduction gear unit 72 are provided in a housing 74 as a case member of the actuator 30. The housing 74 is held by the stabilizer-device mounting portion 64 via a housing holding member 76, such that the housing 74 is rotatable about an axis line thereof and is not movable in an axial direction thereof substantially parallel to the widthwise direction of the vehicle. As can be seen in FIG. 2, two output shafts 80, 82 project from two opposite ends of the housing 74, respectively. Respective outer end portions of the two output shafts 80, 82 are connected, by serration fitting, to respective inner end portions of the two stabilizer bar members 22, 24, such that each of the two output shafts 80, 82 is not rotatable relative to a corresponding one of the two stabilizer bar members 22, 24. In addition, as can be seen in FIG. 3, the first output shaft 80 is fixed to the housing 74; and the second output shaft 82 extends into the housing 74, such that the second output shaft 82 is rotatable relative to the housing 74 and is not movable in an axial direction thereof relative to the same 74. An inner end portion of the second output shaft 82, located in the housing 74, is connected to the reduction gear unit 72, as will be described later, and also functions as an output shaft of the same 72.

The electric motor 70 includes a plurality of stator coils 84 that are fixedly provided on a circle along an inner circumferential surface of a cylindrical wall of the housing 74; a hollow shaft 86 that is held by the housing 74 such that the hollow shaft 86 is rotatable about an axis line thereof; and a permanent magnet 88 that is fixedly provided on a circle along an outer circumferential surface of the hollow shaft 86 such that the permanent magnet 88 is opposed to the stator coils 84. The electric motor 70 is a three-phase DC brushless motor in which the stator coils 84 function as a stator and the permanent magnet 88 functions as a rotor.

The reduction gear unit 72 is constituted by a harmonic gear that is also called a harmonic drive (this is a registered trademark) or a strain wave gear ring, and includes a wave generator 90, a flexible gear (i.e., a flex spline) 92, and a ring gear (i.e., a circular spline) 94. The wave generator 90 includes an elliptic cam, and a ball bearing fitted on an outer circumferential surface of the elliptic cam, and is fixed to one end portion of the hollow shaft 86. The flexible gear 92 has a cup-like shape including an open end and an elastically deformable side wall, and has a plurality of teeth formed in an outer circumferential surface of a portion of the side wall that is located on the side of the open end. The flexible gear 92 is connected to, and is supported by, the above-described, second output shaft 82. More specifically described, the second output shaft 82 extends through the hollow shaft 86, and a bottom portion of the flexible gear 92 is fixed to one end portion of the second output shaft 82 that projects out of the hollow shaft 86. Thus, the flexible gear 92 is connected to the second output shaft 82. The ring gear 94 has a generally ring-like wall, and a plurality of teeth formed in an inner circumferential surface of the ring-like wall, and is fixed to the housing 74. A total number of the teeth of the ring gear 94 is somewhat greater than a total number of the teeth of the flexible gear 92. For example, the former number is greater by two than the latter number. The side wall of the flexible gear 92 externally fits on the wave generator 90, so that the side wall is elastically deformed to have an elliptic shape and only two portions of the side wall that are opposite to each other in a major-axis direction of the elliptic shape is meshed with the ring gear 94. If the wave generator 90 is fully rotated one time (i.e., 360 degrees), i.e., if the hollow shaft 86 of the electric motor 70 is fully rotated one time, then the flexible gear 92 and the ring gear 94 are rotated relative to each other by the difference (e.g., two) of the respective tooth numbers of the flexible gear 92 and the ring gear 94. Since the harmonic gear is known in the art, no detail illustration of the reduction gear unit 72 is provided in the drawings.

In the housing 74 of the actuator 30, there is provided a motor-rotation-angle sensor 100 that detects an angle of rotation of the hollow shaft 86 or the electric motor 70. The motor-rotation-angle sensor 100 is essentially constituted by an encoder, and an angle detected by this sensor 100 is utilized in switching the supplying, or stopping of supplying, of an electric current to the electric motor 70. In addition, since the angle detected by the sensor 100 indicates a relative-rotation amount (i.e., a relative-rotation angle) of the two stabilizer bar members 22, 24, i.e., an amount of operation of the actuator 30, the detected angle is also utilized in controlling the actuator 30, i.e., the body-rolling restraining effect of each stabilizer device 14.

A power source supplies an electric power to the electric motor 70 of the actuator 30. As shown in FIG. 1, the present stabilizer system 10 employs a battery 102, and two inverters 104 each of which is connected to the battery 102. Each of the two inverters 104 functions as a drive circuit, and supplies an electric power to the electric motor 70 of a corresponding one of the two stabilizer devices 14. Thus, the battery 102 and each one of the two inverters 104 cooperate with each other to constitute a power source that supplies an electric power to a corresponding one of the two electric motors 70. Since each electric motor 70 is driven with a constant electric voltage, an output power of the each motor 70 is changed by changing the electric current supplied thereto. More specifically described, the electric current supplied to each electric motor 70 is changed by the corresponding inverter 104 that changes, by pulse width modulation (PWM), a ratio (i.e., a duty ratio) of an ON time of each pulse to an OFF time thereof.

As shown in FIG. 1, the present stabilizer system 10 includes a stabilizer ECU (electronic control unit) 110 as a control device that controls an operation of the actuator 30 of each of the two stabilizer devices 14. The stabilizer ECU 110 is essentially constituted by a computer including a CPU (central processing unit), a ROM (read only memory), and a RAM (random access memory), and each of the above-described two motor-rotation-angle sensors 100, an operation-angle sensor 120, a vehicle-running-speed sensor 122, and a lateral-acceleration sensor 124 is connected to the ECU 110. The operation-angle sensor 120 detects, as an amount of operation of a steering member, i.e., a steering amount, an angle of operation of a steering wheel, not shown. The vehicle-running-speed sensor 122 detects a speed of running of the vehicle (hereinafter, referred to as the "vehicle's speed", where appropriate), and the lateral-acceleration sensor 124 detects an actual lateral acceleration of the vehicle's body. In FIG. 1, the sensors 100, 120, 122, and 124 are indicated by "$\theta_M$", "$\delta$", "V", and "Gy", respectively. The ECU 110 is also connected to each of the two inverters 104 so as to control the each inverter 104 and thereby control the operation of the corresponding actuator 30. The ROM of the computer of the ECU 110 stores various control programs including a stabilizer-device controlling program, described later, and various control data including various data maps used to control each stabilizer device 14.

As described above, the present stabilizer system 10 includes the two stabilizer devices 14 that are associated with the front wheels 16 and the rear wheels 16, respectively. The two stabilizer devices 14 are controlled by the ECU 110, independent of each other, according to a predetermined rolling-stiffness distribution, so that the two stabilizer devices 14 produce respective rolling restraining moments under the respective independent controls of the ECU 110. Hereinafter, however, the two stabilizer devices 14 will be described, for easier understanding purposes only, on the assumption that the two stabilizer devices 14 have a same construction and are controlled in a same manner, unless otherwise mentioned.

1.2 Operation of Stabilizer Device

Each stabilizer device 14 is configured such that when the two stabilizer bar members 22, 24 are rotated in a same direction, basically the stabilizer device 14 allows the respective rotations of the two stabilizer bar members 22, 24, because, as described above, the actuator 30 is held by the housing holding member 76 such that the actuator 30 is rotatable together with the two stabilizer bar members 22, 24. For example, when the left and right wheels 16 simultaneously run on a raised portion of a road, the stabilizer bar unit 20 does not inhibit the two wheels 16 from moving toward the vehicle's body, so that the vibration produced when the two wheels 16 run over the raised portion can be effectively absorbed by the corresponding suspension devices 38.

In addition, regarding each stabilizer device 14, the ECU 110 can control the actuator 30 so as to allow or inhibit the relative rotation of the two stabilizer bar members 22, 24, or cause the two stabilizer bar members 22, 24 to rotate relative to each other. Hereinafter, the operation of the stabilizer device 14 will be described while explaining the different manners in which the actuator 30 is controlled. As described above, the respective outer end portions of the respective arm portions 62 of the two stabilizer bar members 22, 24 are connected to the corresponding lower arms 44. Therefore, as each of the left and right wheels 16 moves toward, and away from, the vehicle's body, i.e., a distance of the each wheel 16 and the body changes, a corresponding one of the two arm portions 62 is partially rotated about the axis line of the corresponding torsion bar portion 60. If the respective distances of the left and right wheels 16 and the vehicle's body differ from each other, i.e., if a difference of the two wheel-body distances occurs, then respective rotation angles of the left and right arm portions 62 also differ from each other, i.e., a difference of the two rotation angles occurs. At this time, if the left and right torsion bar portions 60 are allowed by the actuator 30 to be rotated relative to each other, then the two stabilizer bar members 22, 24 are rotated independent of each other. On the other hand, if the two torsion bar portions 60 are inhibited by the actuator 30 from being rotated relative to each other, then only the two arm portions 62 are rotated relative to each other as the difference of the two wheel-body distances increases, and each of the two torsion bar portions 60 is twisted by an amount corresponding to the difference of the two wheel-body distances. This twisting causes a corresponding one of the two wheels 16, and the vehicle's body to move toward, or away from, each other, i.e., produces a rolling restraining force to restrain the rolling of the vehicle's body.

In addition, for example, if the actuator 30 causes the left and right torsion bar portions 60 to rotate relative to each other in a direction to increase the twisting amount of each torsion bar portion 60, then the stabilizer device 14 can produce an increased rolling-restraining force even in a state in which an amount of rolling of the vehicle's body may be considerably small; and if the actuator 30 causes the two torsion bar portions 60 to rotate relative to each other in the opposite direction, i.e., direction to decrease the twisting amount of each torsion bar portion 60, then the stabilizer device 14 can produce a decreased rolling-restraining force even in a state in which the amount of rolling of the vehicle's body may be considerably large. That is, since the left and right torsion bar portions 60 are rotated relative to each other by the driving force of the actuator 30, the magnitude of the rolling restraining force of the stabilizer device 14 can be changed without depending upon the change of the rolling amount of the vehicle's body, i.e., the change of the difference of the two wheel-body distances. In other words, the rolling restraining effect of the stabilizer bar unit 20 can be changed by rotating the left and right torsion bar portions 60 relative to each other and thereby rotating the two stabilizer bar members 22, 24 relative to each other.

1.3 Control of Stabilizer Device

Hereinafter, there will be described a manner in which the actuator 30 of each stabilizer device 14 is controlled by the ECU 110 so that the each stabilizer device 14 may exhibit an appropriate rolling-restraining effect. The ECU 110 iteratively implements, at short regular intervals of time, a stabilizer-device controlling program represented by a flow chart shown in FIG. 4, so as to control the actuator 30 and thereby cause the two stabilizer bar members 22, 24 to exhibit an appropriate rolling-restraining effect. First, at Step S11, the ECU 110 obtains, from the vehicle-running-speed sensor 122 and the operation-angle sensor 120, the running speed V of the vehicle and the angle $\delta$ of operation of the steering wheel, respectively. The angle $\delta$ of operation of the steering wheel is defined as an angular deviation of a current rotation angle of the steering wheel from a neutral rotation angle thereof (=0 degree) corresponding to a straight-running state of the vehicle. In addition, the ECU 110 obtains a special lateral acceleration, $Gy^*$, as a rolling-moment estimation basis physical quantity or amount as a sort of target-relative-rotation-amount determination basis quantity or amount used as a basis to determine a target relative-rotation amount of the two stabilizer bar members 22, 24 when the rolling restraining effect is controlled. In the present embodiment, the special lateral acceleration $Gy^*$ is an estimated lateral acceleration that is estimated based on the running speed V of the vehicle and the operation angle $\delta$ of the steering wheel, according to a well-known mathematical function.

Then, at Step S12, the ECU 110 carries out a reference-relative-rotation-position determining routine so as to determine a reference relative-rotation position, $\alpha$, to be used to control appropriately a relative rotation of the two stabilizer bar members 22, 24. More specifically described, at Step S15, the ECU 110 carries out a rolling-restraining controlling routine so as to control appropriately a relative-rotation amount, $\theta$, of the two stabilizer bar members 22, 24 as counted or measured from the reference relative-rotation position $\alpha$. To this end, the ECU 110 obtains the relative-rotation amount $\theta$ of the two stabilizer bar members 22, 24 as measured from the reference relative-rotation position $\alpha$. Hereinafter, the reference relative-rotation position $\alpha$, and the relative-rotation amount $\theta$, of the two stabilizer bar members 22, 24 will be described in detail. The ECU 110 obtains, as a start-time relative-rotation position of the two stabilizer bar members 22, 24, a relative-rotation position of the same 22, 24 at a time when the vehicle is started, i.e., when an engine of the vehicle is ignited ON, and continuously obtains relative-rotation amounts of the same 22, 24 as measured from the start-time relative-rotation position thereof. Thus, in the present embodiment, a current relative-rotation amount of the two stabilizer bar members 22, 24 as measured from the start-time relative-rotation position thereof means a current relative-rotation position thereof. Therefore, the reference relative-rotation position $\alpha$ of the two stabilizer bar members 22, 24 is defined as what amount the two members 22, 24 have been rotated relative to each other from the start-time relative-rotation position thereof. In addition, the relative-rotation amount $\theta$ of the two stabilizer bar members 22, 24 is defined as a difference of (a) a relative-rotation amount of the current relative-rotation position thereof from the start-time relative-rotation position thereof and (b) a relative-rotation amount of the reference relative-rotation position $\alpha$ thereof from the start-time relative-rotation position thereof, i.e., defined as a relative-rotation amount of the current relative-rotation position thereof from the reference relative-rotation position $\alpha$ thereof. These definitions of the reference relative-rotation position $\alpha$ and the relative-rotation amount $\theta$ of the two stabilizer bar members 22, 24 apply to the other embodiments that will be described later. Also, the reference-relative-rotation-position determining routine carried out at Step S12 will be described later.

Figure 5:
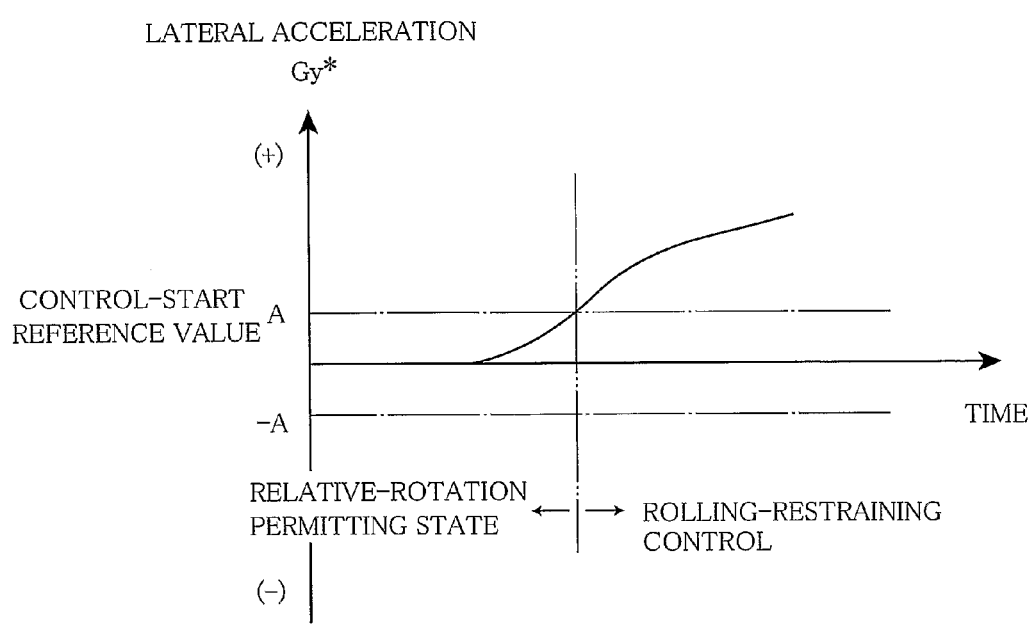
FIG. 5 is a graph illustratively showing a special lateral acceleration $Gy^*$ of a vehicle when a turning of the vehicle is started, the special lateral acceleration being obtained by the electronic control unit.

Next, at Step S13, the ECU 110 judges whether the special lateral acceleration $Gy^*$ has exceeded a control-start-timing reference value, A, indicating a timing when the rolling-restraining controlling routine should be started. In the present embodiment, the control-start-timing reference value A is pre-set at such a value of the special lateral acceleration $Gy^*$ that indicates that even though the stabilizer device 14 may not produce a rolling restraining force, the suspension devices 38 can keep the body's rolling amount sufficiently small, that is, indicates that the vehicle can be regarded as being running substantially straight. For example, the control-start-timing reference value A is pre-set at 0.05 G (G=9.8 m/s$^2$). FIG. 5 illustratively shows a time-wise change of the special lateral acceleration $Gy^*$ when a turning of the vehicle is started. From the figure, it can be understood that as time elapses, the lateral special acceleration $Gy^*$ increases and eventually exceeds the control-start-timing reference value A. If a negative judgment is made at Step S13, the control of the ECU 110 goes to Step S14 to establish a relative-rotation permitting state in which the electric motor 70 does not produce the rotation and the two stabilizer bar members 22, 24 are permitted to be rotated relative to each other. Thus, in the present embodiment, the state in which the special lateral acceleration $Gy^*$ does not exceed the control-start-timing reference value A is a neutral state in which the rolling-restraining controlling routine is not carried out. On the other hand, if a positive judgment is made at Step S13, the control of the ECU 110 goes to Step S15 to carry out the rolling-restraining controlling routine. Thus, in the present embodiment, the special lateral acceleration $Gy^*$ as the rolling-moment estimation basis physical quantity is used as a control-start-timing determination basis quantity. Conversely, it can also be said that the special lateral acceleration $Gy^*$ is a relative-rotation-permitting-timing determination basis quantity that can be used to determine a timing when the ECU 110 quits the rolling-restraining controlling routine and places the two stabilizer bar members 22, 24 in the relative-rotation permitting state.

At Step S14, the ECU 110 places the two stabilizer bar members 22, 24 in the relative-rotation permitting state. In this state, no electric power is supplied to the electric motor 70, and a resistance to a passive rotation of the motor 70 is minimized. More specifically described, an electric connection between (a) an input wire of each phase of the electric motor 70 and (b) the inverter 104 is cut off, so that the each phase of the motor 70 is placed in an open state. Thus, the two stabilizer bar members 22, 24 are allowed to be rotated relative to each other, against a mechanical resistance of the actuator 30, so that the stabilizer bar unit 20 cannot produce the rolling-restraining force. In this state, for example, when the vehicle is running straight while only one of the left and right wheels 16 runs over a raised portion of a road surface, the arm portion 62 of a corresponding one of the two stabilizer bar members 22, 24 is rotated. However, since the two stabilizer bar members 22, 24 are permitted to be rotated relative to each other, the two members 22, 24 do not cooperate with each other to produce an elastic force to restrain a movement of the one wheel 16 toward the vehicle's body, so that the one wheel 16 can considerably smoothly run over the raised portion of the road surface.

1.4 Rolling-Restraining Control

Figure 6:
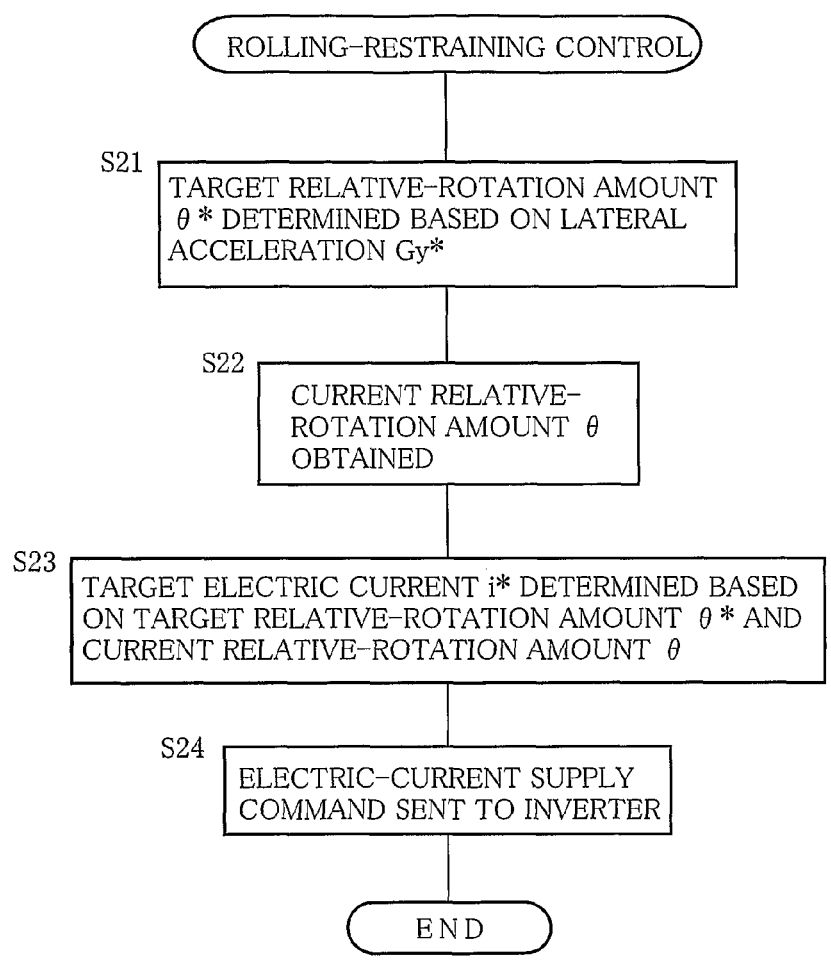
FIG. 6 is a flow chart representing a rolling-restraining controlling routine that is implemented by the electronic control unit.
Figure 7:
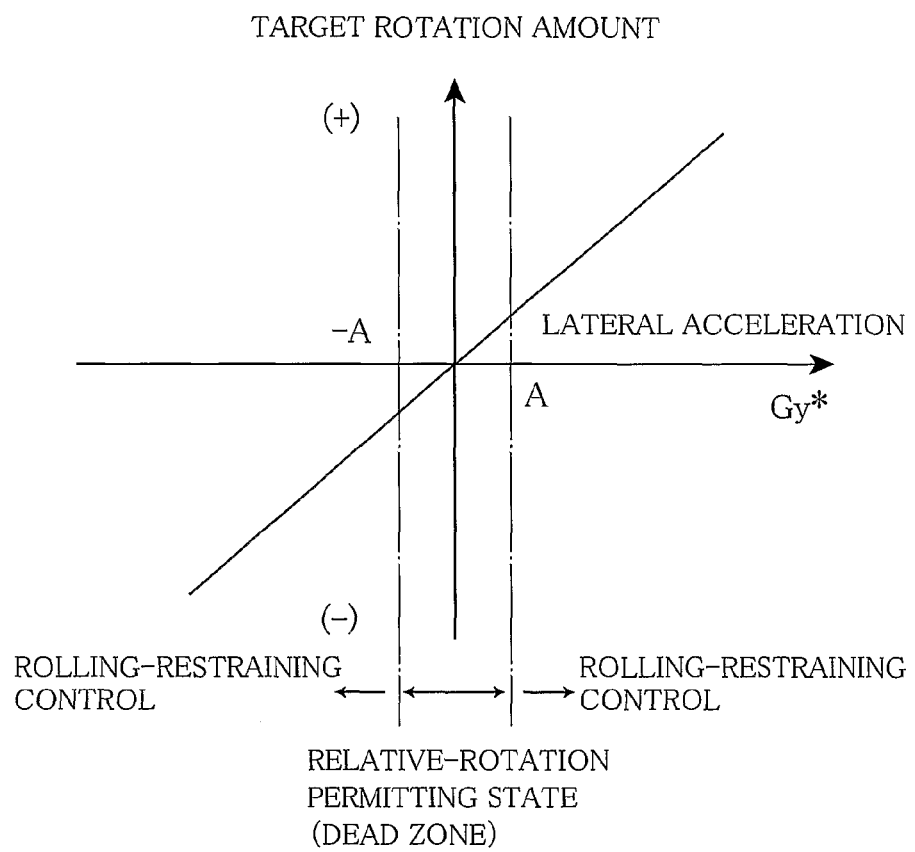
FIG. 7 is a graph illustratively showing a target-rotation-amount map that is stored in a storage portion of the electronic control unit.
Figure 9:
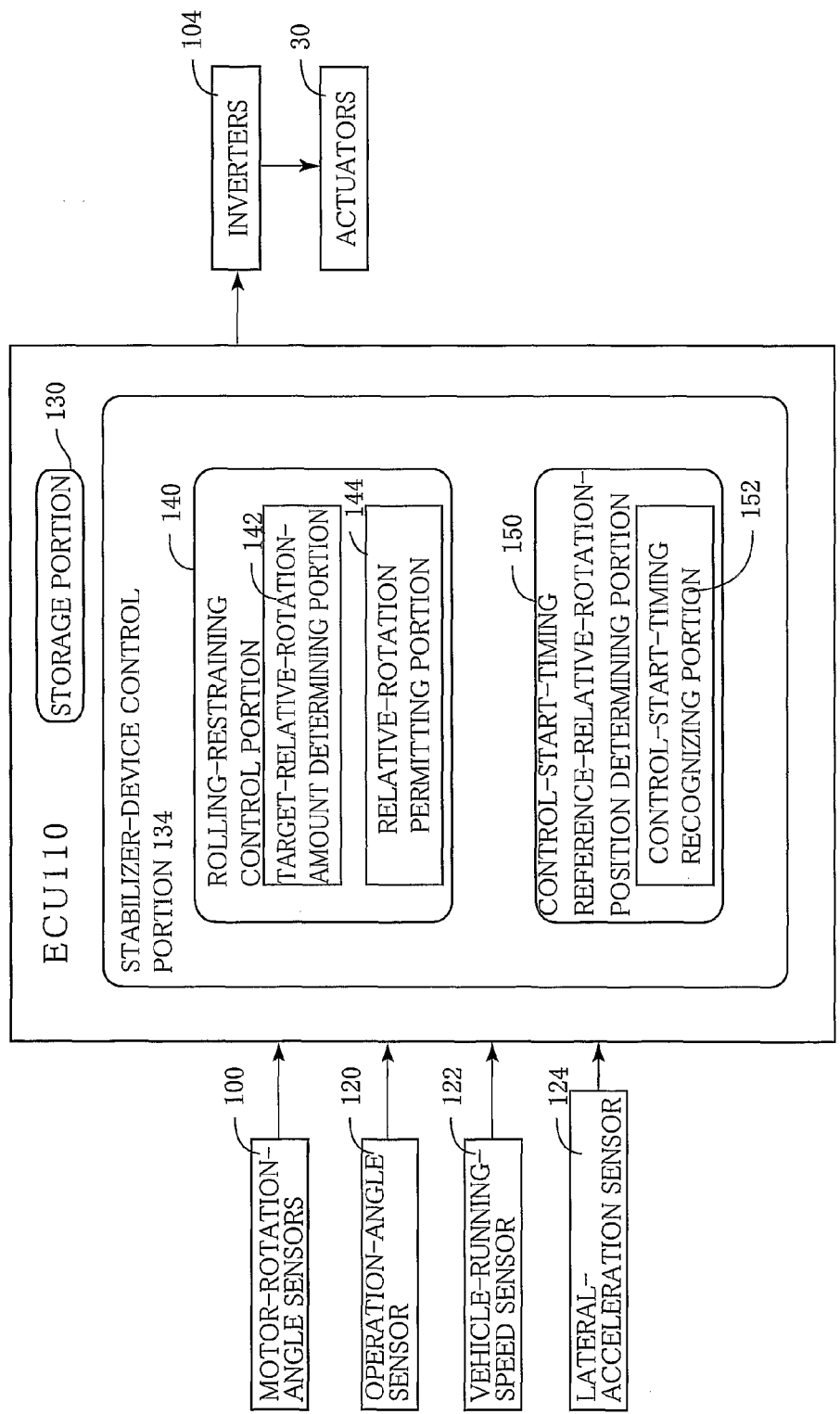
FIG. 9 is a block diagram illustratively showing various control functions of the electronic control unit.

If a positive judgment is made at Step S13, the control of the ECU 110 goes to Step S15 to carry out the rolling-restraining controlling routine. The rolling-restraining controlling routine is carried out to rotate the two stabilizer bar members 22, 24 relative to each other and thereby change the above-explained, relative-rotation amount θ of the same 22, 24, to an amount corresponding to the special lateral acceleration Gy*, so that the stabilizer bar unit 20 may produce an appropriate rolling-restraining effect. FIG. 6 is a flow chart representing the rolling-restraining controlling routine carried out at Step S15. Hereinafter, the rolling-restraining controlling routine is described by reference to FIG. 6. In the present embodiment, the rolling-restraining controlling routine carried out at Step S15 is designed as a sub-routine or a sub-program of the stabilizer-device controlling program shown in FIG. 4. First, at Step S21, the ECU 110 determines a target rotation amount, θ*, of the two stabilizer bar members 22, 24, based on the special lateral acceleration Gy* as a target-rotation-amount determination basis quantity. FIG. 7 shows a target-rotation-amount map that represents a relationship between special lateral acceleration Gy* and target rotation amount θ* and that is pre-stored in a storage portion 130 of the ECU 110 (FIG. 9). The ECU 110 reads, from the target-rotation-amount map, a target-rotation-amount value corresponding to the special lateral acceleration Gy*, and determines the thus read value as the target rotation amount θ*. Then, at Step S22, the ECU 110 obtains a current relative-rotation amount θ of the two stabilizer bar members 22, 24 as measured from the reference relative-rotation position α thereof determined at Step S12.

Subsequently, at Step S23, the ECU 110 determines an appropriate electric power to be supplied to the electric motor 70 for the purpose of operating the actuator 20 to reduce a deviation, Δθ, of the current relative-rotation amount θ from the target rotation amount θ*. As described above, in the present embodiment, the inverter 104 supplies the constant electric voltage to the electric motor 70. Therefore, the electric current supplied from the inverter 104 to the motor 70 is changed to supply the appropriate electric power to the motor 70. Thus, a target electric current, i*, as a target value of the electric current supplied to the electric motor 70 is determined according to the following expression:

$$i^* = K_I \cdot \Delta\theta + i_P(\theta)$$

In this expression, the second term $i_P(\theta)$ indicates an electric-current component supplied to the motor 70 to prevent the rotation thereof in the opposite direction because of, e.g., a backward input thereto of the rolling moment at the current relative-rotation amount θ; and the first term $K_I \cdot \Delta\theta$ indicates an electric-current component supplied to the motor 70 to rotate the motor 70 further from the current relative-rotation amount θ and thereby zero the deviation Δθ ($K_I$ is a pre-set gain). The ECU 110 reads the value of electric-current component $i_P(\theta)$ from a data map that is pre-stored in the storage portion 130 (FIG. 9) and that represents a relationship between relative-rotation amount θ and electric-current component $i_P(\theta)$.

After the target electric current i* is determined at Step S23, the control goes to Step S24 to send an electric-current supply command to the inverter 104, so that the inverter 104 supplies an electric current equal to the target electric current i*, to the electric motor 70. Consequently the two stabilizer bar members 22, 24 are rotated relative to each other so as to exhibit an appropriate rolling-restraining effect. Thus, one control cycle in accordance with the rolling-restraining controlling routine of FIG. 6 is finished.

Figure 4:
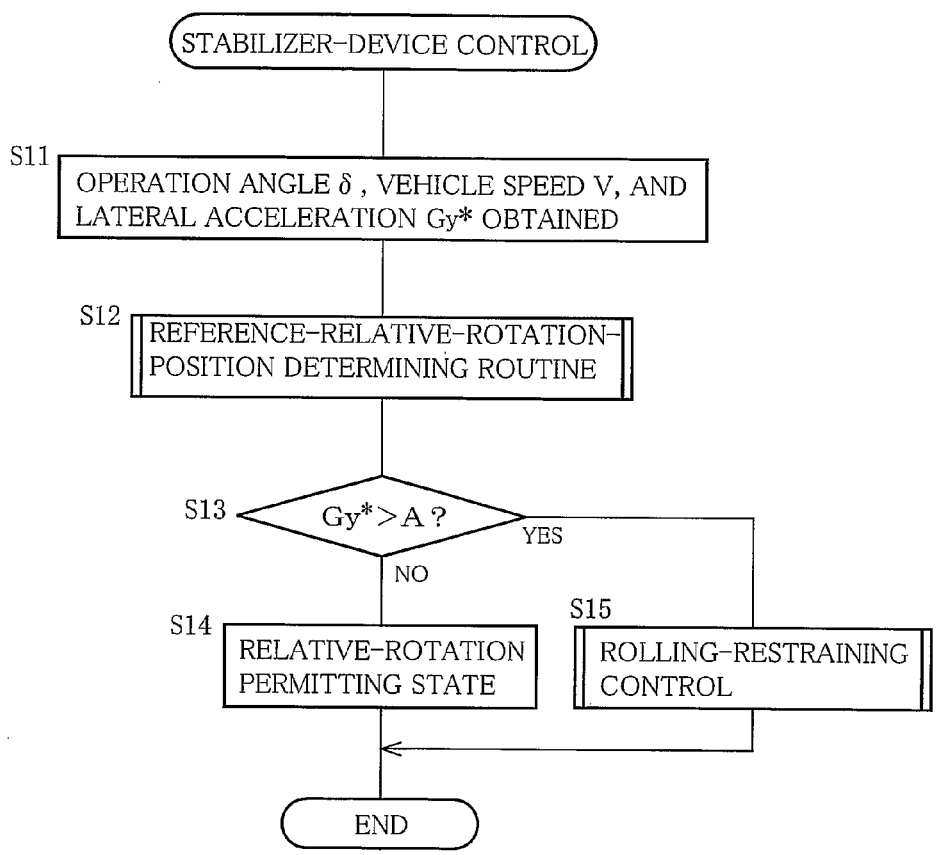
FIG. 4 is a flow chart representing a stabilizer-device controlling program that is implemented by an electronic control unit of the stabilizer system.
Figure 8:
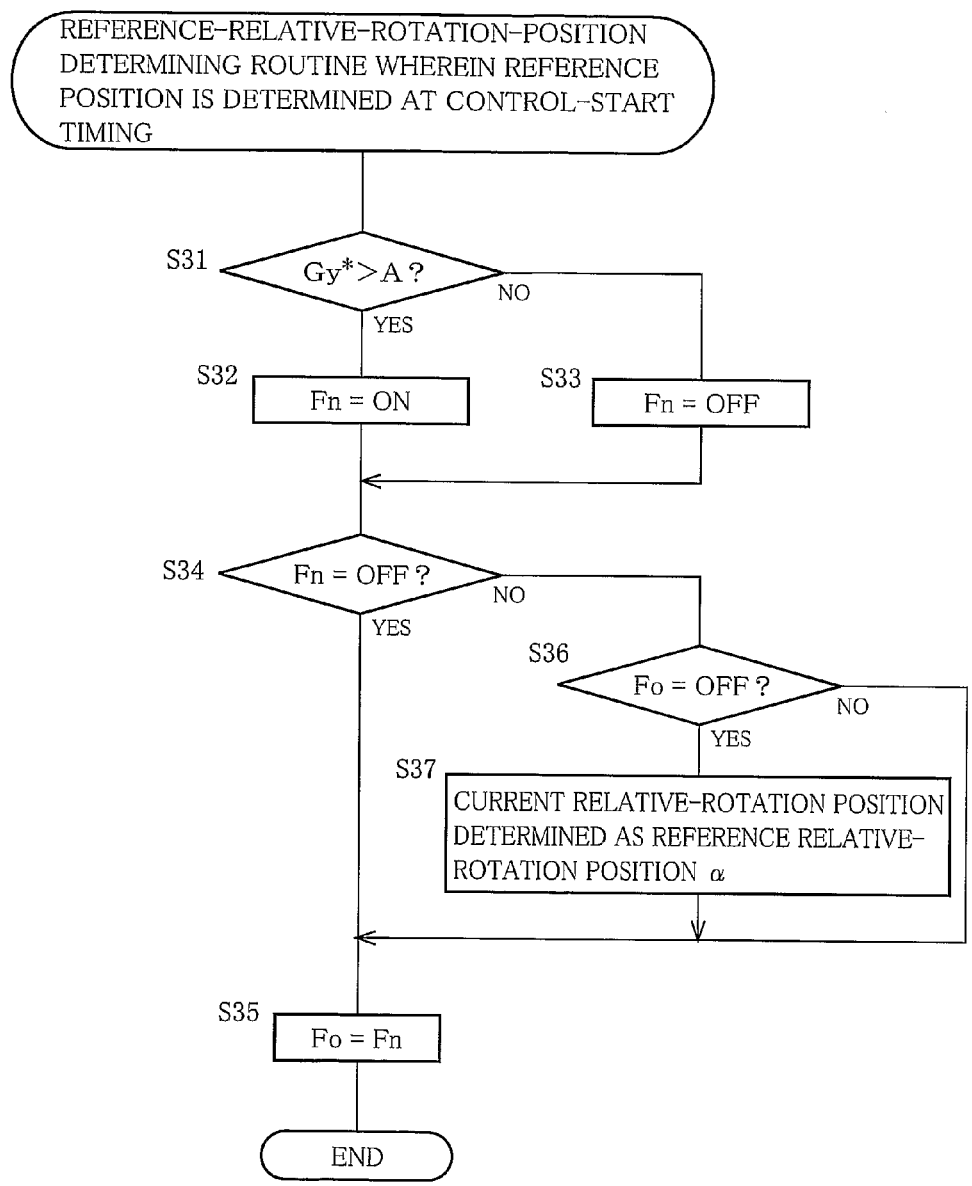
FIG. 8 is a flow chart representing a control-start-timing reference-relative-rotation-position determining routine that is implemented by the electronic control unit.

1.5 Control-Start-Timing Reference-Relative-Rotation-Position Determining Routine FIG. 8 shows a flow chart representing the control-start-timing reference-relative-rotation-position determining routine carried out at Step S12 of FIG. 4. The reference-relative-rotation-position determining routine carried out at Step S12 is designed as a sub-routine or a sub-program of the stabilizer-device controlling program shown in FIG. 4. In the reference-relative-rotation-position determining routine, a reference relative-rotation position α is not determined while the special lateral acceleration Gy* is not higher than the control-start-timing reference value A, and is determined each time the special lateral acceleration Gy* exceeds the control-start-timing reference value A. Thus, the reference relative-rotation position α is determined immediately before the rolling-restraining controlling routine is started at Step S15.

First, at Steps S31, S32, and S33, the ECU 110 sets a flag, Fn, to an ON state, Fn=ON, when the special lateral acceleration Gy* is higher than the control-start-timing reference value A; and re-sets the flag Fn to an OFF state, Fn=OFF, when the special lateral acceleration Gy* is not higher than the reference value A. Then, the control of the ECU 110 goes to Step S34 to judge whether the flag Fn is in the OFF state. If a positive judgment is made at Step S34, the control goes to Step S35 to set another flag, Fo, to the same state as the current state of the flag Fn. The flag Fo is for storing the state of the flag Fn when the preceding control cycle was performed according to the present routine shown in FIG. 8. Thus, the current control cycle in accordance with the routine of FIG. 8 is finished. On the other hand, if a negative judgment is made at Step S34, the control goes to Step S36 to judge whether the flag Fo is in the OFF state. If a positive judgment is made at Step S36, the control of the ECU 110 goes to Step S37 to determine a current relative-rotation position of the two stabilizer bar members 22, 24, detected by the motor-rotation-angle sensor 100, as a reference relative-rotation position α thereof. Then, the control goes to Step S35, and thus the current control cycle in accordance with the routine of FIG. 8 is finished. On the other hand, if a negative judgment is made at Step S36, the control goes to Step S35, without determining a reference relative-rotation position α, and thus the current control cycle is finished. In the case where the present routine is carried out for the first time after the vehicle is started, the flag Fo is in the OFF state, Fo=OFF.

Thus, in this reference-relative-rotation-position determining routine, the reference relative-rotation position α is determined when the special lateral acceleration Gy* changes from a first state in which it is not higher than the control-start-timing reference value A to a second state in which it is higher than the reference value A and, so long as the second state continues, the thus determined reference relative-rotation position α is kept. However, the reference relative-rotation position α is not determined when the special lateral acceleration Gy* changes from the second state to the first state. Here, the description of the reference-relative-rotation-position determining routine is ended.

As is apparent from the foregoing description of the stabilizer-device controlling program of FIG. 4, each time the special lateral acceleration Gy* exceeds the control-start-timing reference value A, the reference relative-rotation position α is determined, and the rolling-restraining controlling routine is carried out by using the reference position α. Therefore, it is not needed to store the current relative-rotation amount θ of the two stabilizer bar members 22, 24 when the supplying of electric power to the stabilizer system 10 is stopped. This leads to simplifying the overall construction of the stabilizer system 10. In addition, since an appropriate reference relative-rotation position α is iteratively determined, the stabilizer device 14 can be controlled to exhibit an appropriate rolling-restraining effect.

In the present embodiment, the special lateral acceleration Gy* as the rolling-moment estimation basis physical quantity that can be used to estimate the rolling moment exerted to the vehicle's body, is used as each of the target-rotation-amount determination basis quantity and the control-start-timing determination basis quantity (or the relative-rotation-permitting-timing determination basis amount).

FIG. 9 is a block diagram showing various control functions of the ECU 110. In fact, the ECU 110 cannot be divided into various control portions as shown in the figure. That is, this block diagram is just for easily understanding the various control functions of the ECU 110. In the present embodiment, the ECU 110 employs the storage portion 130 including memory devices such as the ROM and the RAM, and the storage portion 130 stores the various control programs such as the stabilizer-device controlling program shown in FIG. 4, and the various control data such as the data maps shown in FIGS. 5 and 7. The ECU 110 additionally includes the computer that implements the various control programs so that the various control portions, described below, exhibit the corresponding control functions. Thus, in the present embodiment, when the ECU 110 implements the various control programs and the various sub-routines thereof, the various control portions of the ECU 110 exhibit the corresponding control functions.

The ECU 110 includes a stabilizer-device control portion 134 that implements the stabilizer-device controlling program shown in FIG. 4. The stabilizer-device control portion 134 includes a rolling-restraining control portion 140 that carries out the rolling-restraining controlling routine at Step S15 of FIG. 4, i.e., Steps S21 through S24 of FIG. 6. The rolling-restraining control portion 140 includes a target-rotation-amount determining portion 142 that carries out Step S21 of FIG. 6; and a relative-rotation permitting portion 144 that carries out Step S14 of FIG. 4. The stabilizer-device control portion 134 additionally includes a control-start-timing reference-relative-rotation-position determining portion 150 that carries out the control-start-timing reference-relative-rotation-position determining routine at Step S12 of FIG. 4, i.e., Steps S31 through S37 of FIG. 8. The control-start-timing reference-relative-rotation-position determining portion 150 includes a control-start-timing recognizing portion 152 that carries out Steps S31 through S36 of FIG. 8.

2. Second Embodiment

The second embodiment also relates to a stabilizer system having the same construction as that of the first embodiment shown in FIGS. 1 through 9. However, in the above-described first embodiment, the reference relative-rotation position α is determined as the current relative-rotation position of the two stabilizer bar members 22, 24 when the special lateral acceleration Gy* exceeds the control-start-timing reference value A, whereas in the present, second embodiment, a reference relative-rotation position α is determined as either a neutral relative-rotation position of the two stabilizer bar members 22, 24 or a position near the neutral relative-rotation position. In addition, in the first embodiment, the reference relative-rotation position α is determined each time the special lateral acceleration Gy* exceeds the control-start-timing reference value A, whereas in the second embodiment, the reference relative-rotation position α is determined just one time after an engine of the vehicle is started, i.e., a power of the vehicle is turned on. Moreover, Step S12 of the flow chart representing the stabilizer-device controlling program used in the first embodiment is carried out, in the second embodiment, according to not the control-start-timing reference-relative-rotation-position determining routine represented by the flow chart shown in FIG. 8 but a control-start-timing-neutral-position-determination-type reference-relative-rotation-position determining routine represented by a flow chart shown in FIG. 10. Since the routine of FIG. 10 includes many steps common to the steps of the routine of FIG. 8, the same step numbers as used in FIG. 8 are used to designate the corresponding steps in FIG. 10, and the description of those steps is omitted. The following description is mainly focused on different steps of FIG. 10 than the steps of FIG. 8.

Figure 10:
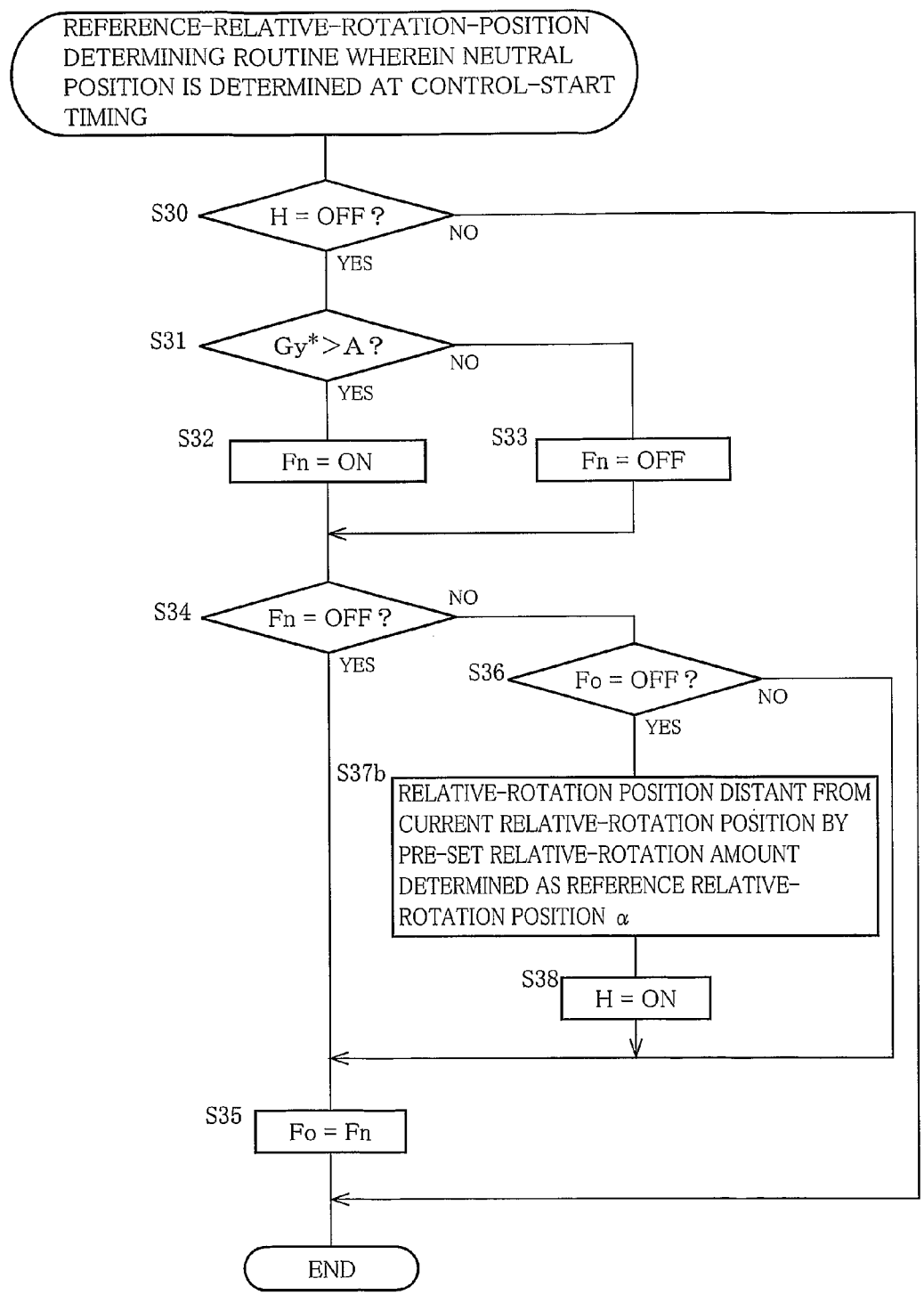
FIG. 10 is a flow chart corresponding to FIG. 8, and representing a control-start-timing neutral-position-determination-type reference-relative-rotation-position determining routine that is implemented by an electronic control unit of another stabilizer system as a second embodiment of the present invention.

At Step S30, the ECU 110 judges whether a flag, H, indicating whether a reference relative-rotation position α has been determined is set in an OFF state, H=OFF. When the routine of FIG. 10 is started after the engine of the vehicle is ignited ON, the reference relative-rotation position α has not been determined yet, and accordingly the flat H is set in the OFF state. If a positive judgment is made at Step S30, the control of the ECU 110 goes to Steps S31 through S38 so as to determine a reference relative-rotation position α. Steps S31 through S36 of FIG. 10 are the same steps as Steps S31 through S36 of FIG. 8. At Step S37b of FIG. 10 corresponding to Step S37 of FIG. 8, the ECU 110 determines, as the reference relative-rotation position α, a relative-rotation position of the two stabilizer bar members 22, 24 that is distant from the relative-rotation position thereof when the special lateral acceleration Gy* exceeds the control-start-timing reference value A, by a predetermined relative-rotation amount, in a direction opposite to the direction of current relative rotation of the two members 22, 24. The predetermined relative-rotation amount is equal to a target relative-rotation amount θ* when the special lateral acceleration Gy* is equal to the control-start-timing reference value A. Thus, the neutral relative-rotation position (or any position near the neutral position) of the two stabilizer bar members 22, 24 is determined as the reference relative-rotation position α thereof. However, the predetermined relative-rotation amount may be larger or smaller than the target relative-rotation amount θ*.

After the reference relative-rotation position α has been determined at Step S37b, the control goes to Step S38 to set the flag H to an ON state, H=ON, and then quits the present routine. Subsequently, when the present routine is carried out, a positive judgment is made at Step S30, because the flag H is set in the ON state indicating that the reference relative-rotation position α has been determined. Therefore, Step S31 and the following steps are skipped. Thus, according to the routine of FIG. 10, the reference relative-rotation position α is determined just one time after the engine of the vehicle is started. However, Steps S30 and S38 may be omitted. In this modified form of the second embodiment, the reference relative-rotation position α is determined at Step S37b each time the special lateral acceleration Gy* exceeds the control-start-timing reference value A.

In the first embodiment, immediately after the special lateral acceleration Gy* exceeds the control-start-timing reference value A and the rolling-restraining control is started, the two stabilizer bar members 22, 24 may be largely rotated relative to each other from the reference relative-rotation position α to the target relative-rotation amount. In this case, an initial operation of the stabilizer device 14 may not be smoothly performed. In contrast, in the second embodiment, the neutral relative-rotation position is determined as the reference relative-rotation position α, according to the routine of FIG. 10. Therefore, once the reference relative-rotation position α is determined, it can be assumed that the relative-rotation position of the two stabilizer bar members 22, 24 when the rolling-restraining control is started is equal to the target relative-rotation amount θ*. Thus, the two stabilizer bar members 22, 24 are not largely rotated relative to each other, and accordingly the stabilizer device 14 is operated smoothly. The ECU 110 employed in the second embodiment has the same control functions as the control functions of the ECU 110 employed in the first embodiment, shown in FIG. 9, except that the control-start-timing reference-relative-rotation-position determining portion 150 of FIG. 9 is replaced by a control-start-timing-neutral-position-determination-type reference-relative-rotation-position determining portion employed in the second embodiment. In the present embodiment, regarding the reference-relative-rotation-position determining routine, it can be said that the special lateral acceleration Gy* is a relative-rotation-amount estimation basis physical quantity that can be used to estimate a relative-rotation amount of the two stabilizer bar members 22, 24 counted from the current relative-rotation amount θ thereof backward to the reference (i.e., neutral) relative-rotation position α.

3. Third Embodiment

Figure 11:
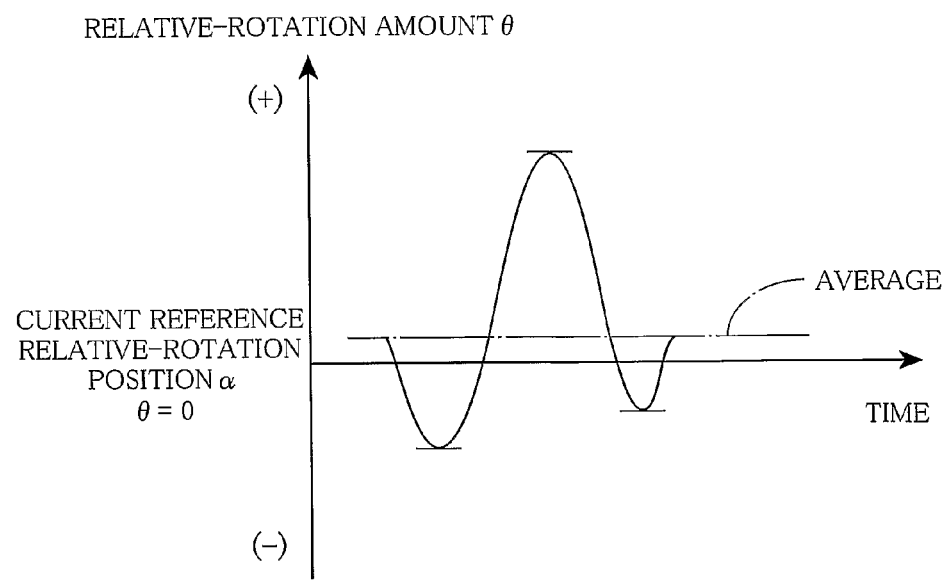
FIG. 11 is a graph illustratively showing a time-wise change of relative-rotation amounts θ of two stabilizer bar members of another stabilizer system as a third embodiment of the present invention, the time-wise change being obtained in a straight-running state of a vehicle.
Figure 13:
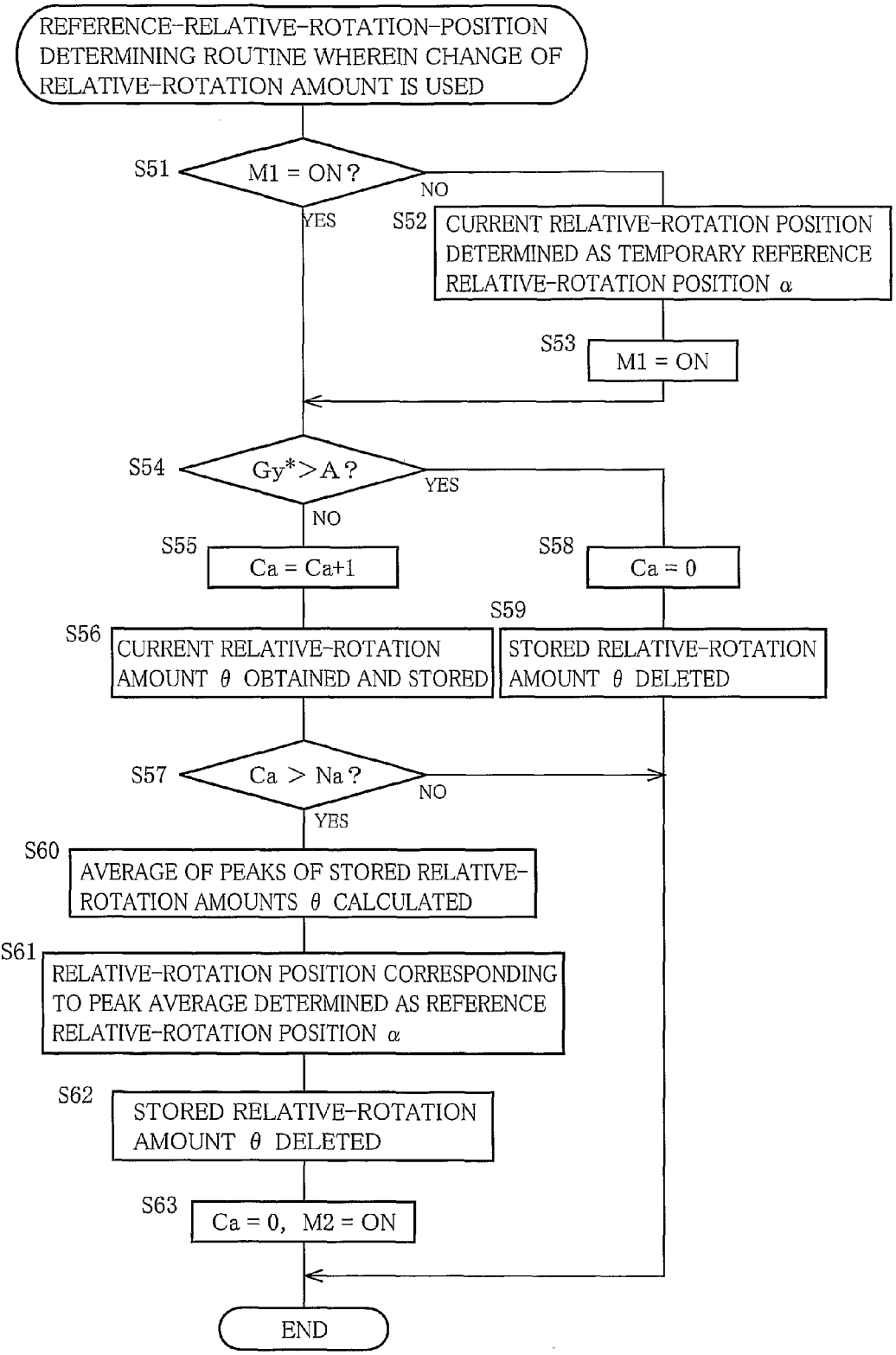
FIG. 13 is a flow chart corresponding to FIG. 8, and representing a relative-rotation-amount-change-dependent reference-relative-rotation-position determining routine that is implemented by the electronic control unit of the stabilizer system as the third embodiment.

The third embodiment also relates to a stabilizer system having the same construction as that of each of the first and second embodiments, but carries out a reference-relative-rotation-position determining routine, shown in FIG. 13, that is different from the corresponding routines, shown in FIGS. 8 and 10, that are employed by the first and second embodiments. According to the routine of FIG. 13, a reference relative-rotation position α is determined, when the vehicle is running straight, in a state in which the left and right wheels 16 are individually moving upward and downward because the vehicle is running on raised and recessed portions of a road surface, i.e., a difference of (a) the distance between the left wheel 16 and the vehicle's body and (b) the distance between the right wheel 16 and the body (hereinafter, referred to as the "wheel-body-distance difference") is occurring, and accordingly the two stabilizer bar members 22, 24 are being rotated relative to each other. FIG. 11 illustratively shows an example of a time-wise change of the relative-rotation amount θ of the two stabilizer bar members 22, 24 when the two members 22, 24 are rotated relative to each other, in the relative-rotation permitting state, because the vehicle is running straight and the left and right wheels 16 are individually moving upward and downward. In this case, it can be said that the two stabilizer bar members 22, 24 are rotated relative to each other mainly around the neutral relative-rotation position thereof. Thus, the routine of FIG. 13 can be said as a relative-rotation-amount-change-dependent reference-relative-rotation-position determining routine in which a reference relative-rotation position α is determined based on the change of the relative-rotation amount θ of the two stabilizer bar members 22, 24 in the relative-rotation permitting state when the vehicle is running straight.

Figure 12:
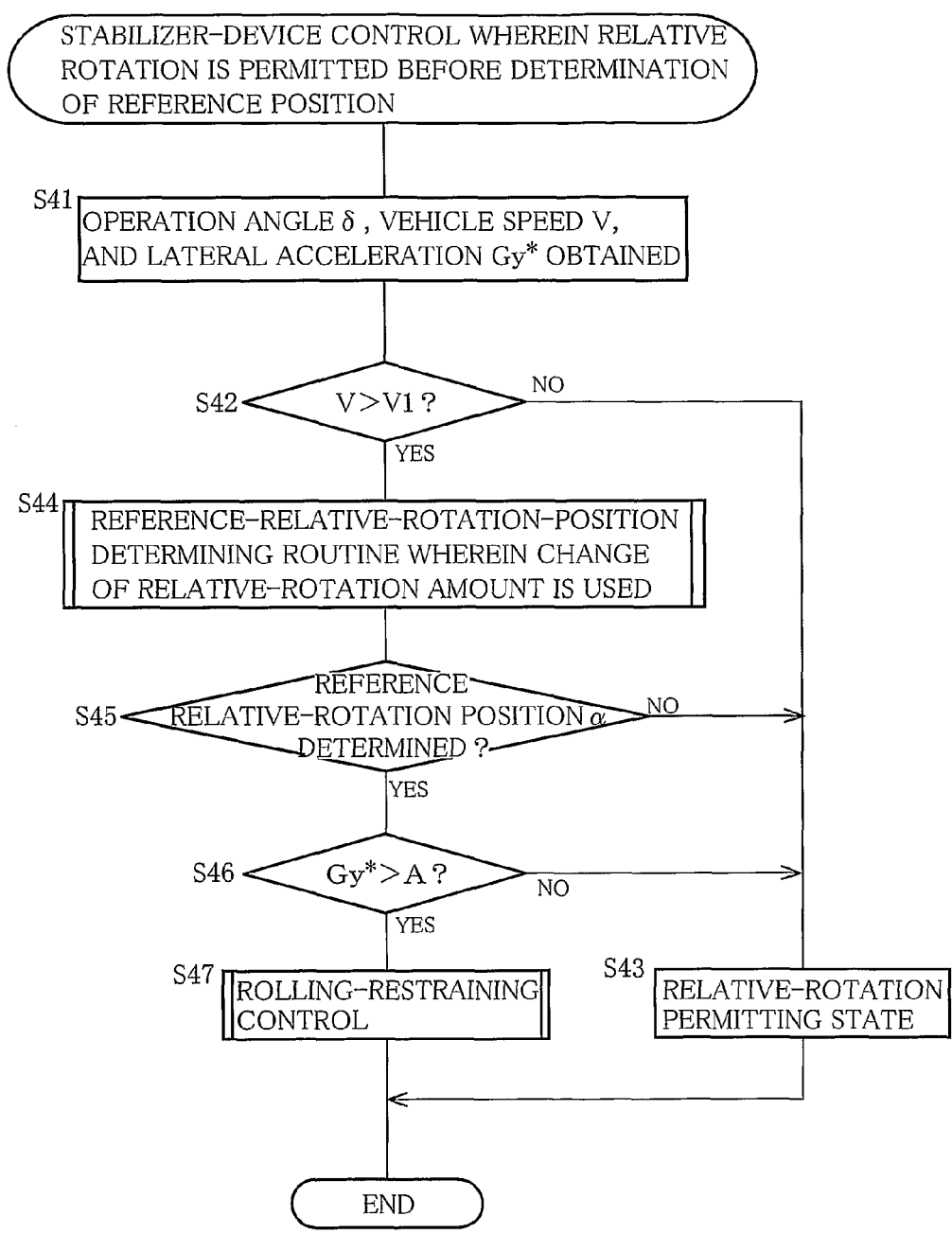
FIG. 12 is a flow chart corresponding to FIG. 4, and representing another stabilizer-device controlling program that is implemented by an electronic control unit of the stabilizer system as the third embodiment.

FIG. 12 shows a flow chart representing a stabilizer-device controlling program employed by the third embodiment. The present stabilizer-device controlling program is identical with the stabilizer-device controlling program of FIG. 4, employed by the first and second embodiments, except for Steps S42, S44, and S45. That is, Steps S41, S43, S46, and S47 of FIG. 12 are identical with Steps S11, S14, S13, and S15 of FIG. 4, respectively. The following description is focused on only differences of the program of FIG. 12 from the program of FIG. 4. At Step S42, the ECU 110 judges whether the vehicle's running speed V is higher than a reference speed, V1 (e.g., 20 km/h). If a negative judgment is made at Step S42, the ECU 110 does not carry out the reference-relative-rotation-position determining routine of FIG. 13 or the rolling-restraining controlling routine of FIG. 6, and the control of the ECU 110 goes to Step S43 to place the two stabilizer bar members 22, 24 in the relative-rotation permitting state. When the running speed V of the vehicle is low, the necessity of performing the rolling-restraining control is low. The relative-rotation permitting state established at Step S43 is the same as that established at Step S14 of FIG. 4.

However, even if a positive judgment may be made at Step S42, the rolling-restraining control is not performed before a reference relative-rotation position α is determined at Step S44. Subsequently, at Step S45, the ECU 110 judges whether a reference relative-rotation position α has been determined. If a positive judgment is made at Step S45, the control goes to Step S46; and if a negative judgment is made at Step S45, the control goes to Step S43 to place the two stabilizer bar members 22, 24 in the relative-rotation permitting state. That is, if an appropriate reference relative-rotation position α has been determined at Steps S44 and S45 and the special lateral acceleration Gy* has exceeded the control-start-timing reference value A at Step S46, the control goes to Step S47 to carry out the rolling-restraining controlling routine of FIG. 6.

FIG. 13 shows the flow chart representing the relative-rotation-amount-change-dependent reference-relative-rotation-position determining routine corresponding to Step S44 of FIG. 12. When a flag, M1, is set in an ON state, M1=ON, it indicates that a temporary reference relative-rotation position α has been determined at Step S52. The flag M1 is set to the OFF state when the engine of the vehicle is started. At Step S51, the ECU 110 judges whether the flag M1 is set in the ON state. If a negative judgment is made at Step S51, e.g., immediately after the engine of the vehicle is started, the control goes to Step S52 to determine, as the temporary reference relative-rotation position α, a current relative-rotation position of the two stabilizer bar members 22, 24. Then, the control goes to Step S53 to set the flag M1 to the ON state, so that thereafter, another temporary reference relative-rotation position α is not determined.

Subsequently, at Steps S54 through S59, a relative-rotation amount θ of the two stabilizer bar members 22, 24 is iteratively obtained in the state in which the vehicle is running straight, i.e., the rolling-restraining control is not performed and the two members 22, 24 are placed in the relative-rotation permitting state, and the thus obtained relative-rotation amounts θ are stored and accumulated in the storage portion 130 of the ECU 110. More specifically described, at Step S54, the ECU 110 judges whether the special lateral acceleration Gy* has exceeded the control-start-timing reference value A. If a negative judgment is made at Step S54, the control goes to Step S55 to add one to a number, Ca, counted by a counter, since the two stabilizer bar members 22, 24 are in the relative-rotation permitting state, and then goes to Step S56 to store a current relative-rotation amount θ of the two members 22, 24 as measured from a current reference relative-rotation position α. The current reference relative-rotation position α may be the temporary present reference relative-rotation position α determined at Step S52, or a prior proper reference relative-rotation position α determined at Step S61, described later. Subsequently, the control goes to Step S57 to judge whether the counted number Ca is greater than a reference number, Na. If a negative judgment is made at Step S57, one control cycle in accordance with the present routine is ended. On the other hand, if a positive judgment is made at Step S54, the control goes to Step S58 to reset the number Ca counted by the counter, to zero, i.e., Ca=0, and then goes to Step S59 to delete the relative-rotation amounts θ stored in the storage portion 130. Thus, one control cycle in accordance with the present routine is ended.

While the state in which the vehicle runs straight and the two stabilizer bar members 22, 24 are placed in the relative-rotation permitting state continues, the present routine is iteratively carried out and eventually the counted number Ca exceeds the reference number Na, so that a positive judgment is made at Step S57. In this case, the control of the ECU 110 goes to Step S60 and the following steps so as to determine a proper reference relative-rotation position α. More specifically described, at Step S60, the ECU 110 recognizes upper and lower peaks (i.e., local maximal and minimal points) of a time-wise change of the relative-rotation amounts θ stored in the storage portion 130, and calculates, as a peak average, an average of the respective relative-rotation amounts θ corresponding to the thus recognized upper and lower peaks. Subsequently, at Step S61, the ECU 110 determines, as a new proper reference relative-rotation position α, a relative-rotation position distant by the calculated peak average from the current reference relative-rotation position α, as shown in FIG. 11. Then, the control goes to Step S62 to delete the relative-rotation amounts θ stored in the storage portion 130, and further to Step S63 to reset the counted number Ca to zero, i.e., Ca=0, and set a flag, M2, to an ON state indicating that a proper reference relative-rotation position α has been determined. The flag M2 is referred to at Step S45 of the stabilizer-device controlling program of FIG. 12, so as to judge whether the reference relative-rotation position α has been determined.

The routine of FIG. 13 is repeated at short regular intervals of time and, if the vehicle continues to run straight for a certain time duration, then the reference relative-rotation position α is determined. Thus, the present stabilizer system can keep an appropriate reference relative-rotation position α, and the two stabilizer bar members 22, 24 can exhibit an appropriate rolling-restraining effect. In the present embodiment, if the special lateral acceleration Gy* exceeds the control-start-timing reference value A, then the ECU 110 deletes the relative-rotation amounts θ stored in the storage portion 130, at Step S59. However, Step S59 may be modified such that the ECU 110 does not delete the relative-rotation amounts θ stored in the storage portion 130. In addition, the ECU 110 determines, as the new proper reference relative-rotation position α, the relative-rotation position distant by the peak average from the current reference relative-rotation position α, at Step S61. However, Step 61 may be modified such that the ECU 110 determines, as the new proper reference relative-rotation position α, an intermediate position between (a) the relative-rotation position distant by the peak average from the current reference relative-rotation position α, and (b) the current reference position α.

Figure 14:
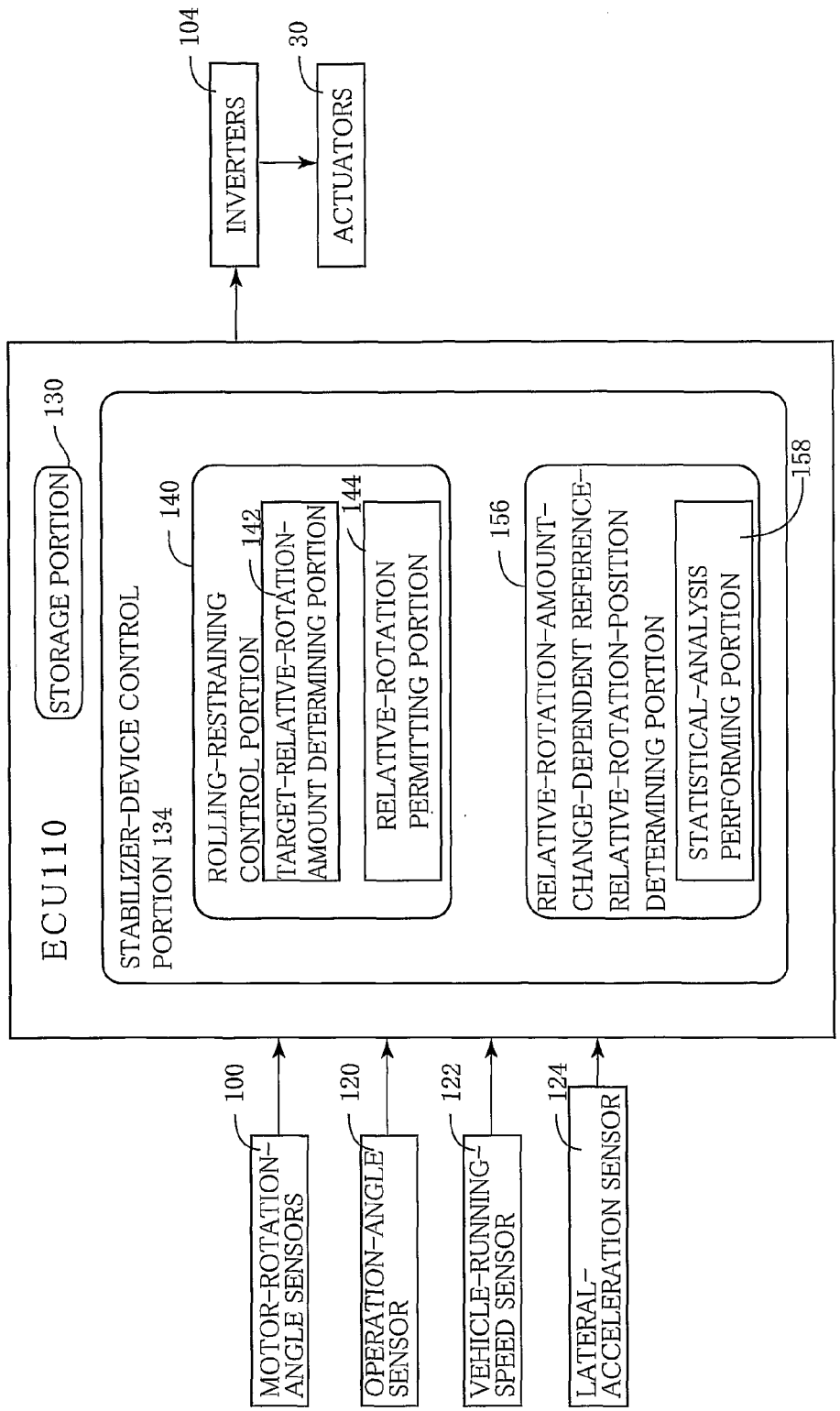
FIG. 14 is a block diagram corresponding to FIG. 9, and illustratively showing various control functions of the electronic control unit of the stabilizer system as the third embodiment.

FIG. 14 is a block diagram showing various control functions of the ECU 110. This block diagram is basically identical with that of FIG. 9 corresponding to the first embodiment, and differences of this diagram from that of FIG. 9 are as follows: The stabilizer-device control portion 134 includes a relative-rotation-amount-change-dependent reference-relative-rotation-position determining portion 156 that carries out Step S44 of FIG. 12, i.e., the relative-rotation-amount-change-dependent reference-relative-rotation-position determining routine of FIG. 13. The relative-rotation-amount-change-dependent determining portion 156 includes a statistical-analysis performing portion 158 that carries out Step S60 of FIG. 13.

4. Fourth Embodiment

Figure 16:
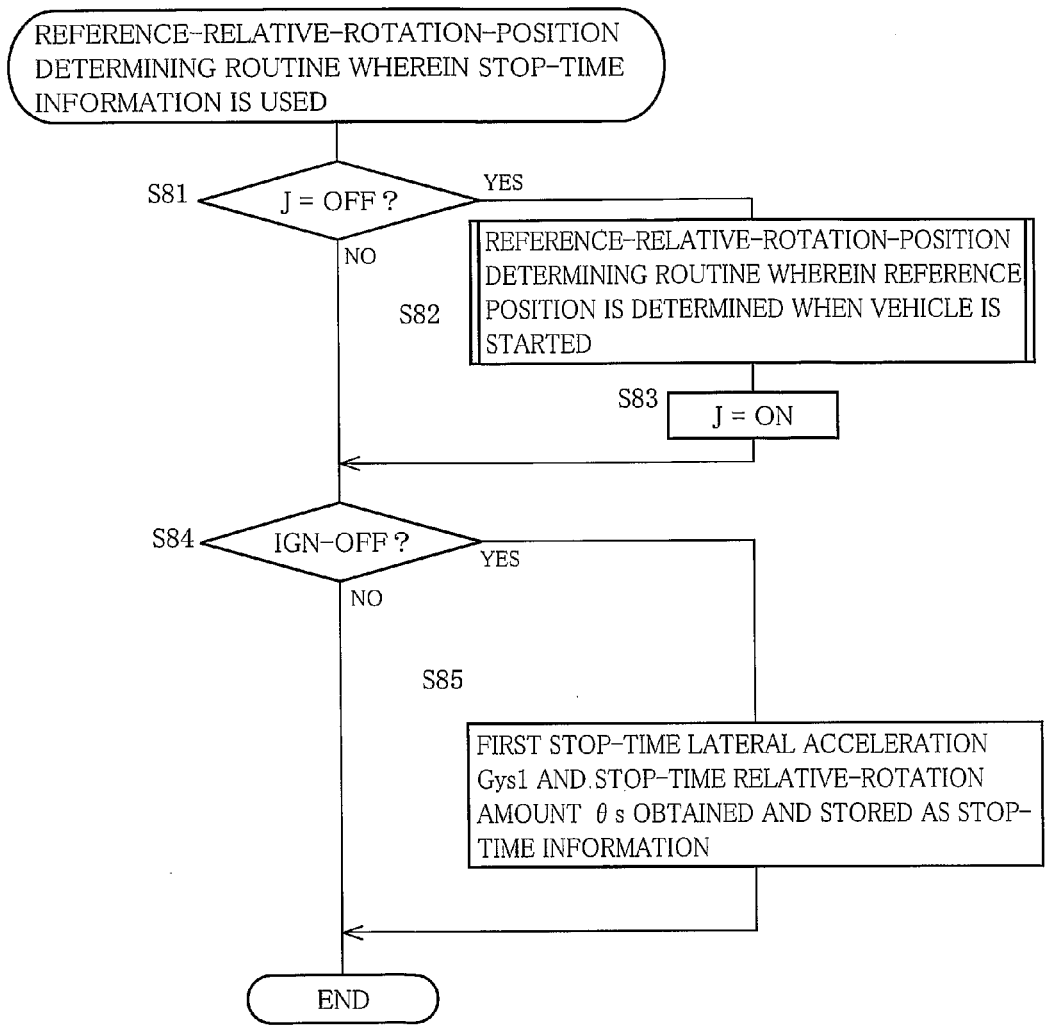
FIG. 16 is a flow chart corresponding to FIGS. 8 and 13, and representing a stop-time-information-dependent reference-relative-rotation-position determining routine that is implemented by the electronic control unit of the stabilizer system as the fourth embodiment.

The fourth embodiment also relates to a stabilizer system having the same construction as that of each of the first to third embodiments, but carries out a reference-relative-rotation-position determining routine, shown in FIG. 16, that is different from the corresponding routines, shown in FIGS. 8, 10, and 13, that are employed by the first, second, and third embodiments. According to the routine of FIG. 16, (a) a relative-rotation amount, θs, as reference-position information representing a current reference relative-rotation position α when the engine of the vehicle is stopped and (b) a stop-time lateral acceleration, Gys1, as an actual lateral acceleration detected by the lateral-acceleration sensor 124 when the vehicle is stopped, i.e., as stopped-vehicle-posture information representing a posture of the body of the vehicle in a stopped state are stored. Each of the relative-rotation amount θs and the stop-time lateral acceleration Gys1 is a sort of stop-time information that is obtained when the vehicle is stopped, i.e., parked and the engine of the vehicle is stopped. In the case where the stop-time lateral acceleration Gys1 when the vehicle is stopped, and another stop-time lateral acceleration, Gys2, when the vehicle is started can be regarded as being equal to each other, a reference relative-rotation position α is determined based on the relative-rotation amount θs stored when the engine of the vehicle is stopped, according to an stop-time-information-dependent reference-relative-rotation-position determining routine represented by the flow chart shown in FIG. 16.

Figure 15:
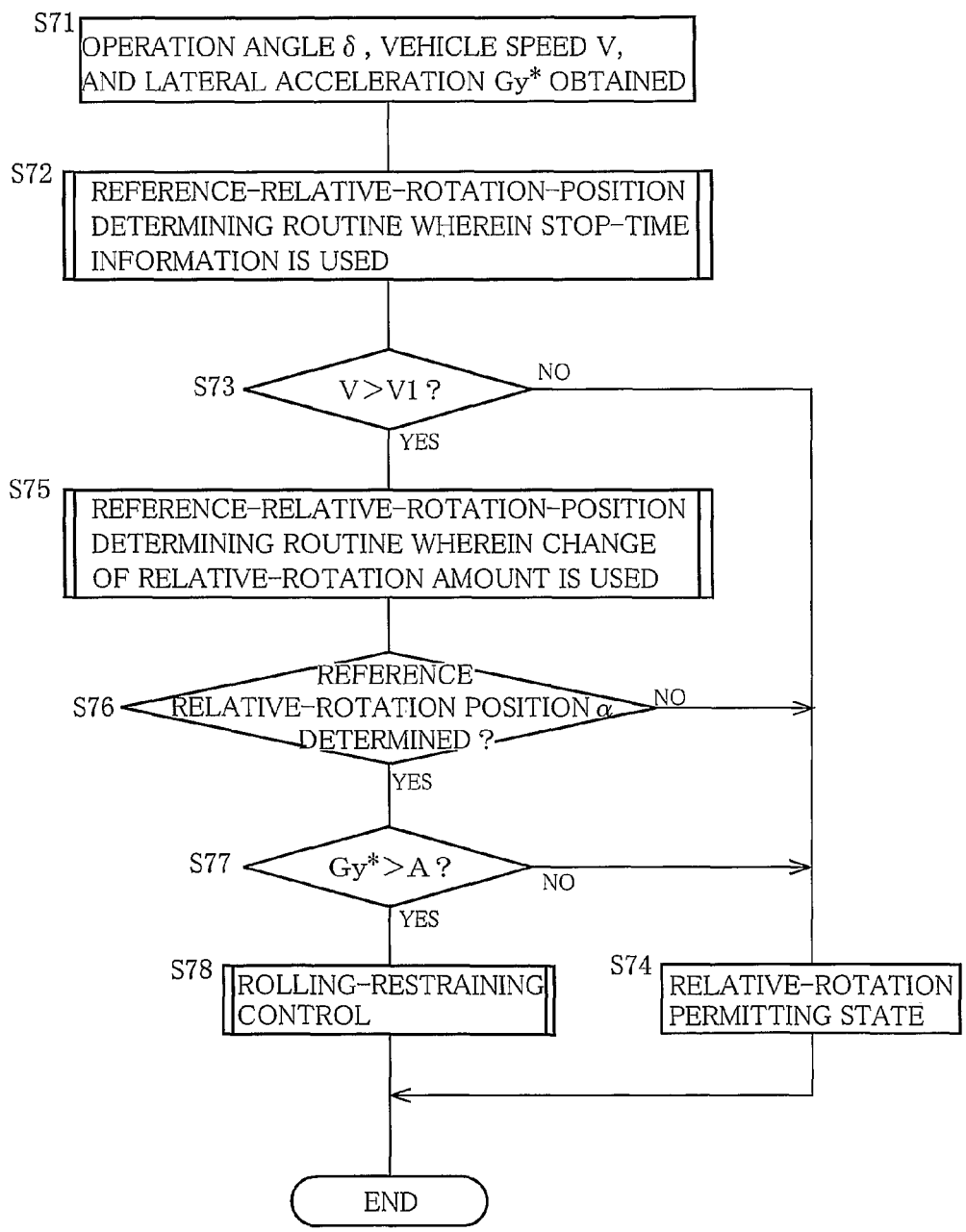
FIG. 15 is a flow chart corresponding to FIGS. 4 and 12, and representing another stabilizer-device controlling program that is implemented by an electronic control unit of another stabilizer system as the fourth embodiment.

FIG. 15 shows a flow chart representing a stabilizer-device controlling program. Since the program of FIG. 15 includes many steps common to the steps of the program of FIG. 12, the following description is mainly focused on different steps of FIG. 15 than the steps of FIG. 12. Steps S71, S73, S74, and S76 through S78 are identical with Steps S41, S42, S43, and S45 through S47, respectively. The program of FIG. 15 includes two different reference-relative-rotation-position determining routines at Steps S72 and S75, respectively. The routine of Step S72 is shown in FIG. 16; and the routine of Step S75 is the same as the routine of FIG. 13 employed by the third embodiment. Subsequently, if a negative judgment is made at Step S76, i.e., if only a temporary reference relative-rotation position α has been determined, the control of the ECU 110 goes to Step S74 to place the two stabilizer bars 22, 24 in the relative-rotation permitting state. Meanwhile, if a positive judgment is made at each of Steps S76 and S77, i.e., if the proper reference relative-rotation position α (not the temporary reference relative-rotation position α) has been determined and the special lateral acceleration Gy* has exceeded the control-start-timing reference value A, the control goes to Step S78 to carry out the rolling-restraining controlling routine of FIG. 6.

FIG. 16 is the flow chart representing the stop-time-information-dependent reference-relative-rotation-position determining routine of Step S72. A flag, J, is set to an ON state, J=ON, at Step S83, after a start-time reference-relative-rotation-position determining routine is carried out at Step S82. Therefore, when the present routine is started, the flag J is set in an OFF state, J=OFF, and a positive judgment is made at Step S81. Thus, the start-time reference-relative-rotation-position determining routine is carried out just once at Step S82. Then, the flag J is set to the ON state at Step S83. Thus, Step S82 is not carried out any more till the engine of the vehicle is stopped and then is re-started. In the present embodiment, the ECU 110 is connected to an ignition switch, not shown, (abbreviated to "IGN", where appropriate), so as to monitor a current state of IGN at Step S84. If IGN is turned OFF, i.e., if a positive judgment is made at Step S84, the control goes to Step S85 to obtain a current relative-rotation amount θs and a stop-time lateral acceleration Gys1 as stopped-vehicle-posture information. In the present embodiment, the stop-time lateral acceleration Gys1 is actually detected by the lateral-acceleration sensor 124 because a gravitational acceleration influences the sensor 124 in a state in which the vehicle's body is inclined in a rolling direction. The obtained relative-rotation amount θs and stop-time lateral acceleration Gys1 are stored in a flash memory of the storage portion 130 (FIG. 18) of the ECU 110. The flash memory is a sort of ROM, and can keep data without supplying of electric power. The flash memory functions as a stop-time-information storage portion. However, in the case where the RAM of the memory device 130 is supplied with an electric power while the engine of the vehicle is stopped, the RAM may be used as the stop-time-information storage portion.

Figure 17:
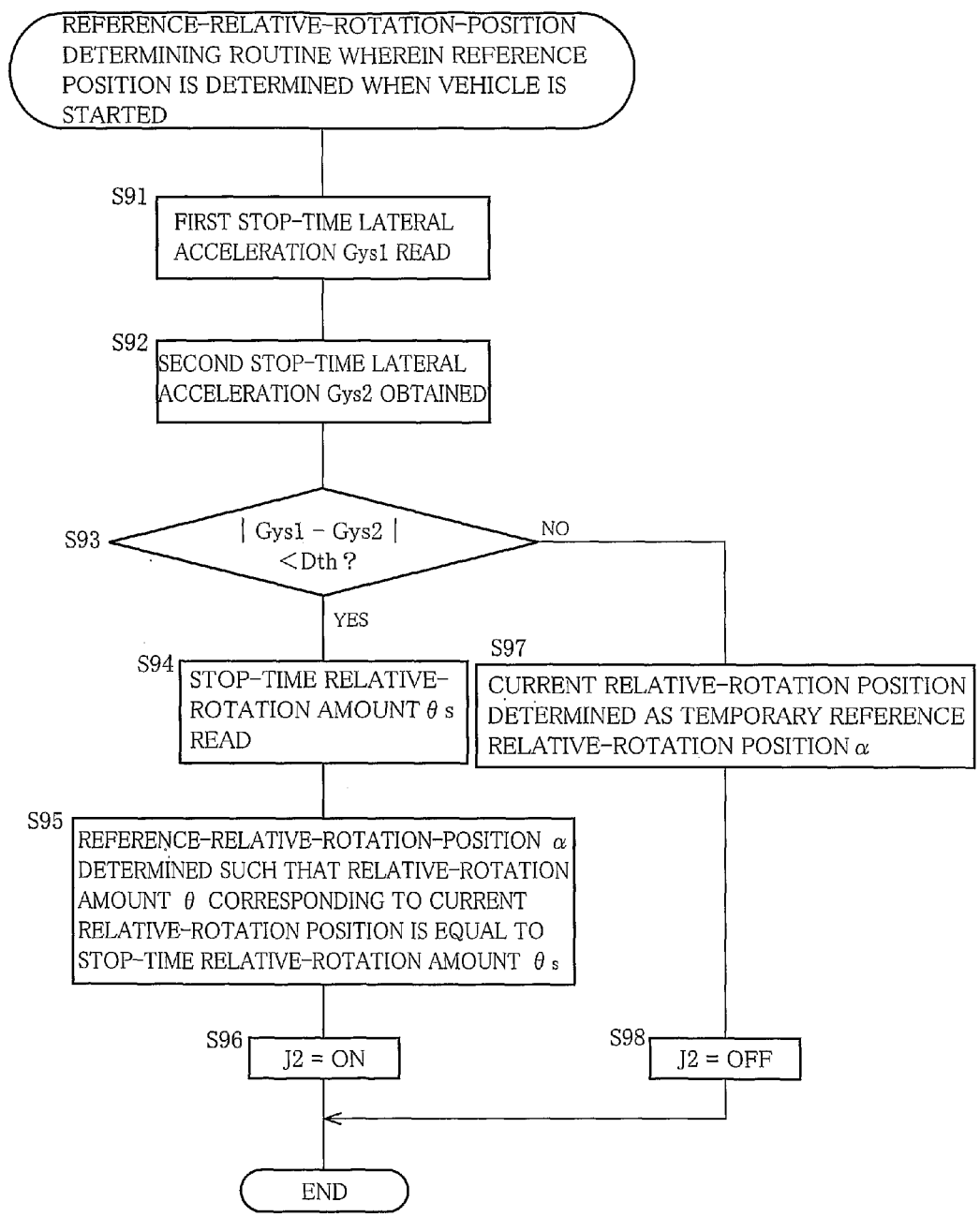
FIG. 17 is a flow chart representing a start-time reference-relative-rotation-position determining routine that is implemented by the electronic control unit of the stabilizer system as the fourth embodiment.

FIG. 17 is the flow chart representing the start-time reference-relative-rotation-position determining routine of Step S82. First, at Step S91, the ECU 110 reads, from the storage device 130, the stop-time lateral acceleration Gys1 when the engine of the vehicle was stopped; and at Step S92, the ECU 110 obtains another stop-time lateral acceleration Gys2 when the engine of the vehicle is started. Then, at Step S93, the ECU 110 judges whether the two stop-time lateral accelerations Gys1, Gys2 can be regarded as being equal to each other, more specifically described, whether a difference of the two acceleration values Gys1, Gys2 is smaller than a predetermined threshold value. If a positive judgment is made at Step S93, the control goes to Step S94 to read, from the storage device 130, the relative-rotation amount θs when the engine of the vehicle was stopped. Step S94 is followed by Step S95 to determine a reference relative-rotation position α such that a current relative-rotation amount θ of the two stabilizer bars 22, 24 that is measured, when the engine is started, from the thus determined reference relative-rotation position α, is equal to the relative-rotation amount θs thereof when the engine of the vehicle was stopped. More specifically described, a relative-rotation amount θ has a positive or negative sign indicating in which one of the two, opposite directions the two stabilizer bars 22, 24 are rotated relative to each other. For example, a relative-rotation amount θ may have a positive sign when the vehicle turns to the left and the body rolls in the right direction (i.e., the right half portion of the body moves downward and the left half portion thereof moves upward). In this case, if the relative-rotation amount θs is positive, a reference relative-rotation position α of the two stabilizer bars 22, 24 is determined as being equal to a relative-rotation position thereof that is distant from a relative-rotation amount θ thereof when the engine is started, by the relative-rotation amount θs in a negative direction corresponding to the rolling of the body in the left direction. Then, the control goes to Step S96 to set a flag, J2, to an ON state, J2=ON, indicating that a proper reference relative-rotation position α has been determined, and one control cycle according to this routine is ended.

On the other hand, if a negative judgment is made at Step S93, the control goes to Step S97 to determine, as a temporary reference relative-rotation position α, the current relative-rotation amount θ of the two stabilizer bars 22, 24 measured when the engine is started. Then, the control goes to Step S98 to set the flag J2 to an OFF state, J2=OFF, indicating that a proper reference relative-rotation position α has not been determined yet.

As is apparent from the foregoing description, if the posture of the vehicle in the stopped state does not change during a time duration from the time when the engine of the vehicle is stopped to the time when the engine is re-started, the proper reference relative-rotation position α can be determined as soon as possible after the engine is re-started. In addition, even if the posture of the vehicle may change during that time duration, an inappropriate reference relative-rotation position α can be prevented from being used in the rolling-restraining controlling routine of Step S78, and an appropriate reference relative-rotation position α can be determined in a different determining routine, i.e., the reference-relative-rotation-position determining routine of Step S75. At Step S75, the routine of FIG. 13 is carried out and, if a proper reference relative-rotation position α is determined at Step S61, the flag M2 is set to the ON state. If the ECU 110 finds, at Step S76 of the program of FIG. 15, that at least one of the two flags J2, M2 is set in the ON state, a positive judgment is made, and the control goes to Step S77. And, if a positive judgment is made at Step S77, the ECU 110 carries out the rolling-restraining controlling routine at Step S78.

The stop-time lateral acceleration Gys is a sort of stop-time rolling-amount estimation basis physical quantity that can be used to estimate a rolling amount of the vehicle's body when the vehicle is in the stopped state. The present stabilizer system may additionally employ two stroke sensors, not shown, that detect respective amounts of movements of the left and right wheels 16 toward, and away from the vehicle7s body (or the respective distances of the left and right wheels 16 each from the body). In the latter case, the ECU 110 may store, as the stop-time rolling-amount estimation basis physical quantity, at least one of (a) the stop-time lateral acceleration Gys and (b) the respective amounts of movements of the left and right wheels 16 toward, and away from the vehicle's body (or the respective distances of the left and right wheels 16 each from the body).

Figure 18:
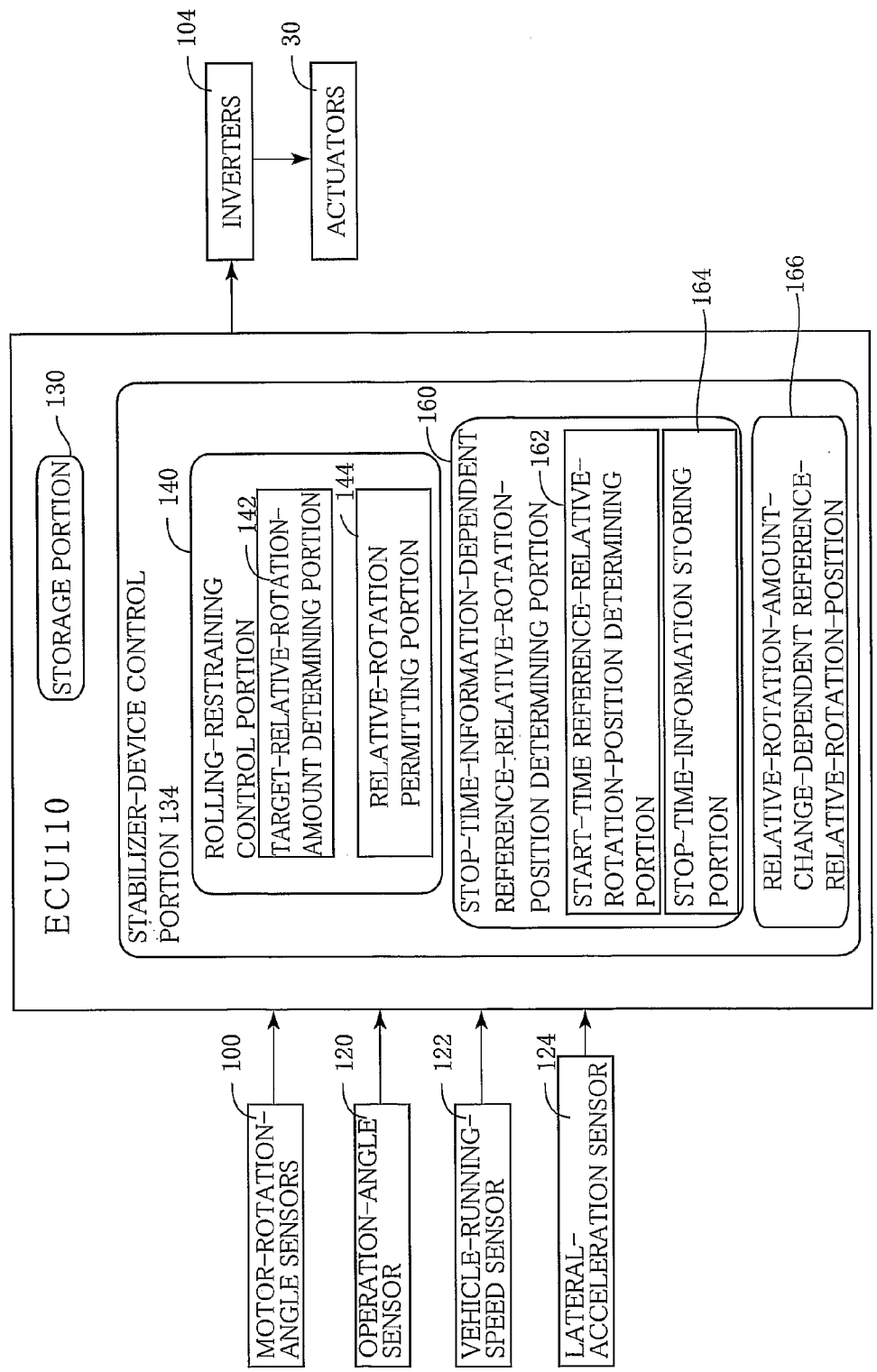
FIG. 18 is a block diagram corresponding to FIGS. 9 and 14, and illustratively showing various control functions of the electronic control unit of the stabilizer system as the fourth embodiment.

FIG. 18 is a block diagram showing various control functions of the ECU 110. This block diagram is basically identical with that of FIG. 9 corresponding to the first embodiment, and differences of this diagram from that of FIG. 9 are as follows: The stabilizer-device control portion 134 includes a stop-time-information-dependent reference-relative-rotation-position determining portion 160 that carries out Step S72 of FIG. 15, i.e., the stop-time-information-dependent reference-relative-rotation-position determining routine of FIG. 16. The stop-time-information-dependent determining portion 160 includes a start-time reference-relative-rotation-position determining portion 162 that carries out Step S82

(i.e., FIG. 17); and a start-time-information storing portion 164 that carries out Step S85. In addition, the stabilizer-device control portion 134 includes a relative-rotation-amount-change-dependent reference-relative-rotation-position determining portion 166 that carries out Step S75 of FIG. 15 and that is identical with the relative-rotation-amount-change-dependent reference-relative-rotation-position determining portion 156 of FIG. 14. However, the reference-relative-rotation-position determining portion 166 may be replaced by a different reference-relative-rotation-position determining portion, e.g., the control-start-timing reference-relative-rotation-position determining portion 150 of FIG. 9 (or the control-start-timing neutral-position-determination-type reference-relative-rotation-position determining portion, employed in the second embodiment). In the latter case, Step S73 of FIG. 15 may be omitted. Alternatively, the reference-relative-rotation-position determining portion 166 may be replaced by a stroke-amount-dependent reference-relative-rotation-position determining portion 190 shown in FIG. 22, or a turning-time-rolling-amount-dependent reference-relative-rotation-position determining portion 202 shown in FIG. 27, each of which will be described later.

5. Fifth Embodiment

Figure 19:
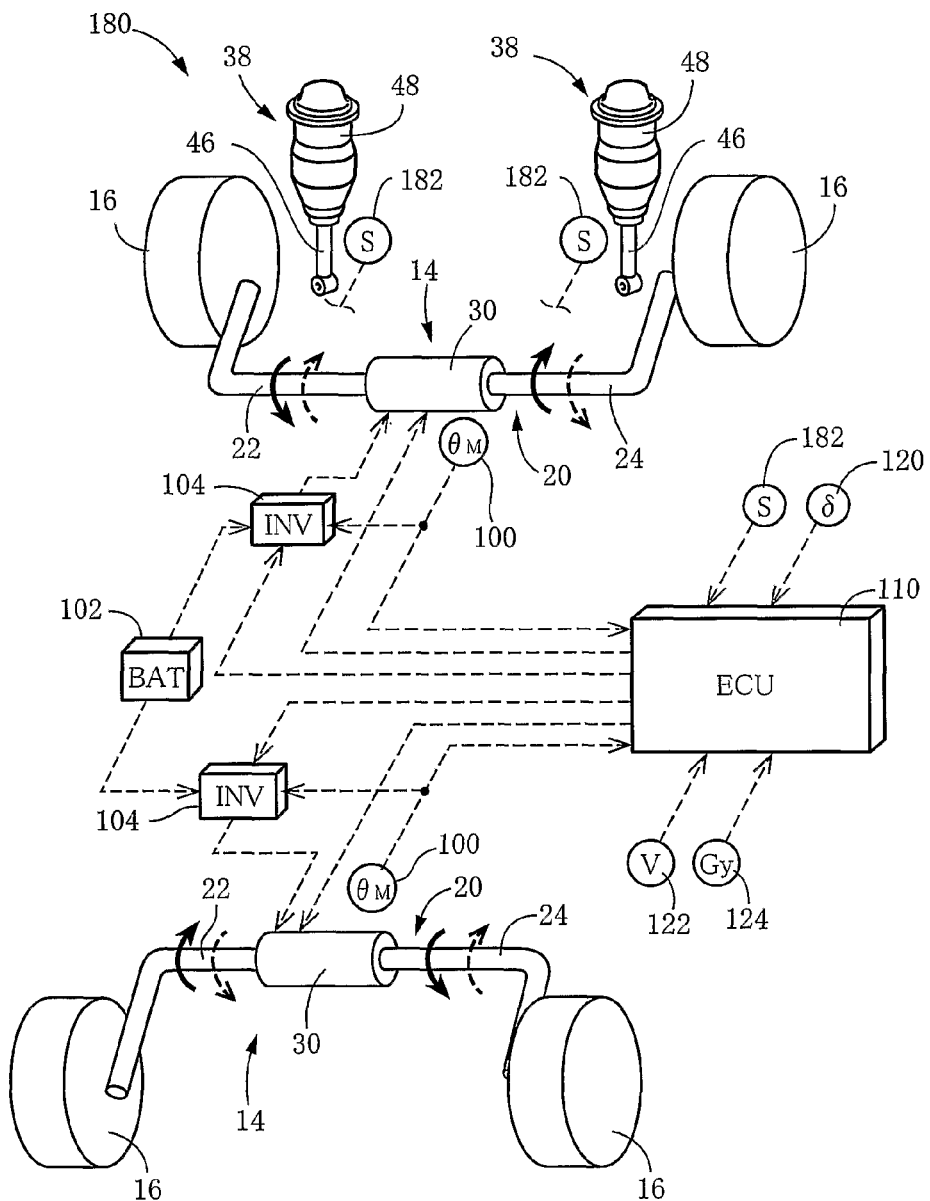
FIG. 19 is an illustrative view corresponding to FIG. 1, and showing another stabilizer system as a fifth embodiment of the present invention.

The fifth embodiment relates to a stabilizer system 180, shown in FIG. 19, that has the same construction as that of the stabilizer system 10 as each of the first to fourth embodiments, except that the former stabilizer system 180 additionally includes four stroke sensors 182 that are provided for the four wheels 16, respectively (the representative two stroke sensors 182 are shown in FIG. 19). Each of the four stroke sensors 182 detects an amount of movement of a corresponding one of the four wheels 16 toward, and away from, the vehicle's body (hereinafter, referred to the "stroke amount", where appropriate). The four stroke sensors 182 are connected to the ECU 110, so that the ECU 110 can obtain the respective stroke amounts of the four wheels 16 (or a difference of respective distances of each pair of left and right wheels 16 from the vehicle's body), based on respective detection signals supplied thereto from the stroke sensors 182.

Figure 20:
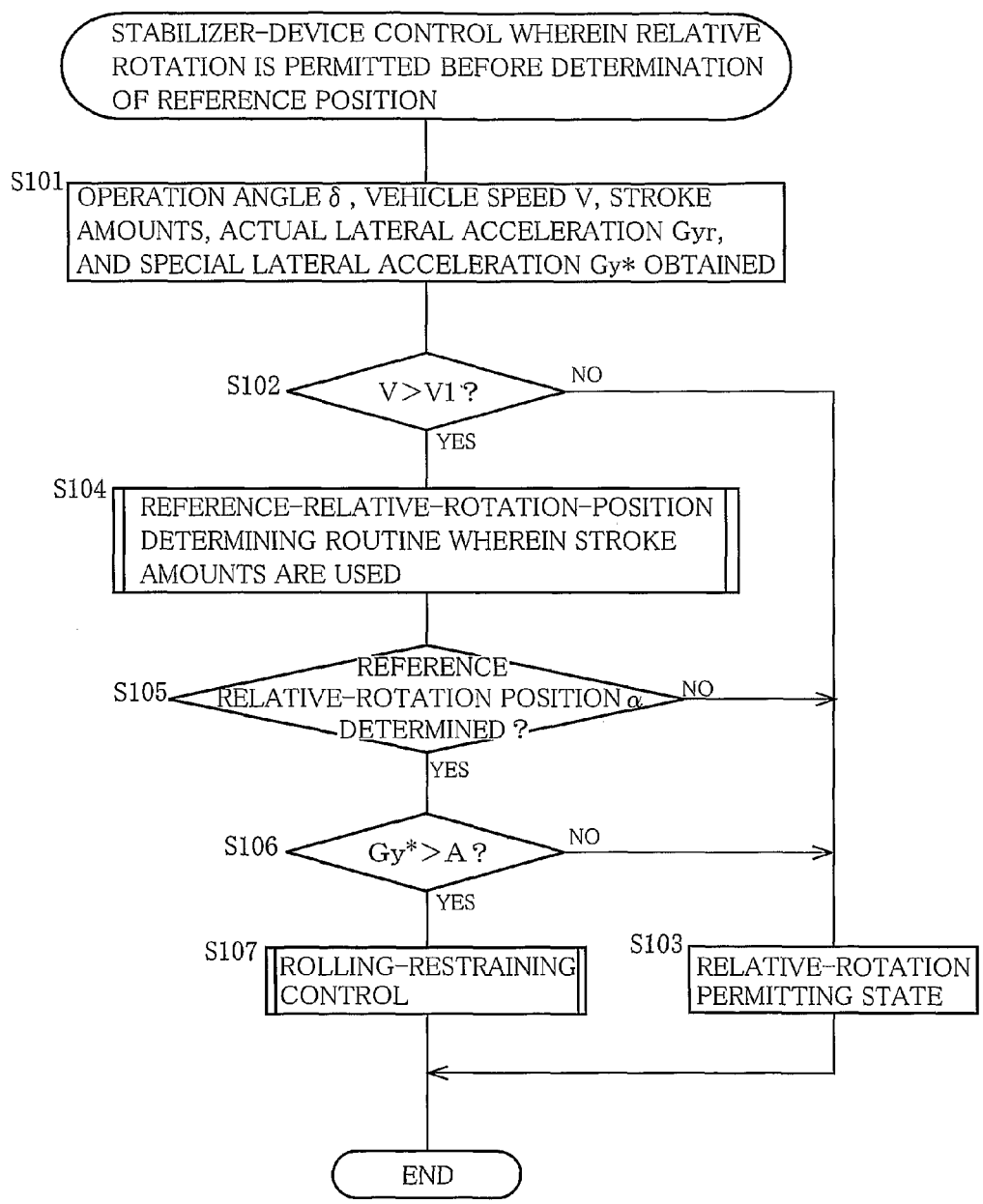
FIG. 20 is a flow chart corresponding to FIGS. 4, 12 and 15, and representing another stabilizer-device controlling program that is implemented by an electronic control unit of the stabilizer system as the fifth embodiment.

FIG. 20 shows a flow chart representing a stabilizer-device controlling program wherein a rolling-restraining controlling routine is not carried out in a state in which a reference relative-rotation position α has not been determined. Since the program of FIG. 20 includes many steps common to the steps of the program of FIG. 12, the following description is mainly focused on different steps of FIG. 20 than the steps of FIG. 12. Steps S102, S103, and S105 through S107 are identical with Steps S42, S43, and S45 through S47, respectively. First, at Step S101, the ECU 110 obtains a current operation angle δ, a current running speed V of the vehicle, a current actual lateral acceleration Gyr, and respective stroke amounts of the left and right wheels 16. In the present embodiment, a special lateral acceleration Gy* is obtained based on the actual lateral acceleration Gyr and an estimated lateral acceleration Gyc, according to the following expression (1):

$$Gy^* = K_1 \cdot Gyc + K_2 \cdot Gyr \quad (1)$$

In this expression, coefficients $K_1$, $K_2$ are experimentally determined, in advance, so as to restrain effectively the rolling of the vehicle. The coefficients $K_1$, $K_2$ may be determined such that the sum of the two coefficients $K_1$, $K_2$ is equal to 1, or such that each of the coefficients $K_1$, $K_2$ is variable with the operation angle δ, the running speed V, and/or the actual lateral acceleration Gyr. The estimated lateral acceleration Gyc is obtained in the same manner as the manner in which the special lateral acceleration Gy* is obtained in the first embodiment.

Figure 21:
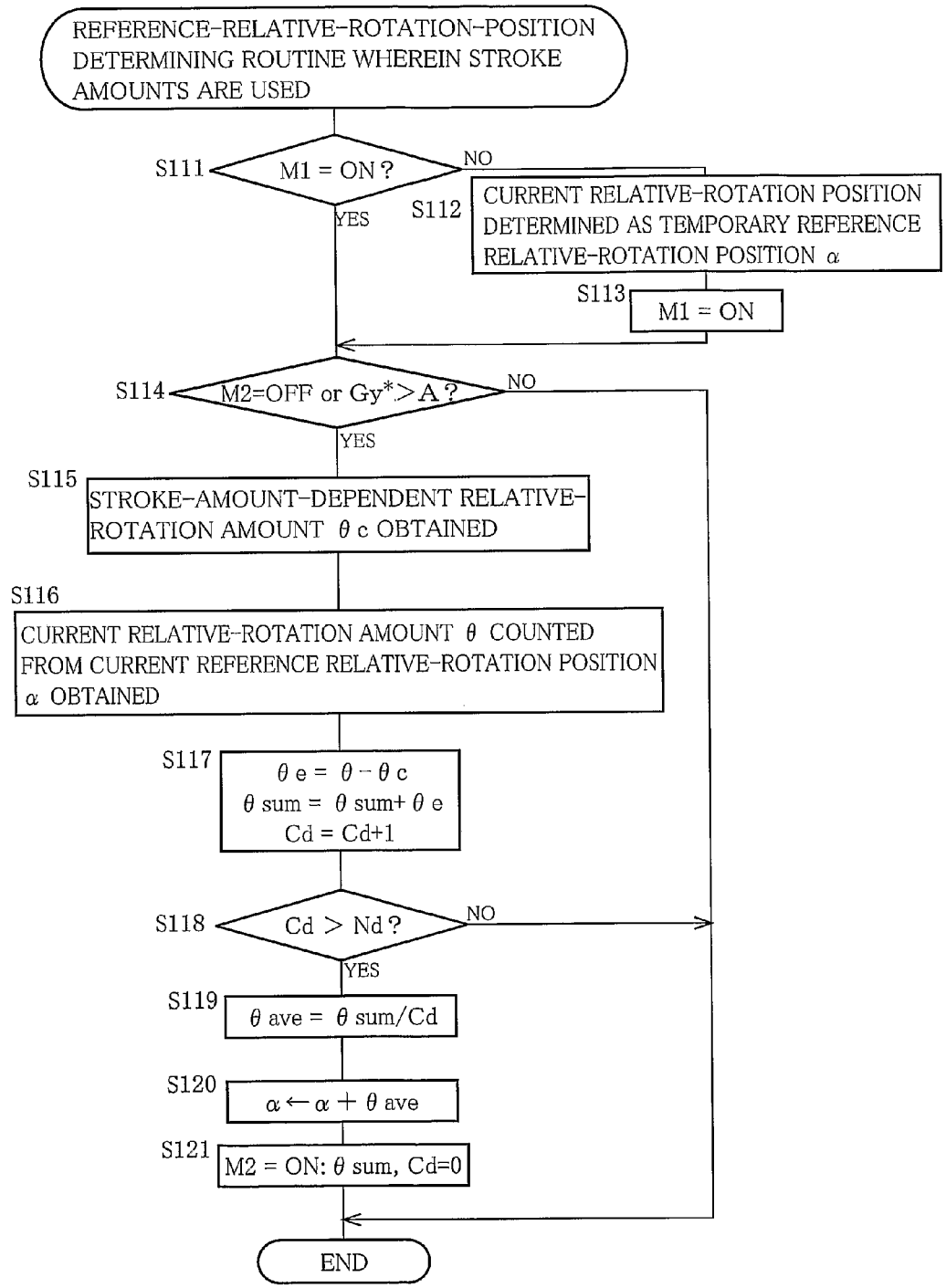
FIG. 21 is a flow chart corresponding to FIGS. 8, 13, and 16, and representing a stroke-amount-dependent reference-relative-rotation-position determining routine that is implemented by the electronic control unit of the stabilizer system as the fifth embodiment.

FIG. 21 is a flow chart representing a stroke-amount-dependent reference-relative-rotation-position determining routine of Step S104 of FIG. 20. At Steps S111 through S113 that are identical with Steps S51 through S53 of FIG. 13, respectively, a temporary reference relative-rotation position α is determined. In the present routine of FIG. 21, a proper reference relative-rotation position α is determined in the above-described, relative-rotation permitting state in which the two stabilizer bars 22, 24 are permitted to be rotated relative to each other. More specifically described, at Step S114, the ECU 110 judges whether at least one of (a) a first condition that the flag M2 is set in the OFF state indicating that a proper reference relative-rotation position α has not been determined and (b) a second condition that the special lateral acceleration Gy* is smaller than the control-start-timing reference value A is met. If a positive judgment is made at Step S114, then the ECU 110 carries out Step S115 and the following steps. If the flag M2 is set in the OFF state, a proper reference relative-rotation position α has not been determined yet; and if the special lateral acceleration Gy* is smaller than the control-start-timing reference value A, the necessity of performing the rolling-restraining routine of FIG. 6 is low. Therefore, the rolling-restraining routine is not performed, and the two stabilizer bars 22, 24 are placed in the relative-rotation permitting state, at Step S103 of FIG. 20.

If a negative judgment is made at Step S114, one control cycle in accordance with the present routine is ended. On the other hand, if a positive judgment is made at Step S114, then the ECU 110 carries out Step S115 and the following steps. At Step S115, the ECU 110 obtains, based on the respective stroke amounts of the left and right wheels 16, a stroke-amount-dependent relative-rotation amount, θc, of the two wheels 16 counted from the neutral relative-rotation position thereof (the relative-rotation amount θc is a sort of distance-difference-dependent relative-rotation amount). In the relative-rotation permitting state, the two stabilizer bars 22, 24 are permitted to be rotated relative to each other, mainly according to the respective stroke amounts of the left and right wheels 16 each from the body, i.e., the respective amounts of movement thereof toward, and away from, the body. Based on a difference of the respective stroke amounts of the two wheels 16, i.e., a difference of the respective distances of the two wheels 16 from the body, a relative-rotation amount of the two stabilizer bars 22, 24 counted from the neutral relative-rotation position thereof can be estimated. In the present embodiment, the storage portion 130 (FIG. 22) of the ECU 110 stores a stroke-amount-dependent relative-rotation-amount map that represents a relationship between respective stroke amounts of the left and right wheels 16 and relative-rotation amount of the two stabilizer bars 22, 24 counted from the neutral relative-rotation position. The ECU 110 obtains the stroke-amount-dependent relative-rotation amount θc, by reading, from the stroke-amount-dependent relative-rotation-amount map, a relative-rotation amount of the two stabilizer bars 22, 24 that corresponds to the respective stroke amounts of the left and right wheels 16, obtained at Step S101.

Then, at Step S116, the ECU 110 obtains a current relative-rotation amount θ of the two stabilizer bars 22, 24 counted from a current reference relative-rotation position thereof α thereof. If a proper reference relative-rotation position α has not been determined at Step S120, the current reference relative-rotation position thereof α is a temporary reference relative-rotation position α determined at Step S112. Subsequently, at Step s117, the ECU 110 calculates a difference, θe, of the relative-rotation amount θ and the stroke-amount-dependent relative-rotation amount θc, adds the difference θe to a sum, θsum, of the differences θe, and adds 1 to a number, Cd, counted by a counter. The sum θsum and the counted number Cd are re-set to zero when the engine of the vehicle is started. Then, at Step S118, the ECU 110 judges whether the counted number Cd is greater than a reference value, Nd. If a negative judgment is made at Step S118, one control cycle in accordance with the present routine is ended. If the present routine is repeated and the counted number Cd exceeds the reference value Nd, i.e., if a positive judgment is made at Step S118, the control of the ECU 110 goes to Step S119 to calculate an average, θave, of the differences θe, by dividing the sum θsum by the counted number Cd, i.e., Cd=Nd+1. Subsequently, at Step S120, the ECU 110 determines, as a new reference relative-rotation position α, the current reference relative-rotation position α plus the average θave, i.e., a relative-rotation position of the two stabilizer bars members 22, 24 that is distant from the current reference position α by the average θave. At this step, the deviation of the current reference relative-rotation position α from the neutral reference relative-rotation position is zeroed, and a proper reference relative-rotation position α is determined. Then, the control goes to Step S121 to set the flag M2 to the ON state, and reset the sum θsum and the counted number Cd to zero. Thus, one control cycle is ended.

According to the stroke-amount-dependent reference-relative-rotation-position determining routine of FIG. 21, if the two stabilizer bars members 22, 24 are in the relative-rotation permitting state, the proper reference relative-rotation position α can be determined irrespective of whether the vehicle is in the above-described straight-running state. And, according to the stabilizer-device controlling program of FIG. 20, in the state in which the proper reference relative-rotation position α has not been determined, i.e., the flag M2 is set in the OFF state, the two stabilizer bars members 22, 24 are placed, at Step S103, in the relative-rotation permitting state, irrespective of whether the vehicle is in the straight-running state. That is, according to the present routine, if the proper reference relative-rotation position α has not been determined at a time immediately after the engine of the vehicle is started, first, the proper reference relative-rotation position α is determined irrespective of whether the vehicle is in the straight-running state. Meanwhile, once the proper reference relative-rotation position α is determined, the proper reference relative-rotation position α is updated in the straight-running state of the vehicle. Thus, the proper reference relative-rotation position α is determined at a considerably early timing after the engine of the vehicle is started, and then the proper reference position α is updated repeatedly. Therefore, the stabilizer device 14 can exhibit an appropriate rolling-restraining effect.

According to the present reference-relative-rotation-position determining routine, the proper reference relative-rotation position α is determined based on the two stroke amounts as a sort of wheel-body-distance-difference estimation basis physical quantity that can be used to estimate the above-described wheel-body-distance difference. In addition, based on the two stroke amounts, the relative-rotation amount of the two stabilizer bar members 22, 24 counted from the neutral relative-rotation position thereof is obtained as a stroke-amount-dependent relative-rotation amount thereof. The stroke-amount-dependent relative-rotation amount of the two stabilizer bar members 22, 24 is a sort of wheel-body-distance-difference-dependent relative-rotation amount corresponding to the wheel-body-distance-difference estimation basis physical quantity. In addition, in the present embodiment, the special lateral acceleration Gy* as the rolling-moment estimation basis physical quantity is used as the target-relative-rotation-amount determination basis quantity. And, once the proper reference relative-rotation position α is determined, the reference relative-rotation position α is updated in the straight-running state of the vehicle, i.e., in the state in which the special lateral acceleration Gy* does not exceed the control-start-timing reference value A.

Figure 22:
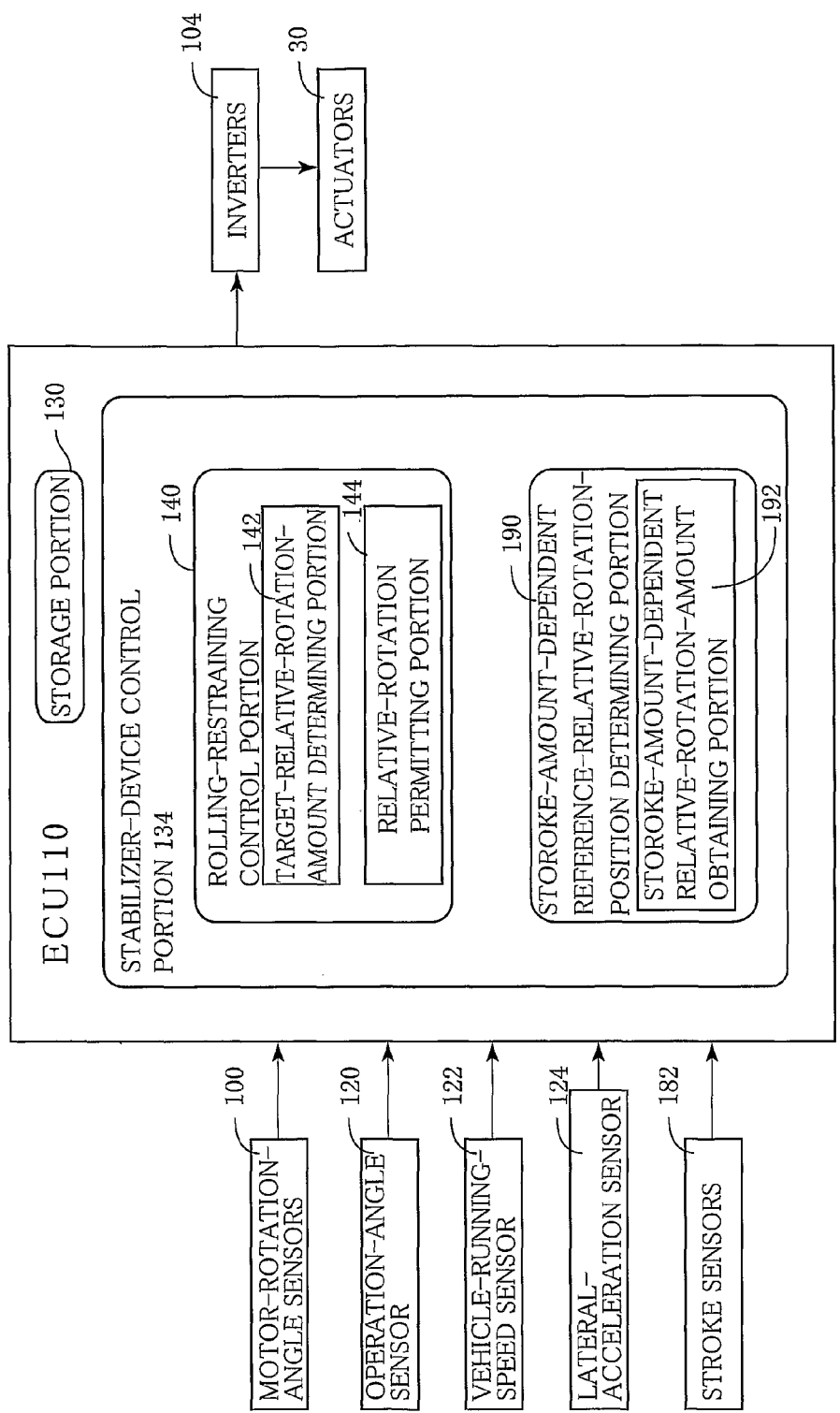
FIG. 22 is a block diagram corresponding to FIGS. 9, 14 and 18, and illustratively showing various control functions of the electronic control unit of the stabilizer system as the fifth embodiment.

FIG. 22 is a block diagram showing various control functions of the ECU 110. This block diagram is basically identical with that of FIG. 9 corresponding to the first embodiment, and differences of this diagram from that of FIG. 9 are as follows: The stabilizer-device control portion 134 includes a stroke-amount-dependent reference-relative-rotation-position determining portion 190 (i.e., a sort of distance-difference-dependent-relative-rotation-amount-dependent reference-relative-rotation-position determining portion) that carries out Step S104 of FIG. 20, i.e., the stroke-amount-dependent reference-relative-rotation-position determining routine of FIG. 21. The stroke-amount-dependent reference-relative-rotation-position determining portion 190 includes a stroke-amount-dependent-relative-rotation-amount obtaining portion 192 that carries out Step S115 of FIG. 21.

6. Sixth Embodiment

Figure 23:
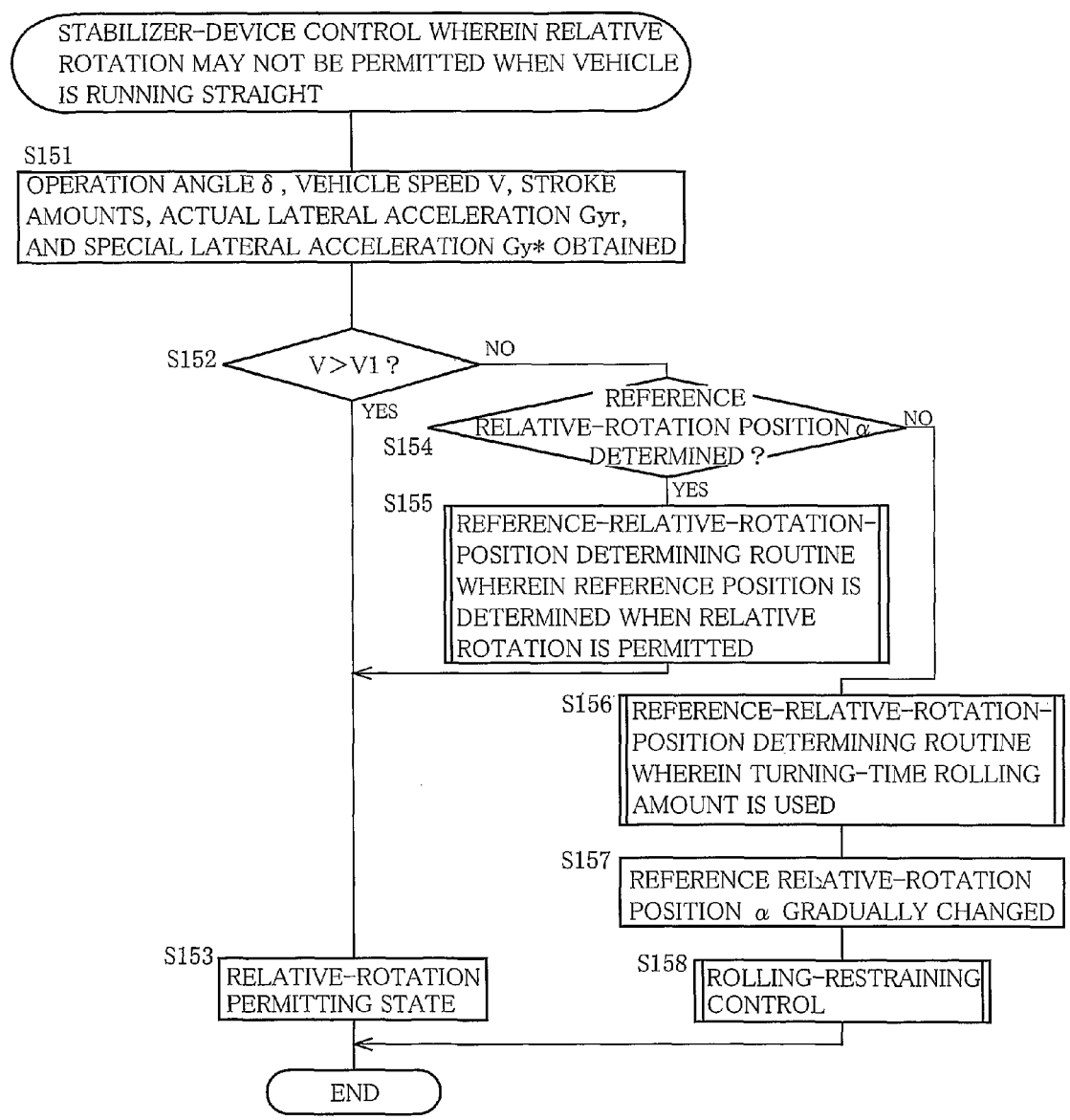
FIG. 23 is a flow chart corresponding to FIGS. 4, 12, 15, and 20, and representing another stabilizer-device controlling program that is implemented by an electronic control unit of the stabilizer system as a sixth embodiment of the present invention.
Figure 24:
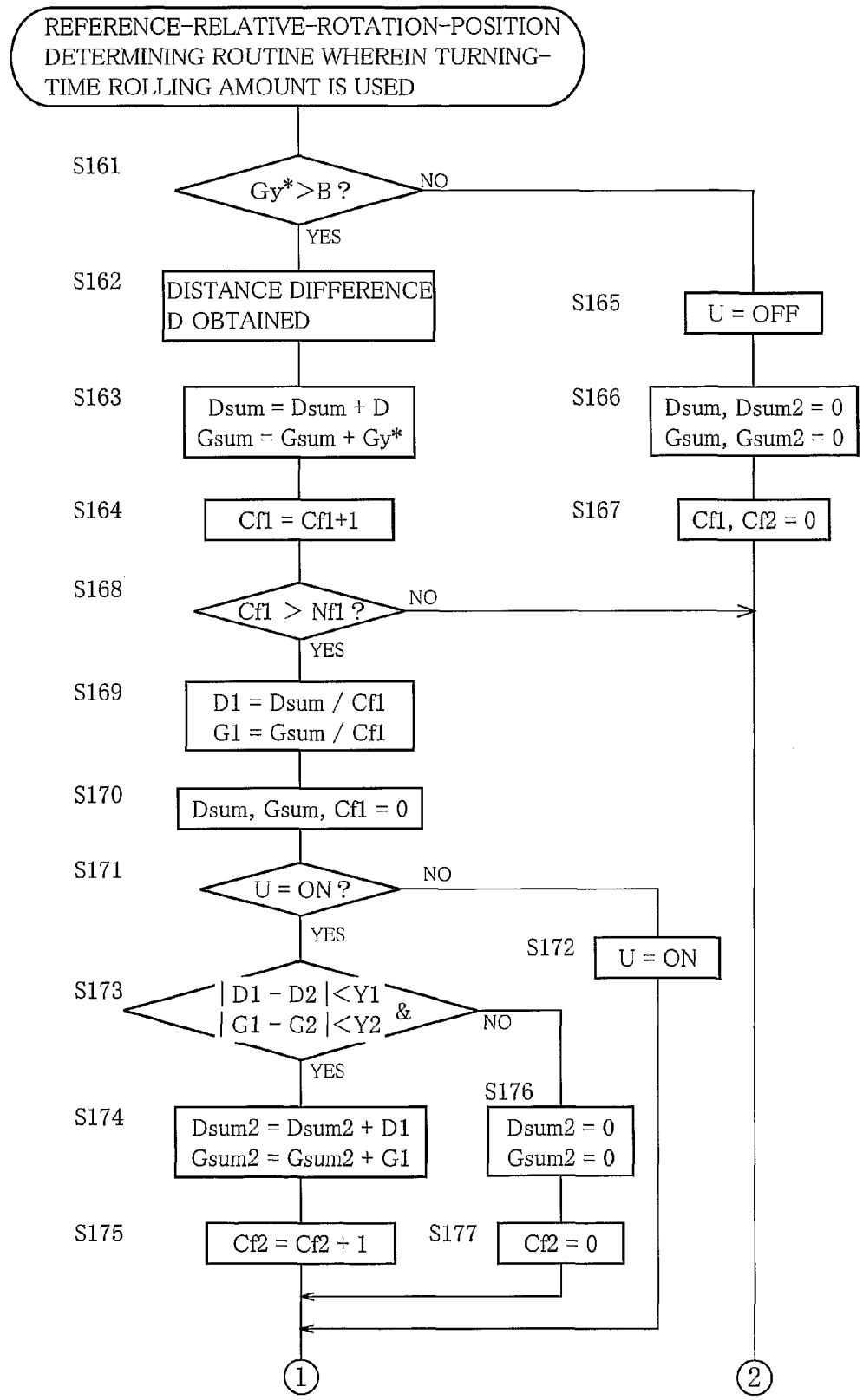
FIG. 24 is a flow chart corresponding to FIGS. 8, 13, 16, and 21, and representing a first half portion of a turning-time-rolling-amount-dependent reference-relative-rotation-position determining routine that is implemented by the electronic control unit of the stabilizer system as the sixth embodiment.
Figure 25:
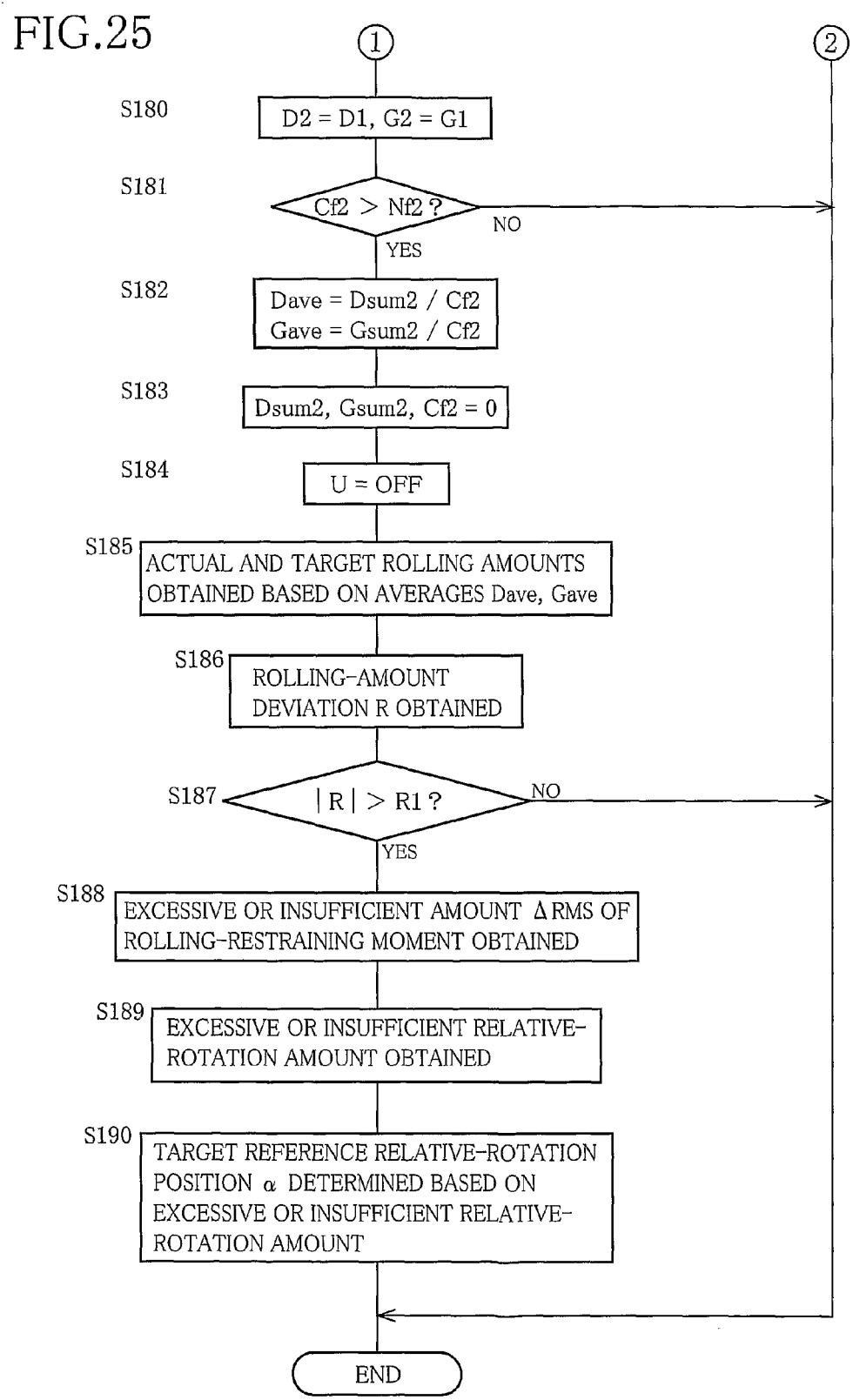
FIG. 25 is a flow chart representing a second half portion of the turning-time-rolling-amount-dependent reference-relative-rotation-position determining routine.

The sixth embodiment relates to a stabilizer system having the same construction as that of the stabilizer system 180 as the fifth embodiment, but implements a turning-time-rolling-amount-dependent reference-relative-rotation-position determining routine, shown in FIGS. 24 and 25, wherein a reference relative-rotation position α is determined when the vehicle is turning. FIG. 23 shows a flow chart representing a stabilizer-device controlling program wherein the two stabilizer bar members 22, 24 may not be placed in the relative-rotation permitting state when the vehicle is running straight, e.g., in a state in which a special lateral acceleration Gy* is not greater than a control-start-timing reference value A. Since the program of FIG. 23 includes many steps common to the steps of the program of FIG. 20, the following description is mainly focused on different steps of FIG. 23 than the steps of FIG. 20. Steps S151 through S154 and Step S158 of FIG. 23 are identical with Steps S101 through S103, S105, and S107 of FIG. 20, respectively. The special lateral acceleration Gy* is obtained in the same manner as that employed in the fifth embodiment, i.e., based on the actual lateral acceleration Gyr and the estimated lateral acceleration Gyc, according to the expression (1). Like the program of FIG. 20, the present program is adapted such that if the vehicle's running speed V is not higher than the reference value V1, i.e., a negative judgment is made at Step S152, or if a proper reference relative-rotation position α has not been determined yet, i.e., a negative judgment is made at Step S154, then the control of the ECU 110 does not go to Step S158, i.e., the rolling-restraining control routine of FIG. 6, but goes to Step S153 to place the two stabilizer bar members 22, 24 placed in the relative-rotation permitting state.

Meanwhile, if a positive judgment is made at Step S152 and a negative judgment is made at Step S154, then the control of the ECU 110 goes to Step S155 as a relative-rotation-permitting-time reference-relative-rotation-position determining routine. In the present embodiment, the stroke-amount-dependent reference-relative-rotation-position determining routine of FIG. 21 is implemented as the relative-rotation-permitting-time reference-relative-rotation-position determining routine, and accordingly the description thereof is omitted. Immediately after the engine of the vehicle is started, a proper reference relative-rotation position α has not been determined yet, and accordingly a negative judgment is made at Step S154 before the proper reference relative-rotation position α is determined at Step S155. Once the proper reference relative-rotation position α is determined at Step S155, the ECU 110 carries out Step S156, i.e., the turning-time-rolling-amount-dependent reference-relative-rotation-position determining routine. According to this routine, if a current reference relative-rotation position α is inappropriate, an appropriate reference relative-rotation position α is determined based on a lateral acceleration and a rolling amount of the vehicle's body when the vehicle is steadily turning. Once the reference relative-rotation position α is determined at Step S156, the control goes to Step S157 to change gradually the current, inappropriate reference relative-rotation position α toward the new, appropriate reference relative-rotation position α. Then, the ECU 110 carries out, at Step S158, the rolling-restraining control routine of FIG. 6.

In the turning-time-rolling-amount-dependent reference-relative-rotation-position determining routine at Step S156, if the current reference relative-rotation position α is inappropriate, an appropriate reference relative-rotation position α is determined based on a deviation of an actual rolling amount of the vehicle's body at a time when the vehicle is steadily turning, from a target rolling amount thereof as an appropriate rolling amount corresponding to the special lateral acceleration Gy* at that time, i.e., the steady-turning time. More specifically described, in the case where the actual rolling amount at the steady-turning time is smaller than the target rolling amount, it can be judged that the current rolling-restraining effect of the two stabilizer bar members 22, 24 is too high. That is, it can be judged that the current relative-rotation amount of the two stabilizer bar members 22, 24 counted from the neutral relative-rotation position thereof is excessively large, i.e., the amount of twisting of the two members 22, 24 is excessively large, and accordingly the current rolling-restraining moment (i.e., a sort of rolling-restraining force) applied to the vehicle's body is excessively great. In this case, a new reference relative-rotation position α is so determined as to decrease the relative-rotation amount of the two stabilizer bar members 22, 24 at the steady-turning time. On the other hand, in the case where the actual rolling amount at the steady-turning time is greater than the target rolling amount, it can be judged that the current rolling-restraining effect of the two stabilizer bar members 22, 24 is too low. That is, it can be judged that the current relative-rotation amount of the two stabilizer bar members 22, 24 counted from the neutral relative-rotation position thereof is insufficiently small, i.e., the amount of twisting of the two members 22, 24 is insufficiently small, and accordingly the current rolling-restraining moment is insufficiently small. In the latter case, a new reference relative-rotation position α is so determined as to increase the relative-rotation amount of the two stabilizer bar members 22, 24 at the steady-turning time.

FIGS. 24 and 25 cooperate with each other to show the flow chart representing the turning-time-rolling-amount-dependent reference-relative-rotation-position determining routine. In this routine, a reference relative-rotation position α is determined when the vehicle is turning, i.e., in a state in which the lateral special acceleration Gy* is greater than a reference value, B. If the special lateral acceleration Gy* is greater than the reference value B, a positive judgment is made at Step S161, and the control of the ECU 110 goes to Steps S162 through S168. More specifically described, at Step S162, a wheel-body-distance difference, D, as a difference of respective stroke amounts of the left and right wheels 16 is obtained; at Step S163, the thus obtained wheel-body-distance difference D is added to a current sum, Dsum, of wheel-body-distance differences D, and the lateral special acceleration Gy* is added to a current sum, Gsum, of special lateral accelerations Gy*; and at Step S164, 1 is added to a number, Cf1, counted by a counter. On the other hand, if a negative judgment is made at Step S161, the control of the ECU 110 goes to Steps S165 through S167 to reset a flag, U, described later, to an OFF state, U=OFF, reset the wheel-body-distance-difference sum Dsum and the special-lateral-acceleration sum Gsum to zero, reset two steady-turning-time sums Dsum2, Gsum2, described later, to zero, reset the counted number Cf to zero, and reset a number, Cf2, counted by a counter, described later, to zero. Then, one control cycle in accordance with the present routine is ended. Step S164 is followed by Step S168 to judge whether the counted number Cf1 is greater than a reference value, Nf1. If a negative judgment is made at Step S168, one control cycle is ended. If the present routine is repeated and a positive judgment is made at Step S168, then the control of the ECU 110 goes to Step S169 to calculate an average, D1, of the wheel-body-distance difference values D by dividing the wheel-body-distance-difference sum Dsum by the counted number Cf1, and calculate an average, G1, of the special lateral acceleration values Gy* by dividing the special-lateral-acceleration sum Gsum by the counted number Cf1. Then, at Step S170, the ECU 110 resets the two sums Dsum, Gsum and the counted number Cf1, each to zero.

Figure 26:
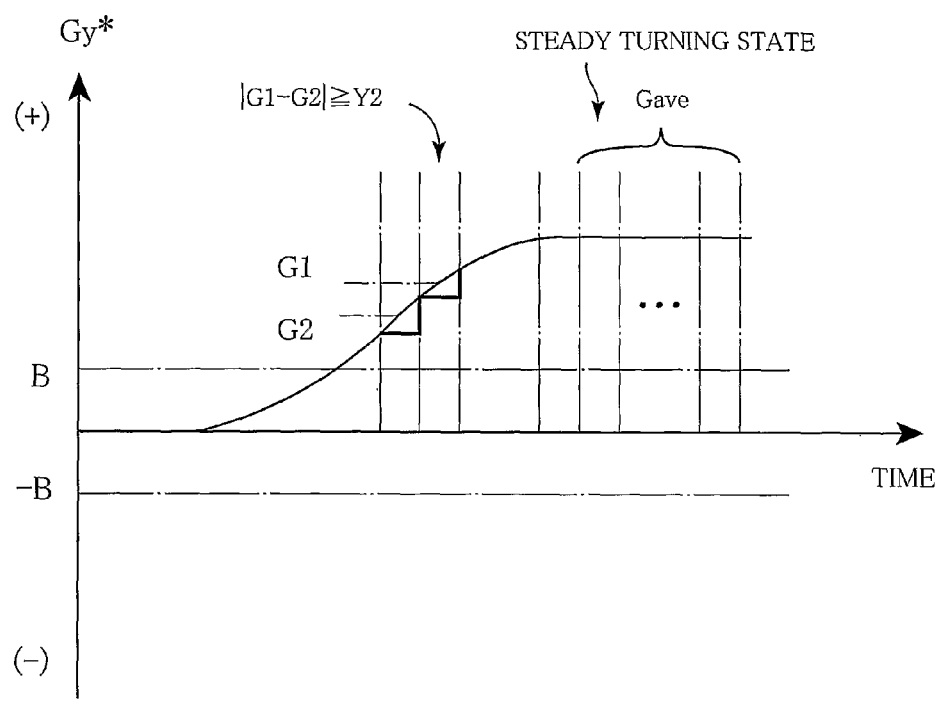
FIG. 26 is a graph illustratively showing a time-wise change of special lateral accelerations Gy* obtained by the electronic control unit of the stabilizer system as the sixth embodiment, and a steady-turning state of the vehicle that can be recognized based on the time-wise change of special lateral accelerations Gy*.

At Steps S171 (FIG. 24) through S184 (FIG. 25), the ECU 110 judges, based on respective changes of the averages D1, G1, whether the vehicle is in the steady-turning state and, if a positive judgment is made, the ECU 110 calculates a steady-turning-time sum, Dsum2, of averages D1, and a steady-turning-time sum, Gsum2, of averages G1, and obtains an average, Dave, of wheel-body-distance differences D and an average, Gave, of special lateral acceleration Gy* each at the steady-turning time. FIG. 26 is a graph illustratively showing an example of a time-wise change of the special lateral acceleration Gy* from a time when the vehicle starts turning to a time when the vehicle is placed in the steady-turning state. More specifically described, at Step S171, the ECU 110 judges whether the flag U is set in an ON state, U=ON, indicating that a judging operation to judge whether the vehicle is in the steady-turning state has been started. When the present routine is carried out for the first or initial time after the engine of the vehicle is started, the flag U is set in the OFF state. For the initial time, a negative judgment is made at Step S171, and the control of the ECU 110 goes to Step S172 to set the flag U to the ON state. Subsequently, the control goes to Step S180 to store the two averages D1, G1 as two initial averages D2, G2, respectively. Step S180 is followed by Step S181 to judge whether the number Cf2, counted by a counter, is greater than a reference number, Nf2. For the initial time, a negative judgment is made at Step S181, and the control of the ECU 110 quits the present routine. Meanwhile, when the present routine is carried out after the flag U is set in the ON state, i.e., if a positive judgment is made at Step S171, the control goes to Step S173 to judge whether the vehicle is in the steady-turning state by judging whether an absolute value of a difference of a current average D1 from the initial average D2 is smaller than a first reference value Y1 and simultaneously an absolute value of a difference of a current average G1 from the initial average G2 is smaller than a second reference value Y2. If a positive judgment is made at Step S173, the control goes to Step S174 to calculate the steady-turning-time sum Dsum2 of the averages D1 and the steady-turning-time sum Gsum2 of the averages G1, and then goes to Step S175 to add 1 to the counted number Cf2. On the other hand, if a negative judgment is made at Step S173, i.e., if it is judged that the vehicle is not in the steady-turning state, the control goes to Steps S176 and S177 to reset each of the two sums Dsum2, Gsum2 and the counted number Cf2 to zero. Then, if a negative judgment is made at Step S181, one control cycle in accordance with the present routine is ended. If the above-described steps have been repeated and the steady-running state of the vehicle has continued for a certain time duration, more specifically described, if positive judgments are continuously made, Nf2 plus one (Nf2+1) times, at Step S173, a positive judgment is made at Step S181, and the control goes to Step S182 to obtain the steady-running-time average. Dave of the wheel-body-distance differences D and the steady-running-time average Gave of the special lateral accelerations Gy*. Since one judging operation to judge whether the vehicle is in the steady-turning state has been completed, the control goes to Steps S183 and S184 to reset each of the two sums Dsum2, Gsum2 and the counted number Cf2 to zero and reset the flag U to the OFF state.

Then, at Steps S185 through 190, the ECU 110 judges whether an actual rolling amount of the vehicle's body at the steady-turning time is appropriate and, if a negative judgment is made, the ECU 110 determines an appropriate reference relative-rotation amount α. More specifically described, at Step S185, the ECU 110 obtains the actual rolling amount of the vehicle's body at the steady-turning time, based on the steady-running-time average Dave of the distance differences D, according to an actual-rolling-amount map that represents a relationship between wheel-body-distance difference D and actual rolling amount and that is pre-stored in the storage portion 130, and additionally obtains a target rolling amount of the body corresponding to a target rolling-restraining effect, based on the steady-running-time average Gave of the special lateral accelerations Gy*, according to a target-rolling-amount map that represents a relationship between special lateral acceleration Gy* and target rolling amount and that is pre-stored in the storage portion 130. Then, at Step S186, the ECU 110 calculates, as a rolling-amount difference, R, a difference of the target rolling amount from the actual rolling amount and then, at Step S187, the ECU 110 judges whether an absolute value of the rolling-amount difference R is greater than a reference value, R1. If a positive judgment is made at Step S187, the control goes to Step S188 to obtain, based on the rolling-amount difference R, an excessive or insufficient amount, ΔRMS, of a rolling-restraining moment produced by the stabilizer device 14.

The excessive or insufficient amount ΔRMS of the rolling-restraining moment produced by the stabilizer device 14 is defined as a difference of (a) a rolling-restraining moment, RMS*, to be produced by the stabilizer device 14 so that the vehicle is placed in the steady-turning state in a state in which the rolling amount of the vehicle's body is equal to the target rolling amount and (b) a rolling-restraining moment, RMSc, to be produced by the stabilizer device 14 in the state in which the rolling amount of the vehicle's body is equal to the target rolling amount when the rolling-restraining control is performed using the current reference relative-rotation amount α. When the excessive or insufficient amount ΔRMS of the rolling-restraining moment is obtained, it is preferred to take into account a rolling-restraining moment, RMK, produced by the suspension springs 36 as other constituent elements of the vehicle than the stabilizer device 14. The rolling-restraining moment RMK produced by the suspension springs 36 can be obtained based on the rolling amount of the vehicle's body.

More specifically described, in the present embodiment, the excessive or insufficient amount ΔRMS of the rolling-restraining moment produced by the stabilizer device 14 is obtained as a difference of (c) a sum of (c1) a rolling-restraining moment, RMS1, produced by the stabilizer device 14 and (c2) a rolling-restraining moment, RMK1, produced by the suspension springs 36, each in the current, steady-turning state of the vehicle and (d) a sum of (d1) a rolling-restraining moment, RMSc, to be produced by the stabilizer device 14 and (d2) a rolling-restraining moment, RMK2, to be produced by the suspension springs 36, each in the state in which the rolling amount of the vehicle's body is equal to the target rolling amount when the rolling-restraining control is performed using the current reference relative-rotation amount α. Thus, the excessive or insufficient amount ΔRMS is obtained according to the following expression (2):

$$\Delta RMS=(RMS1+RMK1)-(RMSc+RMK2) \qquad (2)$$

The expression (2) can be changed to the following expression (3):

$$\Delta RMS=(RMS1-RMSc)+(RMK1-RMK2) \qquad (3)$$

That is, the excessive or insufficient amount ΔRMS of the rolling-restraining moment produced by the stabilizer device 14 is obtained based on (e) a difference of (c1) the rolling-restraining moment RMS1 produced by the stabilizer device 14 in the steady-turning state of the vehicle and (d1) the rolling-restraining moment RMSc to be produced by the stabilizer device 14 in the state in which the rolling amount of the vehicle's body is equal to the target rolling amount, and (f) a difference of (c2) the rolling-restraining moment RMK1 produced by the suspension springs 36 in the steady-turning state of the vehicle and (d2) the rolling-restraining moment RMK2 to be produced by the suspension springs 36 in the state in which the rolling amount of the vehicle's body is equal to the target rolling amount.

In the present embodiment, the storage portion 130 of the ECU 110 stores a map representing a relationship between rolling-amount difference R and difference, RMSd (=RMS1−RMSc), of the rolling-restraining moment produced by the stabilizer device 14; and a map representing a relationship between rolling-amount difference R and difference, RMKd (=RMK1−RMK2), of the rolling-restraining moment produced by the suspension springs 36. Thus, at Step S188, the ECU 110 reads, from the storage portion 130, the two differences RMSd, RMKd each corresponding to the rolling-amount difference R, and obtains a sum of the two differences RMSd, RMKd, as the excessive or insufficient amount ΔRMS of the rolling-restraining moment produced by the stabilizer device 14.

Subsequently, at Step S189, the ECU 110 obtains, based on the excessive or insufficient amount ΔRMS of the rolling-restraining moment obtained at Step S188, an excessive or insufficient amount of the current relative-rotation amount of the two stabilizer bar members 22, 24 counted from the neutral relative-rotation position thereof, i.e., an excessive or insufficient relative-rotation amount thereof that results from the fact that the current reference relative-rotation position α thereof is not appropriate. In the present embodiment, since the rolling-restraining moment produced by the two stabilizer bar members 22, 24 changes depending upon the twisting amount thereof, the storage portion 130 stores a map representing a predetermined relationship between excessive or insufficient amount ΔRMS of the rolling-restraining moment and excessive or insufficient relative-rotation amount of the two stabilizer bar members 22, 24. However, the storage portion 130 may be modified to store a map representing a predetermined relationship between rolling-amount difference R and excessive or insufficient relative-rotation amount of the two stabilizer bar members 22, 24.

At Step S190, the ECU 110 determines a target reference relative-rotation position α as a target position of the current reference relative-rotation position α to compensate for the excessive or insufficient relative-rotation amount of the two stabilizer bar members 22, 24. As will be described in detail later, the reason why the current reference relative-rotation position α is not immediately updated to a new reference relative-rotation position α, but is gradually changed to the target reference relative-rotation position α is to prevent the reference relative-rotation position α from being largely changed when the vehicle is turning. The target reference relative-rotation position α of the two stabilizer bar members 22, 24 is determined as a relative-rotation position thereof that is distant from the current reference relative-rotation position α thereof by the excessive or insufficient relative-rotation amount thereof, for the purpose of reducing the excessiveness or insufficiency of the rolling-restraining effect thereof. More specifically described, in the case where the current relative-rotation amount of the two stabilizer bar members 22, 24 counted from the neutral relative-rotation position thereof is excessive, a relative-rotation position of the two stabilizer bar members 22, 24 that is distant from the current reference relative-rotation position α thereof by the excessive relative-rotation amount thereof in a direction opposite to the direction in which the relative-rotation position thereof at the steady-turning time is distant from the current reference relative-rotation position α thereof, is determined as the target reference relative-rotation position α thereof, so that at the steady-turning time, a relative-rotation amount of the two stabilizer bar members 22, 24 counted from the target reference relative-rotation position α thereof is greater than a relative-rotation amount thereof counted from the current reference relative-rotation position α thereof. Consequently the relative-rotation amount of the two stabilizer bar members 22, 24 from the neutral relative-rotation position thereof at the steady-turning time can be decreased, and accordingly the rolling-restraining effect thereof can be decreased. On the other hand, in the case where the current relative-rotation amount of the two stabilizer bar members 22, 24 counted from the neutral relative-rotation position thereof is insufficient, a relative-rotation position of the two stabilizer bar members 22, 24 that is distant from the current reference relative-rotation position α thereof by the insufficient relative-rotation amount thereof in the direction in which the relative-rotation position thereof at the steady-turning time is distant from the current reference relative-rotation position α thereof, is determined as the target reference relative-rotation position α thereof, so that at the steady-turning time, a relative-rotation amount of the two stabilizer bar members 22, 24 from the target reference relative-rotation position α thereof is smaller than a relative-rotation amount thereof from the current reference relative-rotation position α thereof. Consequently the relative-rotation amount of the two stabilizer bar members 22, 24 from the neutral relative-rotation position thereof at the steady-turning time can be increased, and accordingly the rolling-restraining effect thereof can be increased.

After the target reference relative-rotation position α has been determined at Step S190 of FIG. 25, the control of the ECU 110 goes to Step S157 of FIG. 23 to change, by a pre-determined incremental amount, the current reference relative-rotation position α of the two stabilizer bar members 22, 24 toward the target reference relative-rotation position α. The incremental amount is so pre-determined as not to influence so strongly the posture of the vehicle's body, even though the current reference relative-rotation position α may be changed by that amount when the rolling-restraining control is performed. Each time the program of FIG. 23 is repeatedly implemented, the current reference relative-rotation position α may be gradually changed, so that a difference of the current reference relative-rotation position α and the target reference relative-rotation position α may be reduced to a value smaller than a reference value. Thus, according to the stabilizer-device controlling program of FIG. 23, a current, inappropriate reference relative-rotation position α can be changed to a target, appropriate reference relative-rotation position α, and accordingly the stabilizer device 14 can exhibit an appropriate rolling-restraining effect.

According to the turning-time-rolling-amount-dependent reference-relative-rotation-position determining routine at Step S156 of FIG. 23, the reference relative-rotation position α is determined based on (a) the special lateral acceleration Gy* as a lateral-acceleration estimation basis physical quantity that can be used to estimate a lateral acceleration of the vehicle's body and (b) the respective stroke amounts of the left and right wheels 16 as the wheel-body-distance-difference estimation basis physical quantity. That is, according to this routine, if the vehicle is in the steady-turning state, then the reference relative-rotation position α can be determined even though the stabilizer device 14 may be under the rolling-restraining control. The stabilizer-device controlling program of FIG. 23 may be modified such that unless the special lateral acceleration Gy* is greater than the control-start-timing reference value A, the rolling-restraining control is not performed. In this modified form, the reference value B, used at Step S161, may be equal to the control-start-timing reference value A. In addition, at Step S173 of FIG. 24, the ECU 110 judges that the vehicle is in the steady-turning state, if the absolute value of the difference of the current wheel-body-distance-difference average D1 from the initial average D2 is smaller than the first reference value Y1 and simultaneously the absolute value of the difference of the current special-lateral-acceleration average G1 from the initial average G2 is smaller than the second reference value Y2. However, Step S173 may be modified such that the ECU 110 compares the absolute value of the difference of the current wheel-body-distance-difference average D1 from the initial average D2, and the absolute value of the difference of the current special-lateral-acceleration average G1 from the initial average G2, with the first reference value Y1 and the second reference value Y2, respectively, and judges that the vehicle is in the steady-turning state if at least one of the two absolute values is smaller than a corresponding one of the two reference values Y1, Y2. Alternatively, Step S173 may be modified such that the ECU 110 compares only one of (a) the absolute value of the difference of the current wheel-body-distance-difference average D1 from the initial average D2, and (b) the absolute value of the difference of the current special-lateral-acceleration average G1 from the initial average G2, with a corresponding one of the first reference value Y1 and the second reference value Y2, and judges that the vehicle is in the steady-turning state if the one of the two absolute values is smaller than the corresponding one of the two reference values Y1, Y2. For example, the ECU 110 may compare only (b) the absolute value of the difference of the current special-lateral-acceleration average G1 from the initial average G2, with the second reference value Y2, and judges that the vehicle is in the steady-turning state if the absolute value is smaller than the reference value Y2.

Figure 27:
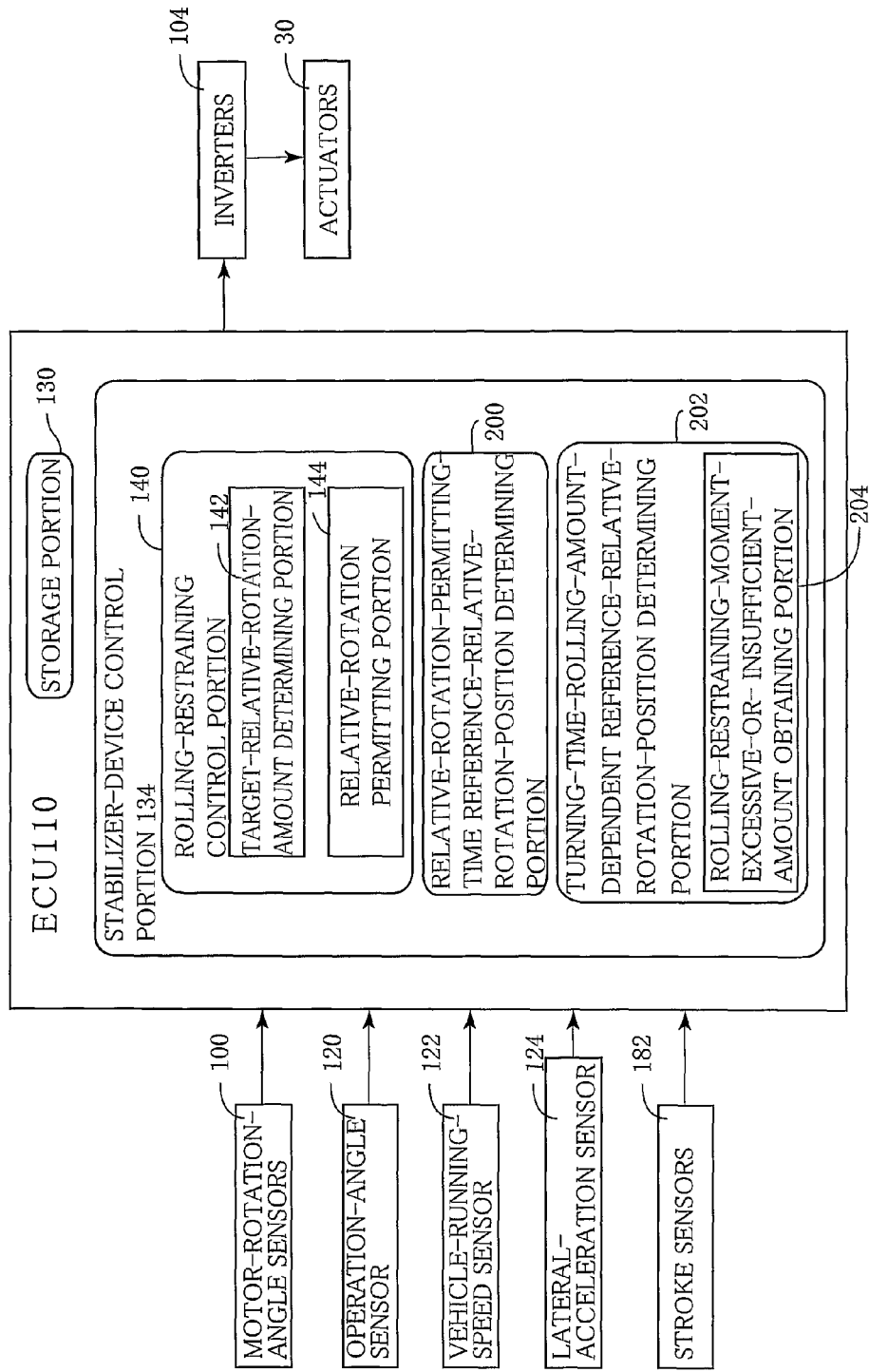
FIG. 27 is a block diagram corresponding to FIGS. 9, 14, 18, and 22, and illustratively showing various control functions of the electronic control unit of the stabilizer system as the sixth embodiment.

FIG. 27 is a block diagram showing various control functions of the ECU 110. This block diagram is basically identical with that of FIG. 9 corresponding to the first embodiment, and differences of this diagram from that of FIG. 9 are as follows: The stabilizer-device control portion 134 includes a relative-rotation-permitting-time reference-relative-rotation-position determining portion 200 that carries out Step S155 of FIG. 23. In the present embodiment, the reference-relative-rotation-position determining portion 200 is identical with the stroke-amount-dependent reference-relative-rotation-position determining portion 190. However, the reference-relative-rotation-position determining portion 200 may be identical with the reference-relative-rotation-position determining portion 150, or the reference-relative-rotation-position determining portion 156. In addition, the stabilizer-device control portion 134 includes a turning-time-rolling-amount-dependent reference-relative-rotation-position determining portion 202 that carries out Step S156 of FIG. 23, and the reference-relative-rotation-position determining portion 202 includes a rolling-restraining-moment excessive-or-insufficient-amount obtaining portion 204 that carries out Step S188 of FIG. 25. The turning-time-rolling-amount-dependent reference-relative-rotation-position determining portion 202 can be said as a sort of rolling-restraining-control-time reference-relative-rotation-position determining portion that determines the reference relative-rotation position α when the rolling-restraining control is performed.

7. Seventh Embodiment

Figure 28:
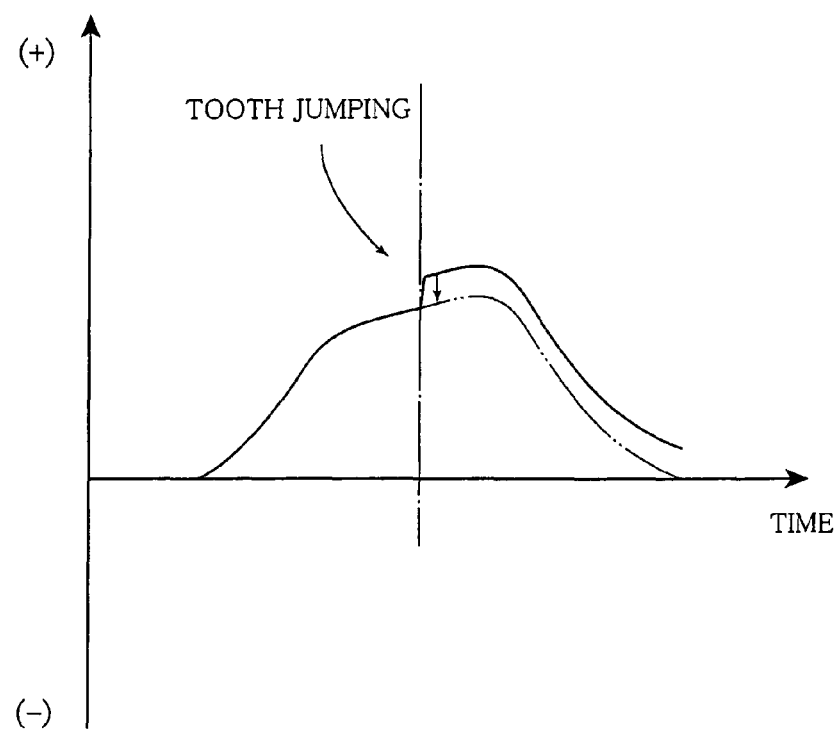
FIG. 28 is a graph illustratively showing a time-wise change of relative-rotation amounts θ of two stabilizer bars when a tooth jumping occurs to a reduction gear device, in another stabilizer system as a seventh embodiment of the present invention.

The seventh embodiment relates to a stabilizer system having the same construction as that of the stabilizer system as the sixth embodiment. As described above, the relative-rotation amount θ of the two stabilizer bar members 22, 24 counted from the reference relative-rotation position α is obtained based on the rotation angle $θ_M$ of the electric motor 70 detected by the motor-rotation-angle sensor 100. More specifically described, the relative-rotation amount θ of the two stabilizer bar members 22, 24 is obtained by multiplying the rotation angle $θ_M$ of the electric motor 70 by a coefficient corresponding to a reduction gear ratio of the reduction gear device 72. FIG. 28 is a graph showing a time-wise change of the relative-rotation amount θ of the two stabilizer bar members 22, 24 when the rolling-restraining control is performed. Normally, as indicated by a two-dot chain line in the figure, the two stabilizer bar members 22, 24 are rotated relative to each other in synchronism with the rotation of the electric motor 70. That is, the relative-rotation amount θ of the two stabilizer bar members 22, 24 is directly proportional to the rotation angle of the electric motor 70. However, when a tooth jumping occurs to the reduction gear device 72, for example, when, in the present embodiment, the flexible gear 92 and the ring gear 94 are instantaneously disengaged from each other and are rotated relative to each other, the two stabilizer bar members 22, 24 are not rotated relative to each other in synchronism with the rotation of the electric motor 70, in a very short time. That is, as indicated by a solid line in FIG. 28, the tooth jumping of the reduction gear device 72 results in an instantaneous slipping of the electric motor 70, thereby causing an error of the actual relative-rotation amount θ of the two stabilizer bar members 22, 24 from the rotation angle of the electric motor 70. In the present embodiment, a reference relative-rotation position α is so determined as to correct the error caused by the tooth jumping.

Figure 29:
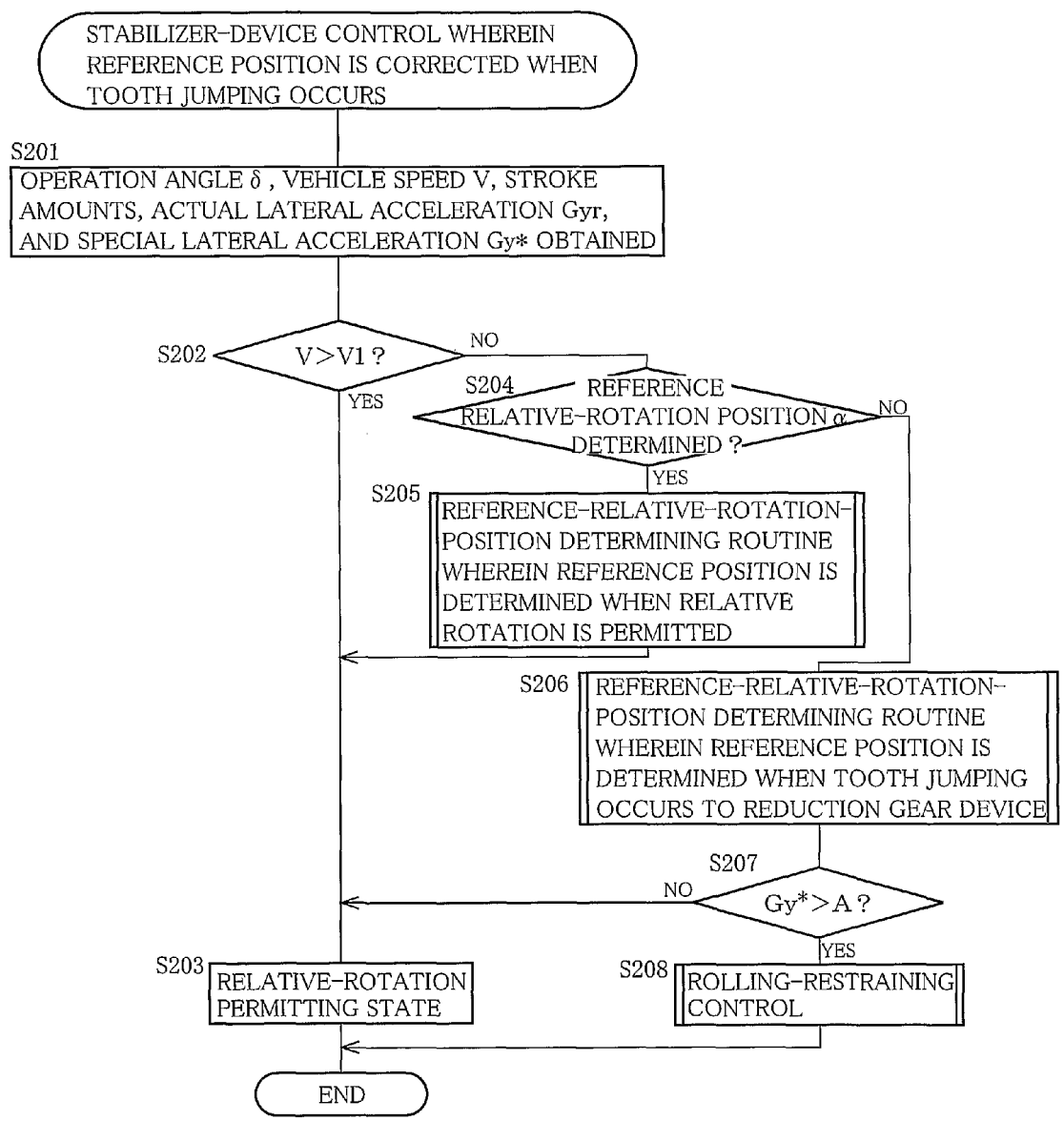
FIG. 29 is a flow chart corresponding to FIGS. 4, 12, 15, 20, and 23, and representing another stabilizer-device controlling program that is implemented by an electronic control unit of the stabilizer system as the seventh embodiment.

FIG. 29 is a flow chart representing a stabilizer-device controlling program wherein a reference relative-rotation position α is determined when a tooth jumping occurs. Steps S201 through S205 of FIG. 29 are identical with Steps S151 through S155 of FIG. 23, respectively, that are employed in the sixth embodiment. The present stabilizer-device controlling program includes Step S206, i.e., a reduction-gear-device-tooth-jumping-time reference-relative-rotation-position determining routine wherein when a tooth jumping occurs to the reduction gear device 72, a reference relative-rotation position α is so determined as to correct an error caused by the tooth jumping. At Step S207, the ECU 110 judges whether the special lateral acceleration Gy* is greater than the control-start-timing reference value A. If a positive judgment is made at Step S207, the control of the ECU 110 goes to Step S208, i.e., the rolling-restraining control routine of FIG. 6.

FIG. 20 shows the reduction-gear-device-tooth-jumping-time reference-relative-rotation-position determining routine at Step S206. Each time the present routine is implemented, the ECU 110 obtains, at Step S211, a relative-rotation amount θ of the two stabilizer bar members 22, 24. When the present routine is implemented for the first time after the vehicle is started, the ECU 110 stores, at Steps S212 through S214, the thus obtained relative-rotation amount θ as a parameter, θa, that should indicate a relative-rotation amount θ that should have been obtained in the preceding control cycle in accordance with the present routine. More specifically described, when the present routine is implemented for the first time after the vehicle is started, a flag, W, is pre-set in an OFF state, W=OFF, and accordingly a negative judgment is made at Step S212. Since, however, the relative-rotation amount θ obtained at Step S211 is stored as the parameter θa at Step S213, and the flag W is set to an ON state, W=ON, at Step S214, a positive judgment is made at Step S212 in each of the following control cycles. Then, at Steps S215 through S217, the ECU 110 judges whether a tooth jumping has occurred. More specifically described, at Step S215, the ECU 110 calculates an amount, θd, of change of the current relative-rotation amount θ from the preceding relative-rotation amount indicated by the parameter θa and, at Step S216, the ECU 110 stores the current relative-rotation amount θ as the parameter θa. Then, at Step S217, the ECU 110 judges whether an absolute value of the change amount θd is greater than a reference value, E. A positive judgment indicates that a tooth jumping has occurred. Since the present routine is implemented periodically at predetermined regular intervals of time, the change amount θd per predetermined regular interval corresponds to a rotation speed of the electric motor 70. Thus, it can be said that if an absolute value of a rotation speed of the electric motor 70 exceeds a reference speed, the occurrence of tooth jumping is judged or recognized.

Figure 30:
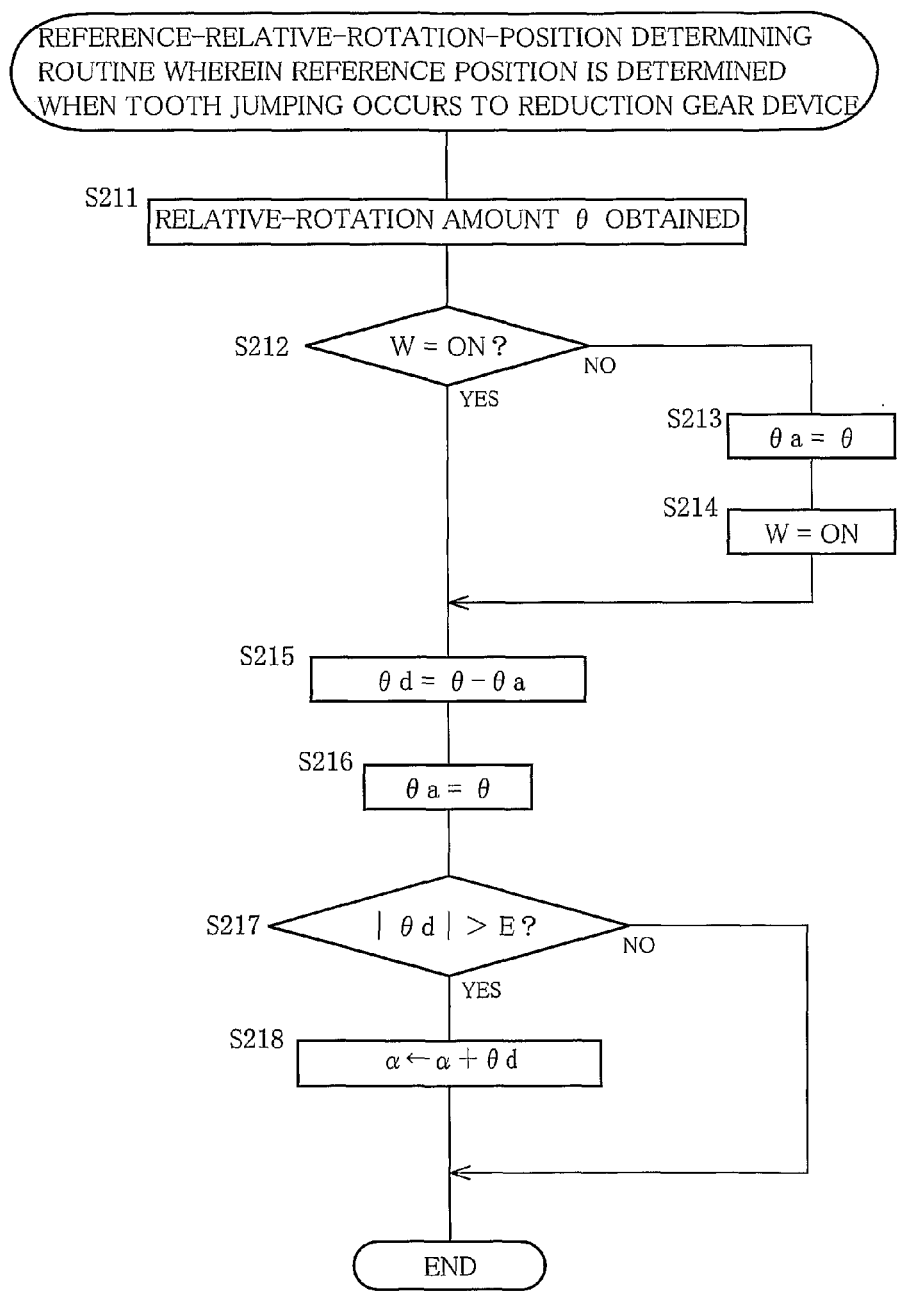
FIG. 30 is a flow chart corresponding to FIGS. 8, 13, 16, 21, 24, and 25, and representing a reduction-gear-device-tooth-jumping-time reference-relative-rotation-position determining routine that is implemented by the electronic control unit of the stabilizer system as the seventh embodiment.

When the occurrence of tooth jumping is recognized, it can be said that an error corresponding to the change amount θd caused by the tooth jumping has occurred to a known relationship between relative-rotation amount θ of the two stabilizer bar members 22, 24 and rotation angle of the electric motor 70. Hence, at Step S218, the ECU 110 updates the current reference relative-rotation position α to a new reference relative-rotation position α so as to correct the error. The relative-rotation amount θ can take a positive or a negative sign corresponding to the opposite directions, respectively, in which the two stabilizer bar members 22, 24 are rotated relative to each other from the reference relative-rotation position α. In the present embodiment, the relative-rotation amount θ takes a positive sign when the vehicle turns to the left and the vehicle's body rolls in the right direction, and takes a negative sign when the vehicle turns to the right and the vehicle's body rolls in the left direction. For example, in the case where the relative-rotation amount θ takes a positive sign and an increase amount θd thereof (i.e., a change amount θd in the positive direction) exceeds the reference value E, a relative-rotation position of the two stabilizer bar members 22, 24 that is distant from the current reference relative-rotation position α by the increase amount θd in the positive direction is determined as a new reference relative-rotation position α. Similarly, in the case where the relative-rotation amount θ takes a negative sign and a decrease amount θd thereof (i.e., a change amount θd in the negative direction) exceeds the reference value E, a relative-rotation position of the two stabilizer bar members 22, 24 that is distant from the current reference relative-rotation position α by the decrease amount θd in the negative direction is determined as a new reference relative-rotation position α. Thus, according to the routine of FIG. 30, an appropriate reference relative-rotation position α can be determined even if a tooth jumping may occur to the reduction gear device 72, and accordingly the relative-rotation amount θ can be accurately recognized as indicated by the two-dot chain line in FIG. 28. Therefore, the stabilizer device 14 can exhibit an appropriate rolling-restraining effect.

Figure 31:
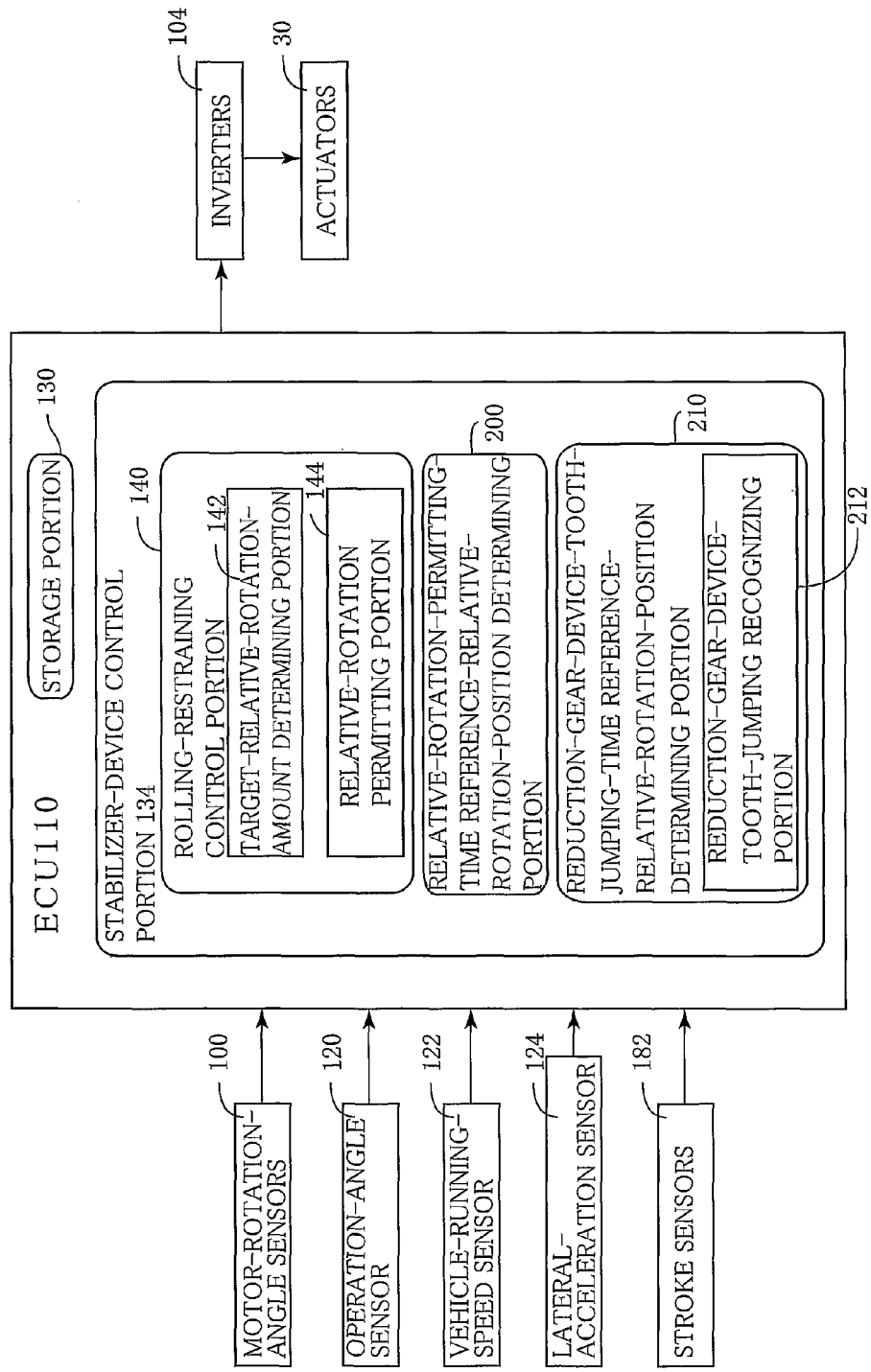
FIG. 31 is a block diagram corresponding to FIGS. 9, 14, 18, 22, and 27, and illustratively showing various control functions of the electronic control unit of the stabilizer system as the seventh embodiment.

FIG. 31 is a block diagram showing various control functions of the ECU 110. This block diagram is basically identical with that of FIG. 27 corresponding to the sixth embodiment, and differences of this diagram from that of FIG. 27 are as follows: The stabilizer-device control portion 134 includes a relative-rotation-permitting-time reference-relative-rotation-position determining portion 200 that carries out Step S205 of FIG. 29. In this embodiment, the reference-relative-rotation-position determining portion 200 is identical with the stroke-amount-dependent reference-relative-rotation-position determining portion 190. However, the reference-relative-rotation-position determining portion 200 may be identical with the reference-relative-rotation-position determining portion 150, or the reference-relative-rotation-position determining portion 156. In addition, the stabilizer-device control portion 134 includes a reduction-gear-device-tooth-jumping-time reference-relative-rotation-position determining portion 210 (i.e., a sort of relative-rotation-amount-error-occurrence-time reference-relative-rotation-position determining portion) that carries out Step S206 of FIG. 29. The reference-relative-rotation-position determining portion 210 includes a reduction-gear-device-tooth-jumping recognizing portion 212 that carries out Steps S215 through S217 of FIG. 30. Moreover, the stabilizer-device control portion 134 may further include the turning-time-rolling-amount-dependent reference-relative-rotation-position determining portion 202 of FIG. 27 and/or a different-wheel-diameter-time reference-relative-rotation-position determining portion 280 of FIG. 36.

8. Eighth Embodiment

Figure 32:
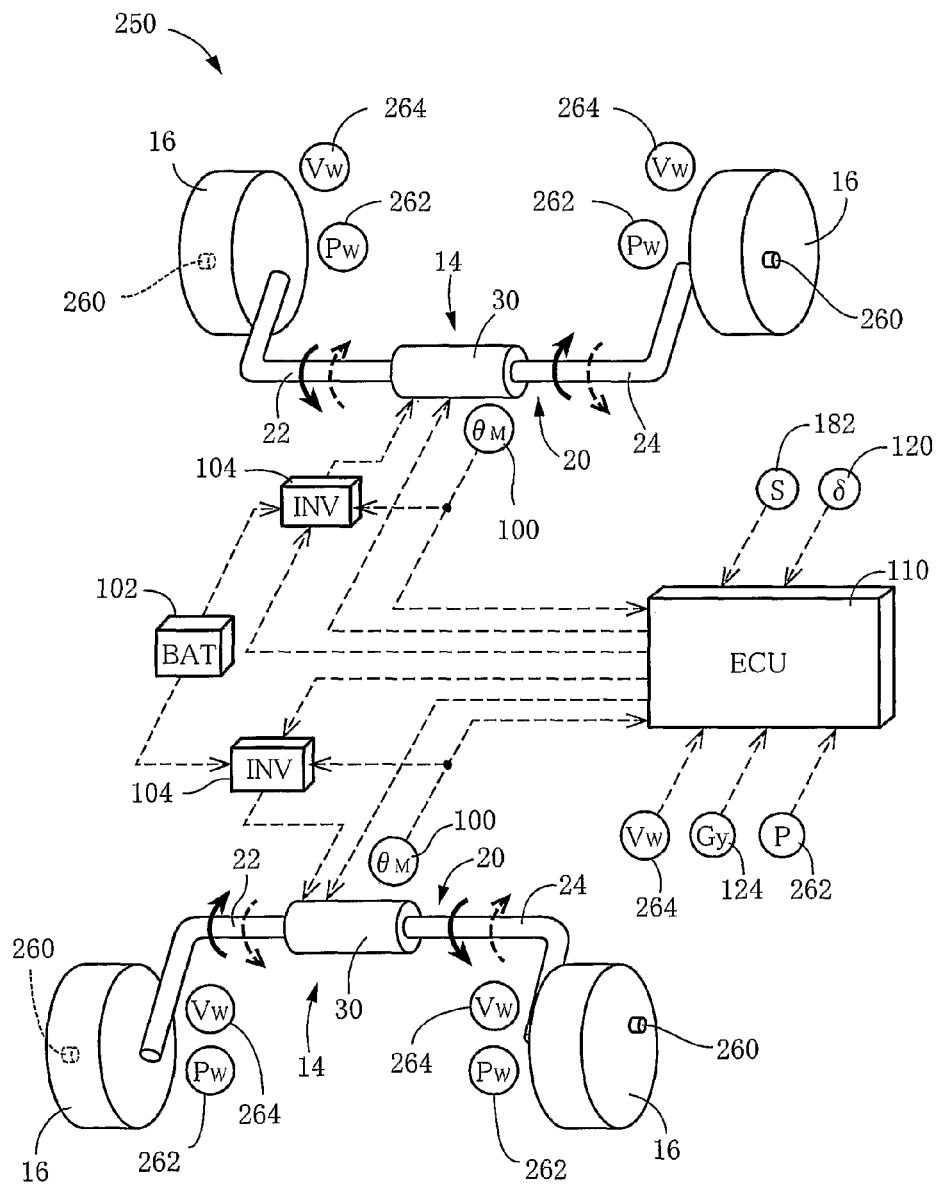
FIG. 32 is an illustrative view corresponding to FIGS. 1 and 9, and showing another stabilizer system as an eighth embodiment of the present invention.

The eighth embodiment relates to a stabilizer system 250, illustratively shown in FIG. 32, that has the same construction as that of the stabilizer system 10 as the first embodiment, except that the former stabilizer system 250 additionally employs four air-pressure sensors 260 that are provided for the four wheels 16, respectively, and detect respective air pressures in the four wheels 16; and four signal receivers 262 that are provided for the four air-pressure sensors 260 and receive respective detection signals transmitted by the four sensors 260, and that the former stabilizer system 250 employs, in place of the vehicle-running-speed sensor 122, four wheel-rotation-speed sensors 264 that are provided for the four wheels 16, respectively, and detect respective rotation speeds of the four wheels 16. A running speed V of the vehicle is estimated based on the respective rotation speeds of the four wheels 16, detected by the four wheel-rotation-speed sensors 264. The four air-pressure sensors 260 are disposed such that each of the sensors 260 penetrates into an inner space of a tire of a corresponding one of the four wheels 16 and contacts a pressurized air present in the tire. Thus, each air-pressure sensor 260 can detect the air pressure of the tire of the corresponding wheel 16. Each air-pressure sensor 260 includes an exclusive battery as an electric-power source thereof, not shown, and accordingly can operate without being supplied with the electric power from the battery 102. In addition, each air-pressure sensor 260 includes an air-pressure-information producing portion that produces air-pressure information representing the detected air pressure of the corresponding wheel 16; and a signal-transmitting-and-receiving antenna that transmits a radio-wave signal converted from the produced air-pressure information. Each of the four signal receivers 262 includes a signal-transmitting-and-receiving antenna that receives the radio-wave signal transmitted from the corresponding air-pressure sensor 260; and an air-pressure-information obtaining portion that obtains, from the received radio-wave signal, the air-pressure information representing the detected air pressure of the corresponding wheel 16. The four signal receivers 262 and the four wheel-rotation-speed sensors 264 are connected to the stabilizer ECU 110, so that the ECU 110 can obtain the respective air pressures of the four wheels 16, from the respective sets of air-pressure information representing the respective detected air pressures of the corresponding wheels 16, and can obtain the respective rotation speeds of the four wheels 16, detected by the four wheel-rotation-speed sensors 264. The stabilizer system 250 implements a different-wheel-diameter-time reference-relative-rotation-position determining routine, shown in FIG. 35, wherein a reference relative-rotation position α is determined in a different-wheel-diameter state in which respective outer diameters of the left and right wheels 16 are different from each other because of, e.g., a tire's puncture.

Figure 33:
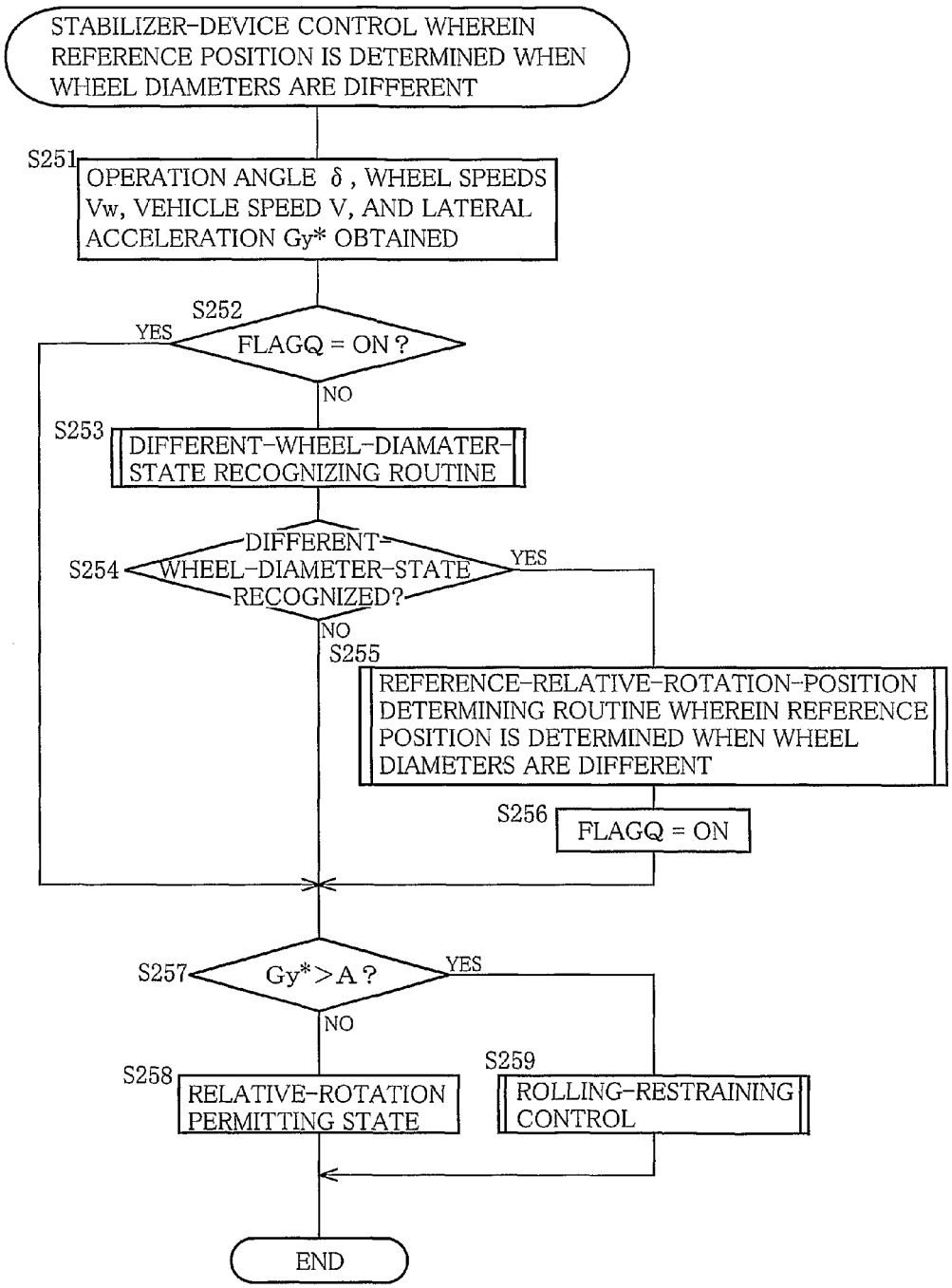
FIG. 33 is a flow chart corresponding to FIGS. 4, 12 and 15, and representing another stabilizer-device controlling program that is implemented by an electronic control unit of the stabilizer system as the eighth embodiment.

FIG. 33 is a flow chart representing a stabilizer-device controlling program wherein a reference relative-rotation position α is determined in the different-wheel-diameter state. The program of FIG. 33 is identical with the program of FIG. 4, employed by the first embodiment, except that Step S12 of FIG. 4 is replaced by Steps S252 through S256 of FIG. 33. That is, Steps S251 and S257 through S259 of FIG. 33 are identical with Steps S11 and S13 through S15 of FIG. 4. Therefore, the description of those identical steps is omitted, and only Steps S252 through S256 will be described below. In the following description, it is assumed, for easier understanding purposes only, that at a time when the present program is implemented for the first time, an appropriate reference relative-rotation position α has already been determined.

Figure 34:
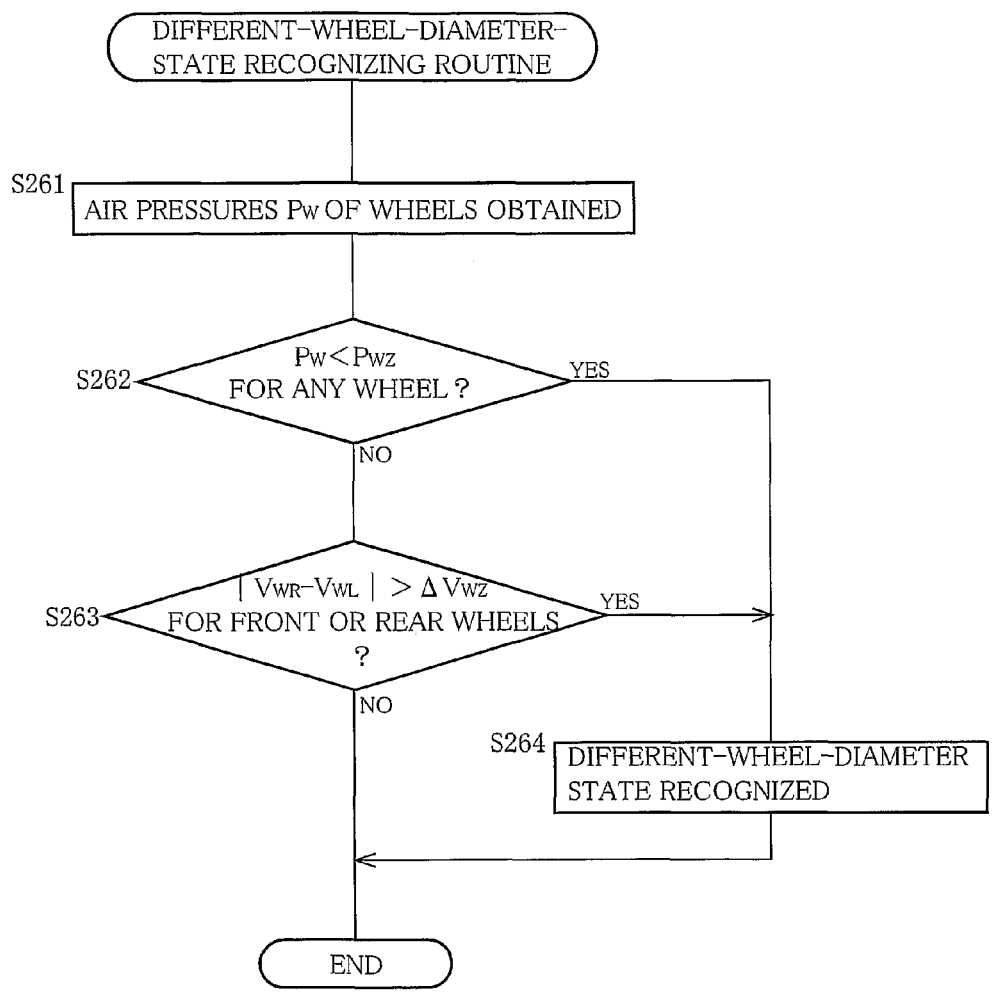
FIG. 34 is a flow chart representing a different-wheel-diameter-state recognizing routine that is implemented by the electronic control unit of the stabilizer system as the eighth embodiment.

At Step S252, the ECU 110 judges whether a flag, Q, is set in an ON state, Q=ON. The flag Q is re-set to an OFF state, Q=OFF, when the vehicle is started, and the flag Q is set to the ON state at Step S256 after the different-wheel-diameter-time reference-relative-rotation-position determining routine is implemented at Step S255, described later. Therefore, if a negative judgment is made at Step S252 before the reference-relative-rotation-position determining routine is implemented at Step S255, then the control of the ECU 110 goes to Step S253 and the following steps. On the other hand, after the reference-relative-rotation-position determining routine is implemented at Step S255, the ECU 110 skips Steps S253 through S256, so as not to repeat those steps in the different-wheel-diameter state in which, e.g., a tire's puncture has occurred. At Step S253, the ECU 110 implements a different-wheel-diameter-state recognizing routine represented by a flow chart shown in FIG. 34. According to this routine, first, at Step S261, the ECU 110 obtains respective air pressures, $P_W$, of the respective tires of the four wheels 16. Then, at Step S262, the ECU 110 judges whether any one of the respective tire's air pressures $P_W$ of the four wheels 16 is lower than a pre-set threshold value, $P_{WZ}$. If a negative judgment is made at Step S262, the control goes to Step S263 to judge whether a difference of respective rotation speeds, $V_{WL}$, $V_{WR}$, of the left and right wheels 16 of either the two front wheels 16 or the two rear wheels 16 is greater than a pre-set speed difference, $\Delta V_{WZ}$. If a positive judgment is made at either Step S262 or S263, the control goes to Step S264 to recognize that the vehicle is in the different-wheel-diameter state because of, e.g., a tire's puncture, or use of wheels having different diameters. On the other hand, if a negative judgment is made at each of Steps S262 and S263, the ECU 110 does not recognize that the vehicle is in the different-wheel-diameter state. Though Step S263 is carried out only under a condition that the vehicle is running straight, this condition is not shown in FIG. 34 for easier understanding purposes only.

Figure 35:
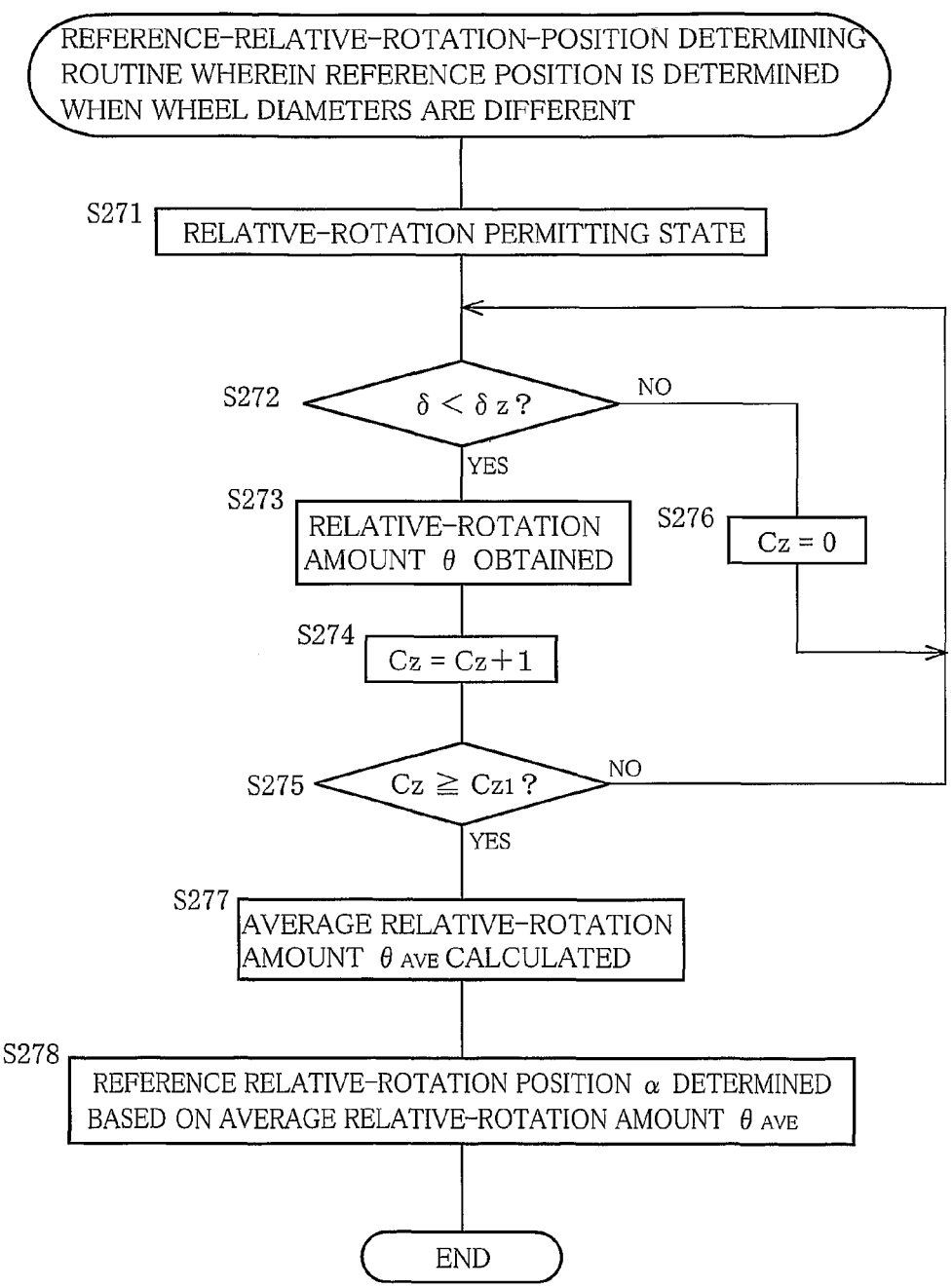
FIG. 35 is a flow chart corresponding to FIGS. 8, 13, 16, 21, 24, 25, and 30, and representing a different-wheel-diameter-time reference-relative-rotation-position determining routine that is implemented by the electronic control unit of the stabilizer system as the eighth embodiment.

If the ECU 110 recognizes the different-wheel-diameter state of the vehicle, then a positive judgment is made at Step S254, and the control of the ECU 110 goes to Step S255, i.e., the different-wheel-diameter-time reference-relative-rotation-position determining routine of FIG. 35. First, Step S271 is identical with Step S258, i.e., the ECU 110 places the two stabilizer bars 22, 24 in the relative-rotation permitting state. Then, at Steps S272 through S277, the ECU 110 recognizes a straight-running state of the vehicle if the operation angle δ does not exceed a pre-set reference value, δz, and, if the straight-running state has continued for a pre-set time duration, the ECU 110 calculates an average relative-rotation amount, $\theta_{AVE}$, as an average of a plurality of relative-rotation amounts θ of the two stabilizer bars 22, 24 each from the current reference relative-rotation position α that are obtained within the pre-set time duration. More specifically described, at Step S272, the ECU 110 judges whether the operation angle δ is smaller than the pre-set reference value δz. If a negative judgment is made at Step S272, the control goes to Step S276 to reset a number, Cz, counted by a counter, to zero, Cz=0, and then goes back to Step S272. On the other hand, if a positive judgment is made at Step S272, the control goes to Step S273 to obtain a current relative-rotation amount θ of the two stabilizer bars 22, 24 counted from the current reference relative-rotation position α, and then goes to Step S274 to add one to the counted number Cz. Subsequently, at Step S275, the ECU 110 judges whether the counted number Cz is equal to, or greater than, a pre-set reference value corresponding to the above-indicated pre-set time duration. If a negative judgment is made at Step S275, the control goes back to Step S272. On the other hand, if a positive judgment is made at Step S275, the control goes to Step S277 to calculate the average relative-rotation amount $\theta_{AVE}$ based on the relative-rotation amounts θ of the two stabilizer bars 22, 24 each from the current reference relative-rotation position α that have been obtained within the pre-set time duration. Then, the control goes to Step S278 to update the current reference relative-rotation position α to a new reference relative-rotation position α, based on the calculated average relative-rotation amount $\theta_{AVE}$, i.e., determine the new reference relative-rotation position α by changing the current reference relative-rotation position α by the calculated average relative-rotation amount $\theta_{AVE}$. More specifically described, the ECU 110 determines, as the new reference relative-rotation position α, a relative-rotation position of the two stabilizer bars 22, 24 that is distant from the current reference relative-rotation position α by the average relative-rotation amount $\theta_{AVE}$. The above-indicated relative-rotation permitting state continues till the new reference relative-rotation position α is determined.

After the new reference relative-rotation position α is determined, the rolling-restraining controlling routine is carried out at Step S259, using the new reference relative-rotation position α. In the present embodiment, the ECU 110 can automatically detect the different-wheel-diameter state and update the reference relative-rotation position α. Thus, the present stabilizer system 250 can perform an appropriate rolling-restraining control even in the different-wheel-diameter state. It is noted that the program of FIG. 33 has been described above, for easier understanding purposes only, on the assumption that the vehicle is not stopped while the operation of the steering wheel is being operated and the vehicle does not run on a road surface inclined in the widthwise direction of the vehicle.

Figure 36:
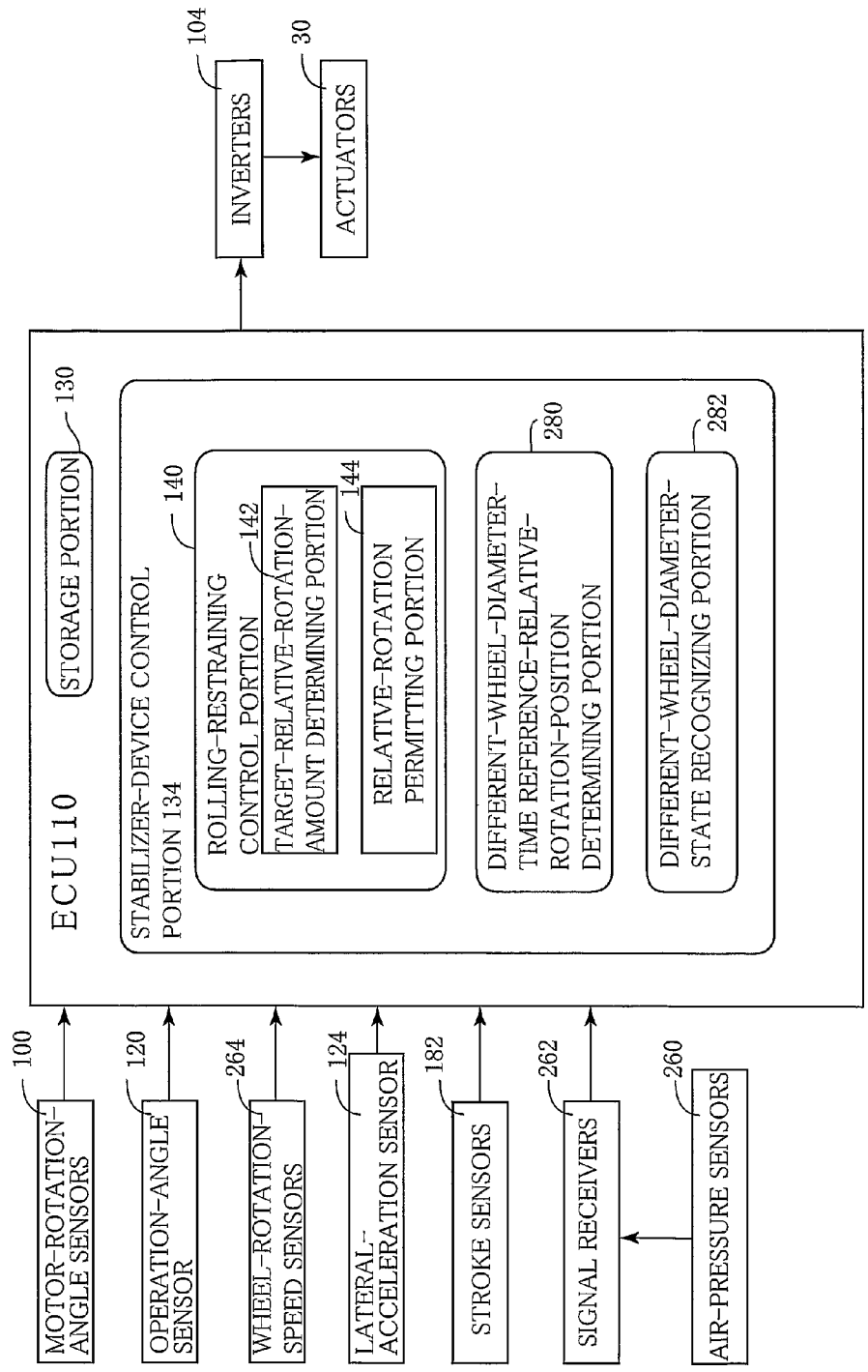
FIG. 36 is a block diagram corresponding to FIGS. 9, 14, 18, 22, 27, and 31, and illustratively showing various control functions of the electronic control unit of the stabilizer system as the eighth embodiment.

FIG. 36 is a block diagram showing various control functions of the ECU 110. This block diagram is basically identical with that of FIG. 9 corresponding to the first embodiment, and differences of this diagram from that of FIG. 9 are as follows: The stabilizer-device control portion 134 includes a different-wheel-diameter-time reference-relative-rotation-position determining portion 280 that carries out the different-wheel-diameter-time reference-relative-rotation-position determining routine at Step S255 of FIG. 33; and a different-wheel-diameter-state recognizing portion 282 that carries out the different-wheel-diameter-state recognizing routine at Step S253.

9. Other Embodiments

In each of the above-described embodiments, the special lateral acceleration Gy* is obtained as the estimated lateral acceleration Gyc, or is obtained based on the actual lateral acceleration Gyr and the estimated lateral acceleration Gyc. However, the special lateral acceleration Gy* may be obtained as the actual lateral acceleration Gyr, or may be obtained based on only either the actual lateral acceleration Gyr or the estimated lateral acceleration Gyc. In addition, in each embodiment, the common physical quantity, i.e., the estimated lateral acceleration Gyc as the special lateral acceleration Gy* is used as each of the target-relative-rotation-amount determination basis amount and the control-start-timing determination basis amount (or the relative-rotation-permitting-timing determination basis amount). However, different physical quantities, e.g., the actual lateral acceleration Gyr and the estimated lateral acceleration Gyc may be used as the target-relative-rotation-amount determination basis amount (at Step S21 of FIG. 6) and the control-start-timing determination basis amount (at, e.g., Step S13 of FIG. 4), respectively. Alternatively, the wheel-body-distance difference obtained based on the stroke amounts detected by the stroke sensors 182 may be used as the control-start-timing determination basis amount.

In each of the above-described eight embodiments, the stabilizer-device control device 134 includes one or two sorts of reference-relative-rotation-position determining portions. However, the stabilizer-device control device 134 may be modified to include three or more sorts of reference-relative-rotation-position determining portions. Thus, the stabilizer-device control device 134 may employ two or more sorts of reference-relative-rotation-position determining portions that are arbitrarily selected from the reference-relative-rotation-position determining portions 150, 156, 160, 166, 190, 200, 202, 210, 280 employed by the eight embodiments.

The invention claimed is:

1. A stabilizer system for use in a vehicle having a body, a left wheel, and a right wheel, the stabilizer system comprising:
    two stabilizer bars which are connected to the left and right wheels, respectively, and which are rotated relative to each other to exhibit a rolling-restraining effect to restrain a rolling of the body;
    an actuator which includes a driving-force source producing a driving force and which changes, with the driving force, a relative-rotation amount of the two stabilizer bars counted from a reference relative-rotation position thereof and thereby changes the rolling-restraining effect thereof; and
    a control device including a rolling-restraining control portion comprising a target-relative-rotation-amount determining portion which determines a target relative-rotation amount of the two stabilizer bars, based on a target-relative-rotation-amount determination basis quantity that can be used to determine the target relative-rotation amount,
    wherein the rolling-restraining control portion performs a rolling-restraining control to control the actuator to change the relative-rotation amount of the two stabilizer bars to the target relative-rotation amount thereof determined by the target-relative-rotation-amount determining portion and thereby enable the two stabilizer bars to exhibit an appropriate rolling-restraining effect,
    wherein the control device further includes a reference-relative-rotation-position determining portion which determines the reference relative-rotation position of the two stabilizer bars.

2. The stabilizer system according to claim 1 wherein the reference-relative-rotation-position determining portion determines the reference relative-rotation position of the two stabilizer bars, based on at least one relative-rotation-amount estimation basis physical quantity that can be used to estimate a relative-rotation amount of the two stabilizer bars counted from a neutral relative-rotation position thereof in which there is no relative rotation between the two stabilizer bars in a relative-rotation permitting state in which the actuator does not produce the driving force and the two stabilizer bars are permitted to be rotated relative to each other according to a change of a wheel-body-distance difference as a difference of (a) a first distance between one of the left and right wheels and the body and (b) a second distance between an other of the left and right wheels and the body.

3. The stabilizer system according to claim 2, wherein the reference-relative-rotation-position determining portion determines the reference relative-rotation position of the two stabilizer bars, based on said at least one relative-rotation-amount estimation basis physical quantity comprising at least one of (a) a rolling-moment estimation basis physical quantity that can be used to estimate a rolling moment exerted to the body, and (b) a wheel-body-distance-difference estimation basis physical quantity that can be used to estimate the wheel-body-distance difference.

4. The stabilizer system according to claim 3, wherein the reference-relative-rotation-position determining portion determines, when the actuator and the two stabilizer bars are in the relative-rotation permitting state, the reference relative-rotation position of the two stabilizer bars, based on said at least one relative-rotation-amount estimation basis physical quantity.

5. The stabilizer system according to claim 4, wherein in a first state in which said at least one relative-rotation-amount estimation basis physical quantity has exceeded a control-start-timing reference value indicating a timing to start the rolling-restraining control, the rolling-restraining control portion performs the rolling-restraining control and, in a second state in which said at least one relative-rotation-amount estimation basis physical quantity has not exceeded the control-start-timing reference value, the rolling-restraining control portion places the two stabilizer bars in the relative-rotation permitting state.

6. The stabilizer system according to claim 5, wherein said at least one relative-rotation-amount estimation basis physical quantity comprises the rolling-moment estimation basis physical quantity, and the target-relative-rotation-amount determination basis quantity comprises the rolling-moment estimation basis physical quantity as said at least one relative-rotation-amount estimation basis physical quantity.

7. The stabilizer system according to claim 5, wherein the reference-relative-rotation-position determining portion determines the reference relative-rotation position of the two stabilizer bars, when said at least one relative-rotation-amount estimation basis physical quantity increases and exceeds the control-start-timing reference value.

8. The stabilizer system according to claim 5, wherein the reference-relative-rotation-position determining portion determines the reference relative-rotation position of the two stabilizer bars, based on a relative-rotation position of the two stabilizer bars at a time when said at least one relative-rotation-amount estimation basis physical quantity increases and exceeds the control-start-timing reference value.

9. The stabilizer system according to claim 5, wherein the reference-position determining portion determines, as the reference relative-rotation position of the two stabilizer bars, a relative-rotation position of the two stabilizer bars at a time when said at least one relative-rotation-amount estimation basis physical quantity increases and exceeds the control-start-timing reference value.

10. The stabilizer system according to claim 5, wherein the reference-relative-rotation-position determining portion determines, as the reference relative-rotation position of the two stabilizer bars, a relative-rotation position of the two stabilizer bars that is distant, by a correction relative-rotation amount in a direction toward the neutral relative-rotation position thereof, from a relative-rotation position thereof at a time when said at least one relative-rotation-amount estimation basis physical quantity increases and exceeds the control-start-timing reference value.

11. The stabilizer system according to claim 10, wherein the reference-relative-rotation-position determining portion determines, as the correction relative-rotation amount, the target relative-rotation amount of the two stabilizer bars at a time when said at least one relative-rotation-amount estimation basis physical quantity increases and exceeds the control-start-timing reference value.

12. The stabilizer system according to claim 3, wherein the reference-relative-rotation-position determining portion obtains, when the actuator and the two stabilizer bars are in the relative-rotation permitting state, a distance-difference-dependent relative-rotation amount of the two stabilizer bars that is a relative-rotation amount thereof, counted from the neutral relative-rotation position thereof, that corresponds to the wheel-body-distance-difference estimation basis physical quantity as said at least one relative-rotation-amount estimation basis physical quantity, and wherein the reference-relative-rotation-position determining portion determines the reference relative-rotation position of the two stabilizer bars, based on the obtained distance-difference-dependent relative-rotation amount thereof.

13. The stabilizer system according to claim 12, wherein the reference-relative-rotation-position determining portion determines, as the reference relative-rotation position of the two stabilizer bars, a relative-rotation position of the two stabilizer bars that is distant, by the obtained distance-difference-dependent relative-rotation amount thereof in a direction toward the neutral relative-rotation position thereof, from a relative-rotation amount thereof when the distance-difference-dependent relative-rotation amount thereof is obtained.

14. The stabilizer system according to claim 12, wherein
the target-relative-rotation-amount determination basis quantity comprises the rolling-moment estimation basis physical quantity as said at least one relative-rotation-amount estimation basis physical quantity, and
wherein in a first state in which the rolling-moment estimation basis physical quantity has exceeded a control-start-timing reference value indicating a timing to start the rolling-restraining control, the rolling-restraining control portion performs the rolling-restraining control and, in a second state in which the rolling-moment estimation basis physical quantity has not exceeded the control-start-timing reference value, the rolling-restraining control portion places the two stabilizer bars in the relative-rotation permitting state, so as to allow the reference-relative-rotation-position determining portion to determine the reference relative-rotation position of the two stabilizer bars.

15. The stabilizer system according to claim 12, further comprising a first stroke sensor and a second stroke sensor which detect the first distance between said one wheel and the body, and the second distance between said other wheel and the body, respectively, wherein the control device obtains the wheel-body-distance-difference estimation basis physical quantity based on the detected first and second distances.

16. The stabilizer system according to claim 1, wherein the reference-relative-rotation-position determining portion determines a plurality of said reference relative-rotation positions of the two stabilizer bars, wherein the control device further comprises a stop-time-information storing portion which stores, when the vehicle is stopped and a power of the vehicle is turned off, first stopped-vehicle-posture information representing a first posture of the vehicle in a stopped state thereof, and reference-position information that can be used to obtain a current one of the reference relative-rotation positions of the two stabilizer bars, and wherein the reference-relative-rotation-position determining portion obtains, when the power of the vehicle is turned on, second stopped-vehicle-posture information representing a second posture of the vehicle in the stopped state thereof and, when the second stopped-vehicle-posture information is identical with the stored first stopped-vehicle-posture information, the reference-relative-rotation-position determining portion determines a new one of the reference relative-rotation positions of the two stabilizer bars, based on the stored reference-position information.

17. The stabilizer system according to claim 16, wherein the control device obtains, as each of the first stopped-vehicle-posture information and the second stopped-vehicle-posture information, a rolling-amount estimation basis physical quantity that can be used to estimate a rolling amount of the body.

18. The stabilizer system according to claim 16, wherein the reference-relative-rotation-position determining portion determines the new reference relative-rotation position of the two stabilizer bars immediately after the power of the vehicle is turned on.

19. The stabilizer system according to claim 16, wherein when the second stopped-vehicle-posture information is not identical with the stored first stopped-vehicle-posture information, the reference-relative-rotation-position determining portion determines the new reference relative-rotation position of the two stabilizer bars without using the stored reference-position information.

20. The stabilizer system according to claim 1, wherein the reference-relative-rotation-position determining portion determines a plurality of said reference relative-rotation positions of the two stabilizer bars, by continuously obtaining, in a straight-running state in which the vehicle is running straight, a plurality of said relative-rotation amounts of the two stabilizer bars each counted from a current one of the reference relative-rotation positions thereof, and updating the current reference relative-rotation position to a new one of the reference relative-rotation positions, based on a change of the continuously obtained relative-rotation amounts.

21. The stabilizer system according to claim 20, wherein the rolling-restraining control portion recognizes, as the straight-running state of the vehicle, a state in which a rolling-moment estimation basis physical quantity that can be used to estimate a rolling moment exerted to the body does not exceed a straight-running-state reference value, and wherein when the rolling-restraining control portion recognizes the straight-running state of the vehicle, the rolling-restraining control portion does not perform the rolling-restraining control and places the two stabilizer bars in a relative-rotation permitting state in which the actuator does not produce the driving force and the two stabilizer bars are permitted to be rotated relative to each other according to a change of a wheel-body-distance difference as a difference of (a) a first distance between one of the left and right wheels and the body and (b) a second distance between an other of the left and right wheels and the body.

22. The stabilizer system according to claim 20, wherein the reference-relative-rotation-position determining portion stores the plurality of relative-rotation amounts of the two stabilizer bars, each counted from the current reference relative-rotation position thereof, that are continuously obtained within a reference time duration, obtains an average of at least one local maximum and at least one local minimum of the stored relative-rotation amounts, and determines, as the new reference relative-rotation position of the two stabilizer bars, a relative-rotation position thereof that is distant, by said average, from the current reference relative-rotation position thereof.

23. The stabilizer system according to claim 1, wherein the control device obtains, as a positive value, a relative-rotation position of the two stabilizer bars at a time when one of the left and right wheels is nearer to the body than an other of the left and right wheels, and obtains, as a negative value, a relative-rotation position of the two stabilizer bars at a time when said one wheel is remoter from the body than said other wheel.

24. The stabilizer system according to claim 1, wherein from a time when the power of the vehicle is turned on, to a time when the reference-relative-rotation-position determining portion determines the reference relative-rotation position of the two stabilizer bars, the rolling-restraining control portion does not perform the rolling-restraining control and places the two stabilizer bars in a relative-rotation permitting state in which the actuator does not produce the driving force and the two stabilizer bars are permitted to be rotated relative to each other according to a change of a wheel-body-distance difference as a difference of (a) a first distance between one of the left and right wheels and the body and (b) a second distance between an other of the left and right wheels and the body.

25. The stabilizer system according to claim 1, wherein when the vehicle is in a turning state in which the vehicle is turning, the reference-relative-rotation-position determining portion judges, based on (a) a lateral-acceleration estimation basis physical quantity that can be used to estimate a lateral acceleration of the body and (b) a wheel-body-distance-difference estimation basis physical quantity that can be used to estimate a wheel-body-distance difference as a difference of a first distance between one of the left and right wheels and the body and a second distance between an other of the left and right wheels and the body, whether the rolling-restraining effect of the two stabilizer bars is excessively high and whether the rolling-restraining effect of the two stabilizer bars is insufficiently low, and determines the reference relative-rotation position of the two stabilizer bars so as to decrease the rolling-restraining effect thereof when the rolling-restraining effect thereof is excessively high and increase the rolling-restraining effect thereof when the rolling-restraining effect thereof is insufficiently low.

26. The stabilizer system according to claim 25, wherein the reference-relative-rotation-position determining portion recognizes, based on at least one of (a) the lateral-acceleration estimation basis physical quantity and (b) the wheel-body-distance-difference estimation basis physical quantity, that the vehicle is in a steady-turning state in which the vehicle is turning steadily, and determines, when the vehicle is in the steady-turning state, the reference relative-rotation position of the two stabilizer bars.

27. The stabilizer system according to claim 26, wherein the reference-relative-rotation-position determining portion determines a plurality of said reference relative-rotation positions of the two stabilizer bars, wherein based on (a) an actual rolling amount of the body that is obtained, in the steady-turning state of the vehicle, based on the wheel-body-distance-difference estimation basis physical quantity, and (b) a target rolling amount of the body as a pre-set target amount corresponding to the lateral-acceleration estimation basis physical quantity, the reference-relative-rotation-position determining portion obtains, when the rolling-restraining effect of the two stabilizer bars is excessively high, an excessive amount of the relative-rotation amount of the two stabilizer bars from a neutral relative-rotation position thereof in which there is no rotation between the two stabilizer bars, and obtains, when the rolling-restraining effect is insufficiently low, an insufficient amount of the relative-rotation amount of the two stabilizer bars, and wherein the reference-relative-rotation-position determining portion updates, when the rolling-restraining effect of the two stabilizer bars is excessively high, a current one of the reference relative-rotation positions of the two stabilizer bars to a new one of the reference relative-rotation positions that is distant from the current reference relative-rotation position by the excessive amount so as to decrease the rolling-restraining effect, and updates, when the rolling-restraining effect is insufficiently low, the current reference relative-rotation position to the new reference relative-rotation position that is distant from the current reference relative-rotation position by the insufficient amount so as to increase the rolling-restraining effect.

28. The stabilizer system according to claim 26, wherein the reference-relative-rotation-position determining portion determines a plurality of said reference relative-rotation positions of the two stabilizer bars, wherein based on (a) a difference of a rolling-restraining force produced by the two stabilizer bars in the steady-turning state of the vehicle, and a rolling-restraining force to be produced by the two stabilizer bars in a state in which a rolling amount of the body is equal to a target rolling amount as a pre-set target amount corresponding to the lateral-acceleration estimation basis physical quantity, and (b) a difference of a rolling-restraining force produced by at least one constituent element of the vehicle other than the two stabilizer bars in the steady-turning state of the vehicle, and a rolling-restraining force to be produced by said at least one constituent element in the state in which the rolling amount of the body is equal to the target rolling amount, the reference-relative-rotation-position determining portion obtains, when the rolling-restraining effect of the two stabilizer bars is excessively high, an excessive amount of the relative-rotation amount of the two stabilizer bars from a neutral relative-rotation position thereof in which there is no rotation between the two stabilizer bars, and obtains, when the rolling-restraining effect is insufficiently low, an insufficient amount of the relative-rotation amount of the two stabilizer bars, and wherein the reference-relative-rotation-position determining portion updates, when the rolling-restraining effect of the two stabilizer bars is excessively high, a current one of the reference relative-rotation positions to a new one of the reference relative-rotation positions that is distant from the current reference relative-rotation position by the excessive amount, so as to decrease the rolling-restraining effect, and updates, when the rolling-restraining effect is insufficiently low, the current reference relative-rotation position to the new reference relative-rotation position that is distant from the current reference relative-rotation position by the insufficient amount, so as to increase the rolling-restraining effect.

29. The stabilizer system according to claim 1, wherein the driving-force source of the actuator comprises a motor which outputs a rotation to be transmitted to the two stabilizer bars so as to rotate the two stabilizer bars relative to each other,
wherein the rolling-restraining control portion obtains the relative-rotation amount of the two stabilizer bars counted from the reference relative-rotation position thereof, based on a rotation amount of the motor, according to a known relationship between rotation amount of the motor and relative-rotation amount of the two stabilizer bars from the reference relative-rotation position thereof, and
wherein the reference-relative-rotation-position determining portion determines a plurality of said reference relative-rotation positions of the two stabilizer bars, and updates, when an error occurs to the known relationship, a current one of the reference relative-rotation positions to a new one of the reference relative-rotation positions such that the new reference relative-rotation position is distant from the current reference relative-rotation position by a relative-rotation amount of the two stabilizer bars that corresponds to the error.

30. The stabilizer system according to claim 29, wherein the control device recognizes the error by obtaining a rotation speed of the motor based on the rotation amount of the motor and judging that the obtained rotation speed has exceeded a reference rotation speed.

31. The stabilizer system according to claim 1, wherein the driving-force source of the actuator comprises a motor which outputs a rotation, and a reduction gear device which receives the rotation outputted by the motor and outputs the received rotation, while reducing a speed of the rotation, so as to rotate the two stabilizer bars relative to each other,
wherein the rolling-restraining control portion obtains the relative-rotation amount of the two stabilizer bars from the reference relative-rotation position thereof, based on a rotation amount of the motor, according to a known relationship between rotation amount of the motor and relative-rotation amount of the two stabilizer bars from the reference relative-rotation position thereof, and wherein the reference-relative-rotation-position determining portion determines a plurality of said reference relative-rotation positions of the two stabilizer bars, and updates, when a tooth jumping occurs to the reduction gear device and accordingly an error occurs to the known relationship, a current one of the reference relative-rotation positions to a new one of the reference relative-rotation positions such that the new reference relative-rotation position is distant from the current reference relative-rotation position by a relative-rotation amount of the two stabilizer bars that corresponds to the error.

32. The stabilizer system according to claim 1, wherein the reference-relative-rotation-position determining portion determines, as the reference relative-rotation position of the two stabilizer bars, a relative-rotation position thereof to which the two stabilizer bars are rotated relative to each other, in a different-wheel-diameter state in which respective outer diameters of the left and right wheels are different from each other, according to a wheel-body-distance difference as a difference of (a) a first distance between one of the left and right wheels and the body and (b) a second distance between an other of the left and right wheels and the body, the wheel-body-distance difference being caused by the different-wheel-diameter state.

33. The stabilizer system according to claim 32, wherein the reference-relative-rotation-position determining portion obtains a relative-rotation position of the two stabilizer bars when the vehicle meets at least one of (a) a first condition that the vehicle can be regarded as being stopped on a horizontal, flat road and (b) a second condition that the vehicle can be regarded as being running straight on a horizontal, flat road and simultaneously when the vehicle is in a relative-rotation permitting state in which the actuator does not produce the driving force and the two stabilizer bars are permitted to be rotated relative to each other according to a change of the wheel-body-distance difference, and determines the obtained relative-rotation position of the two stabilizer bars, as the reference relative-rotation position thereof.

34. The stabilizer system according to claim 32, wherein the control device further includes a different-wheel-diameter-state recognizing portion which recognizes the different-wheel-diameter state, and wherein the reference-relative-rotation-position determining portion determines the reference relative-rotation position of the two stabilizer bars based on the different-wheel-diameter state recognized by the different-wheel-diameter-state recognizing portion.

35. The stabilizer system according to claim 1, wherein the reference-relative-rotation-position determining portion determines the reference relative-rotation position of the two stabilizer bars when a relative-rotation-amount estimation basis physical quantity exceeds a predetermined value.

* * * * *